US012659953B2

(12) United States Patent
Jang et al.

(10) Patent No.: US 12,659,953 B2
(45) Date of Patent: Jun. 16, 2026

(54) METHOD AND APPARATUS OF TRANSMISSION AND RECEPTION ON REFERENCE SIGNAL FOR SPATIAL MULTIPLEXING AMONG MULTIPLE USERS IN WIRELESS COMMUNICATION SYSTEMS

(71) Applicant: Samsung Electronics Co., Ltd., Suwon-si (KR)

(72) Inventors: Youngrok Jang, Suwon-si (KR); Kyoungmin Park, Suwon-si (KR); Kyungjun Choi, Suwon-si (KR); Ameha Tsegaye Abebe, Suwon-si (KR); Seongmok Lim, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 359 days.

(21) Appl. No.: 18/365,546

(22) Filed: Aug. 4, 2023

(65) Prior Publication Data

US 2024/0049227 A1 Feb. 8, 2024

(30) Foreign Application Priority Data

Aug. 9, 2022 (KR) ........................ 10-2022-0098932
Mar. 22, 2023 (KR) ........................ 10-2023-0037566

(51) Int. Cl.
*H04W 72/1273* (2023.01)
*H04L 5/00* (2006.01)
*H04W 72/232* (2023.01)

(52) U.S. Cl.
CPC ....... *H04W 72/1273* (2013.01); *H04L 5/0016* (2013.01); *H04L 5/0051* (2013.01); *H04W 72/232* (2023.01)

(58) Field of Classification Search
CPC .. H04L 5/0051; H04L 5/0016; H04W 72/232; H04W 72/1273
USPC ........................................ 370/329
See application file for complete search history.

(56) References Cited

U.S. PATENT DOCUMENTS

| | | |
|---|---|---|
| 11,025,987 B2 | 6/2021 | Xie et al. |
| 11,432,310 B2 | 8/2022 | Park et al. |

FOREIGN PATENT DOCUMENTS

| | | | | |
|---|---|---|---|---|
| EP | 4614823 A1 * | 9/2025 | ............. | H04L 27/26 |
| WO | 2017171314 A1 | 10/2017 | | |
| WO | 2022031120 A1 | 2/2022 | | |
| WO | WO-2022031544 A1 * | 2/2022 | ........... | H04L 5/0094 |

OTHER PUBLICATIONS

3GPP TS 38.214 V17.2.0 (Jun. 2022), Technical Specification, 3rd Generation Partnership Project; Technical Specification Group Radio Access Network; NR; Physical layer procedures for data (Release 17), Jun. 2022, 228 pages.

(Continued)

*Primary Examiner* — Peter G Solinsky

(57) ABSTRACT

The disclosure relates to a 5G or 6G communication system for supporting a higher data transmission rate. The disclosure relates to operations of a user equipment (UE) and a base station. Specifically, the disclosure relates to a method for transmitting or receiving data or a reference signal in a wireless communication system and an apparatus performing the method.

20 Claims, 25 Drawing Sheets

(56)     References Cited

OTHER PUBLICATIONS

3GPP TS 38.331 V17.1.0 (Jun. 2022), Technical Specification, 3rd Generation Partnership Project; Technical Specification Group Radio Access Network; NR; Radio Resource Control (RRC) protocol specification (Release 17), Jun. 2022, 1273 pages.

International Search Report and Written Opinion of the International Searching Authority dated Nov. 8, 2023, in connection with International Application No. PCT/KR2023/011468, 7 pages.

Moderator (NTT Docomo), "FL summary on DMRS", R1-2205208, 3GPP TSG RAN WG1 Meeting #109-e, e-Meeting, May 9-20, 2022, 26 pages.

Moderator (NTT Docomo), "FL summary on DMRS#2", R1-2205260, 3GPP TSG RAN WG1 Meeting #109-e, e-Meeting, e-Meeting, May 9-20, 2022, 15 pages.

Supplementary European Search Report dated Sep. 30, 2025, in connection with European Application No. 23852887.1, 8 pages.

Ericsson, "Increased number of orthogonal DMRS ports," R1-2205112, 3GPP TSG-RAN WG1 Meeting #109-e, e-Meeting, May 9-20, 2022, 9 pages.

Samsung, "NR MIMO evolution for downlink and uplink," RP-221393, 3GPP TSG RAN Meeting #96, Budapest, Hungery, Jun. 6-9, 2022, 21 pages.

\* cited by examiner

FIG. 10

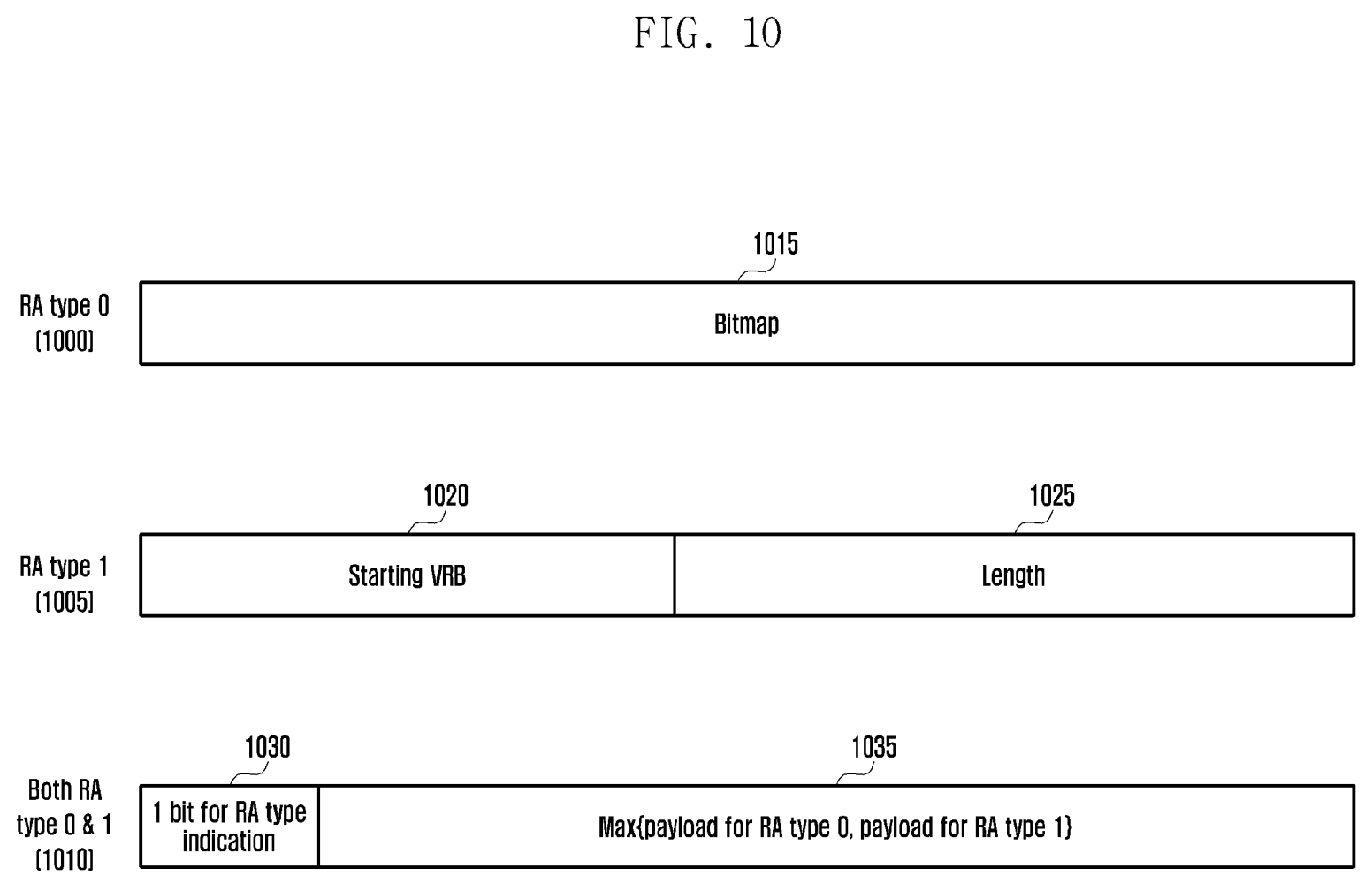

RA type 0
(1000)

1015

Bitmap

RA type 1
(1005)

1020

Starting VRB

1025

Length

Both RA
type 0 & 1
(1010)

1030

1 bit for RA type
indication

1035

Max{payload for RA type 0, payload for RA type 1}

RRC configured TCI states

1300

TCI #0   TCI #1   TCI #2   TCI #3   ⋯   TCI #M-1

MAC-CE activated TCI states for PDSCH

1320

TCI #0'   TCI #1'   TCI #2'   ⋯   TCI #K-1

MAC CE based beam indication

TCI state for PDSCH

1340

TCI #I

DCI based beam selection

FIG. 15

Transmit UE capability ~2200

Receive information on enhanced DMRS type and/or information for determining sign of orthogonal cover code ~2210

Receive PDSCH scheduling information ~2220

Receive UE capability    ~2300

Transmit information on enhanced DMRS type and/or information for determining sign of orthogonal cover code    ~2310

Transmit PDSCH scheduling information    ~2320

METHOD AND APPARATUS OF TRANSMISSION AND RECEPTION ON REFERENCE SIGNAL FOR SPATIAL MULTIPLEXING AMONG MULTIPLE USERS IN WIRELESS COMMUNICATION SYSTEMS

CROSS-REFERENCE TO RELATED APPLICATIONS

This application is based on and claims priority under 35 U.S.C. § 119 to Korean Patent Application Nos. 10-2022-0098932 and 10-2023-0037566, filed on Aug. 8, 2022, and Mar. 22, 2023, in the Korean Intellectual Property Office, the disclosure of which is herein incorporated by reference in its entirety.

BACKGROUND

1. Field

The disclosure relates to operations of a user equipment (UE) and a base station. Specifically, the disclosure relates to a method for transmitting or receiving data or a reference signal in a wireless communication system and an apparatus performing the method.

2. Description of Related Art

5th generation (5G) mobile communication technologies define broad frequency bands to provide higher transmission rates and new services, and can be implemented in "Sub 6 GHz" bands such as 3.5 GHz, and also in "above 6 GHz" bands, which may be referred to as mmWave bands including 28 GHz and 39 GHz. In addition, the implementation of 6th generation 6G mobile communication technologies (e.g., beyond 5G systems) in terahertz bands (e.g., 95 GHz to 3 THz bands) has been proposed in order to achieve transmission rates fifty times faster than 5G mobile communication technologies and ultra-low latencies one-tenth of 5G mobile communication technologies.

Since the beginning of the development of 5G mobile communication technologies, in order to support various services and to satisfy performance requirements in connection with enhanced mobile broadband (eMBB), ultra reliable low latency communications (URLLC), and massive machine-type communications (mMTC), there has been ongoing standardization regarding beamforming and massive multi-input multi-output (MIMO) for mitigating radio-wave path loss and increasing radio-wave transmission distances in mmWave, supporting numerologies (e.g., operating multiple subcarrier spacings (SC S s)) for efficiently utilizing mmWave resources and dynamic operation of slot formats, initial access technologies for supporting multi-beam transmission and broadbands, definition and operation of a bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio (NR)-Unlicensed (U) aimed at system operations conforming to various regulation-related requirements in unlicensed bands, NR UE power saving, non-terrestrial network (NTN), which is UE-satellite direct communication for providing coverage in an area in which communication with terrestrial networks is unavailable, and positioning.

There has also been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR).

There also has been ongoing standardization in system architecture/service regarding a 5G baseline architecture (e.g., service based architecture or service based interface) for combining network functions virtualization (NFV) and software-defined networking (SDN) technologies, and mobile edge computing (MEC) for receiving services based on UE positions.

As 5G mobile communication systems are commercialized, an exponentially increasing number of connected devices will be connected to communication networks, and it is expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR), etc., 5G performance improvement and complexity reduction by utilizing artificial intelligence (AI) and machine learning (ML), AI service support, metaverse service support, and drone communication.

Such development of 5G mobile communication systems will serve as a basis for developing new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), and also full-duplex technologies for increasing frequency efficiency of 6G mobile communication technologies and improving system networks, AI-based communication technologies for implementing system optimization by utilizing satellites and AI from the design stage and internalizing end-to-end AI support functions, and next-generation distributed computing technologies for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Various embodiments disclosed herein provide a method and an apparatus for effectively providing a service in mobile communication systems.

Aspects of the disclosure are to address at least the above-mentioned problems.

The present disclosure has been made to address the above-mentioned problems and disadvantages, and to provide at least the advantages described below.

In accordance with an aspect of the present disclosure, a method performed by a terminal in a communication system is provided. The method includes receiving, from a base station, configuration information on an enhanced demodulation reference signal (DMRS) for a physical downlink shared channel (PDSCH); receiving, from the base station, downlink control information (DCI) scheduling the PDSCH, the DCI including antenna port information associated with the enhanced DMRS; and receiving, from the base station, downlink data and the enhanced DMRS on the PDSCH based on the DCI, wherein, in case that the enhanced DMRS corresponds to an enhanced DMRS type 1, the enhanced DMRS is capable of supporting up to 16 antenna ports based on a frequency domain (FD)-orthogonal cover code (OCC) of length 4, and wherein, in case that the enhanced DMRS corresponds to an enhanced DMRS type 2, the enhanced DMRS is capable of supporting up to 24 antenna ports based on the FD-OCC of length 4.

In accordance with another aspect of the present disclosure, a method performed by a base station in a communication system is provided, the method includes transmitting, to a terminal, configuration information on an enhanced demodulation reference signal (DMRS) for a physical downlink shared channel (PDSCH); transmitting, to the terminal, downlink control information (DCI) scheduling the PDSCH, the DCI including antenna port information associated with the enhanced DMRS; and transmitting, to the terminal, downlink data and the enhanced DMRS on the PDSCH, wherein, in case that the enhanced DMRS corresponds to an enhanced DMRS type 1, the enhanced DMRS is capable of supporting up to 16 antenna ports based on a frequency domain (FD)-orthogonal cover code (OCC) of length 4, and wherein, in case that the enhanced DMRS corresponds to an enhanced DMRS type 2, the enhanced DMRS is capable of supporting up to 24 antenna ports based on the FD-OCC of length 4.

In accordance with another aspect of the present disclosure, a terminal in a communication system is provided. The terminal includes a transceiver and a controller coupled with the transceiver and configured to receive, from a base station, configuration information on an enhanced demodulation reference signal (DMRS) for a physical downlink shared channel (PDSCH), receive, from the base station, downlink control information (DCI) scheduling the PDSCH, the DCI including antenna port information associated with the enhanced DMRS, and receive, from the base station, downlink data and the enhanced DMRS on the PDSCH based on the DCI, wherein, in case that the enhanced DMRS corresponds to an enhanced DMRS type 1, the enhanced DMRS is capable of supporting up to 16 antenna ports based on a frequency domain (FD)-orthogonal cover code (OCC) of length 4, and wherein, in case that the enhanced DMRS corresponds to an enhanced DMRS type 2, the enhanced DMRS is capable of supporting up to 24 antenna ports based on the FD-OCC of length 4.

In accordance with another aspect of the present disclosure, a base station in a communication system is provided. The base station includes a transceiver and a controller coupled with the transceiver and configured to transmit, to a terminal, configuration information on an enhanced demodulation reference signal (DMRS) for a physical downlink shared channel (PDSCH), transmit, to the terminal, downlink control information (DCI) scheduling the PDSCH, the DCI including antenna port information associated with the enhanced DMRS, and transmit, to the terminal, downlink data and the enhanced DMRS on the PDSCH, wherein, in case that the enhanced DMRS corresponds to an enhanced DMRS type 1, the enhanced DMRS is capable of supporting up to 16 antenna ports based on a frequency domain (FD)-orthogonal cover code (OCC) of length 4, and wherein, in case that the enhanced DMRS corresponds to an enhanced DMRS type 2, the enhanced DMRS is capable of supporting up to 24 antenna ports based on the FD-OCC of length 4.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10 illustrates an example of a frequency axis resource allocation for a PDSCH in a wireless communication system according to an embodiment of the disclosure;

FIG. 15 illustrates an example of an antenna port configuration and resource allocation for cooperative communication in a wireless communication system according to an embodiment of the disclosure;

DETAILED DESCRIPTION

Figure 1:
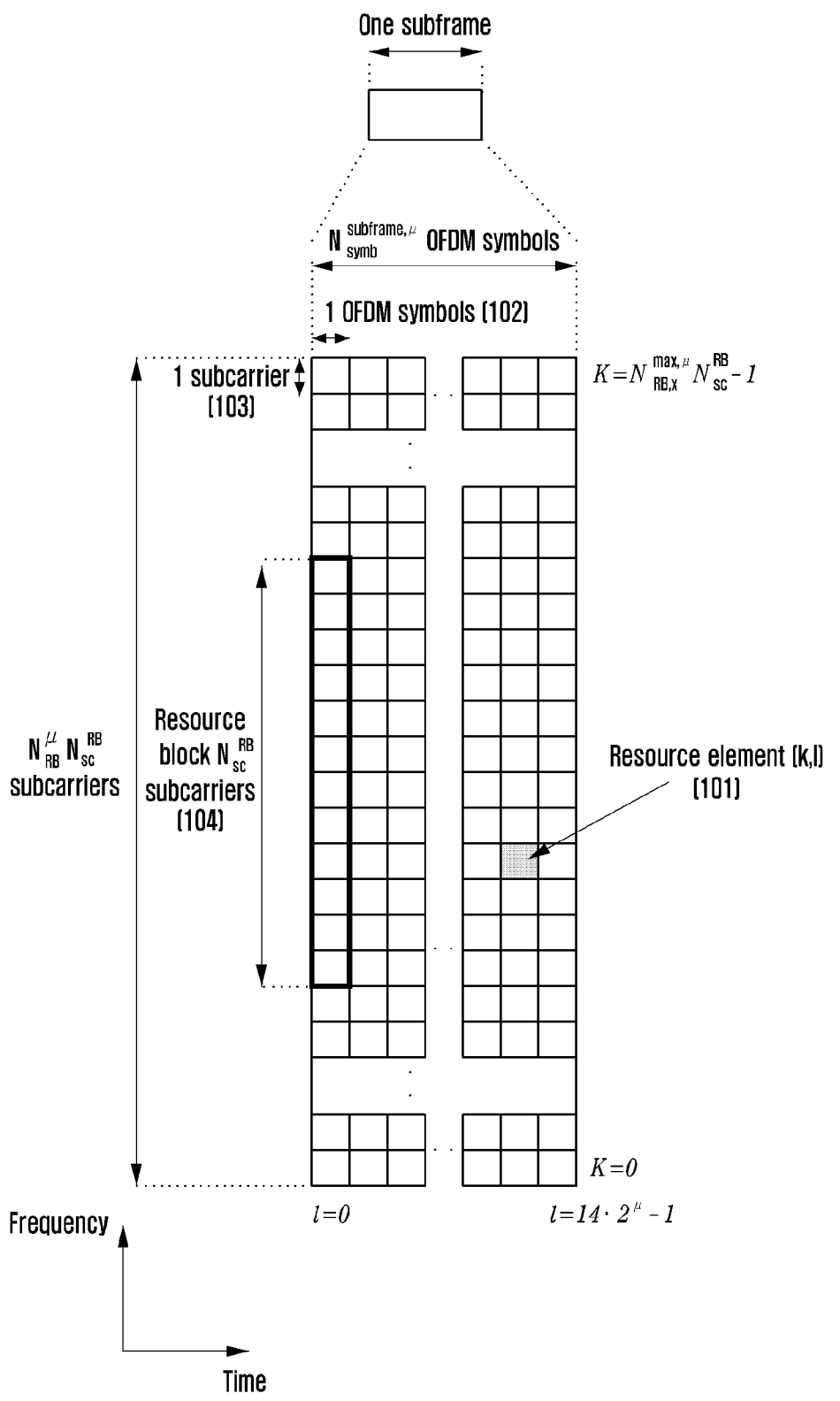
FIG. 1 illustrates a basic structure of a time-frequency domain in a wireless communication system according to an embodiment of the disclosure.

FIGS. 1 through 25, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing the embodiments, descriptions related to technical contents well-known in the relevant art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Furthermore, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Furthermore, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card. Furthermore, according to some embodiments, the "unit" may include one or more processors.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) (or a mobile station (MS)) transmits data or control signals to a base station (BS) (eNode B), and the downlink indicates a radio link through which the base station transmits data or control signals to the UE. The above multiple access scheme may separate data or control information of respective users by allocating and operating time-frequency resources for transmitting the data or control information for each user so as to avoid overlapping each other, that is, so as to establish orthogonality.

Since a 5G communication system, which is a post-LTE communication system, may freely reflect various requirements of users, service providers, and the like, services satisfying various requirements may be supported. The services considered in the 5G communication system include enhanced mobile broadband (eMBB) communication, massive machine-type communication (mMTC), ultra-reliability low-latency communication (URLLC), and the like.

eMBB aims at providing a data rate higher than that supported by existing LTE, LTE-A, or LTE-Pro. For example, in the 5G communication system, eMBB may provide a peak data rate of 20 Gbps in the downlink and a peak data rate of 10 Gbps in the uplink for a single base station. Furthermore, the 5G communication system may provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it may support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC may be configured to be inexpensive, and may require a very long battery life-time such as 10 to 15 years because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC may provide communication with ultra-low latency and ultra-high reliability. For example, a service supporting URLLC may satisfy an air interface latency of less than 0.5 ms, and also requires a packet error rate of 10-5 or less. Therefore, for the services supporting URLLC, a 5G system may provide a transmit time interval (TTI) shorter than those of other services, and also may require a design for assigning a large number of resources in a frequency band in order to secure reliability of a communication link.

The three 5G services, that is, eMBB, URLLC, and mMTC, may be multiplexed and transmitted in a single system. In this case, different transmission/reception techniques and transmission/reception parameters may be used between services in order to satisfy different requirements of the respective services. Of course, 5G is not limited to the above-described three services.

[NR Time-Frequency Resource]

Hereinafter, a frame structure of a 5G system will be described in detail with reference to the drawings.

FIG. 1 illustrates a basic structure of a time-frequency domain, which is a radio resource area in which a data or a control channel is transmitted in a 5G system.

In FIG. 1, a horizontal axis indicates a time domain, and a vertical axis indicates a frequency domain. A basic unit of a resource in the time-frequency domain is a resource element (RE) 101 and may be defined as one orthogonal frequency division multiplexing (OFDM), 102 in the time axis and one subcarrier 103 in the frequency axis. In the frequency domain, $N_{sc}^{RB}$ (for example, 12) consecutive REs may constitute one resource block (RB) 104.

Figure 2:
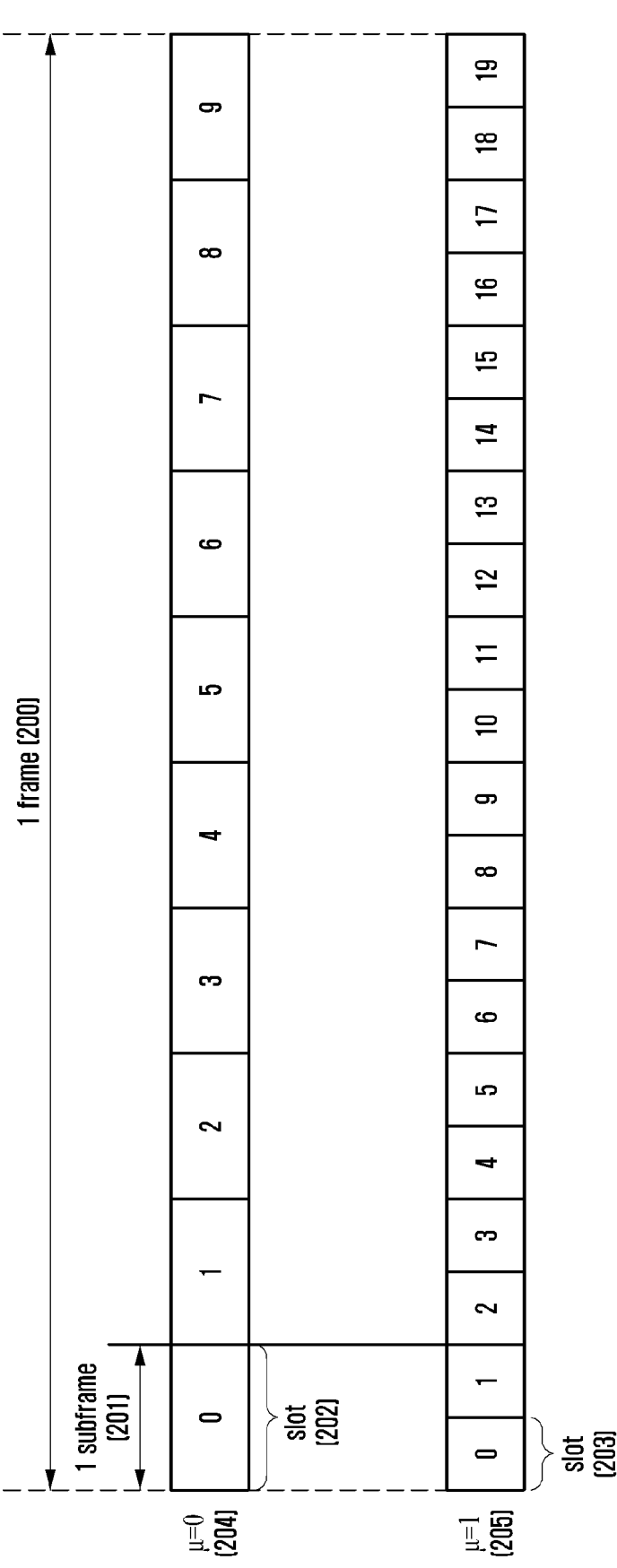
FIG. 2 illustrates a structure of a frame, a subframe, and a slot in a wireless communication system according to an embodiment of the disclosure.

FIG. 2 illustrates a structure of a frame, a subframe, and a slot in a wireless communication system according to an embodiment of the disclosure.

In FIG. 2, an example of a structure including a frame 200, a subframe 201, and a slot 202 is illustrated. One frame 200 may be defined as 10 ms. One subframe 201 may be defined as 1 ms, and accordingly, one frame 200 may include a total of 10 subframes 201. One slot 202 or 203 may be defined as 14 OFDM symbols (that is, the number of symbols per slot ($N_{symb}^{slot}$)=14). One subframe 201 may include one or multiple slots 202 and 203, and the number of slots 202 and 203 per subframe 201 may vary according to a configuration value μ (204 or 205) for subcarrier spacing. An example of FIG. 2 shows a case in which the subcarrier spacing configuration value corresponds to μ=0 (204) and a case in which the subcarrier spacing configuration value corresponds to μ=1 (205). In the case of μ=0 (204), one subframe 201 may include one slot 202, and, in the case of μ=1 (205), one subframe 201 may include two slots 203. That is, the number $$(N_{slot}^{subframe,\mu})$$

of slots per subframe may vary according to the configuration value μ for subcarrier spacing, and accordingly, the number $$(N_{slot}^{frame,\mu})$$

of slots per frame may also vary.

$$N_{slot}^{subframe,\mu}$$

and $$N_{slot}^{frame,\mu}$$

according to each subcarrier spacing configuration μ may be defined as shown in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

[Bandwidth Part (BWP)]

A bandwidth part (BWP) configuration in a 5G communication system will be described in detail with reference to drawings.

Figure 3:
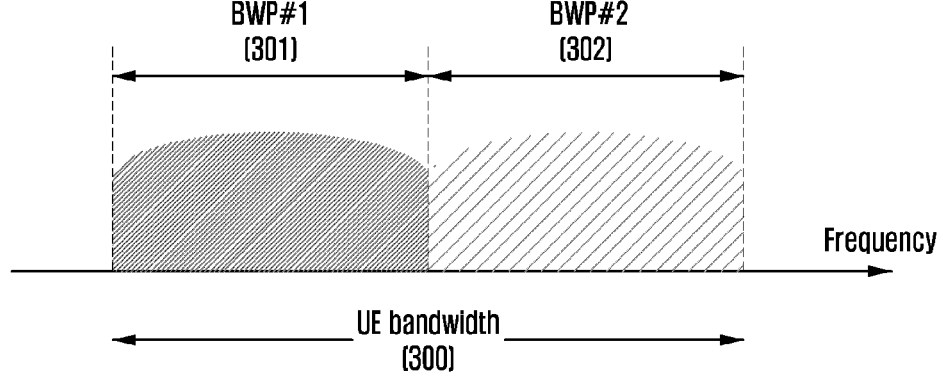
FIG. 3 illustrates an example of a bandwidth part configuration in a wireless communication system according to an embodiment of the disclosure.

FIG. 3 illustrates an example of a bandwidth part configuration in a wireless communication system according to an embodiment of the disclosure.

FIG. 3 shows an example in which a UE bandwidth 300 is configured of two bandwidth parts, that is, bandwidth part #1 (BWP #1) 301 and bandwidth part #2 (BWP #2) 302. The base station may configure one or multiple bandwidth parts to the UE, and may configure information below for each bandwidth part.

TABLE 2

| BWP ::= | SEQUENCE { |
|---|---|
| bwp-Id | BWP-Id, |
| (Bandwidth part identity) | |
| locationAndBandwidth | INTEGER (1..65536), |
| (Bandwidth part location) | |
| subcarrierSpacing | ENUMERATED {n0, n1, n2, n3, |
| n4, n5}, | |
| (Subcarrier spacing) | |
| cyclicPrefix | ENUMERATED { extended } |
| (Cyclic prefix) | |
| } | |

Of course, without limitation to the examples described above, various parameters regarding a bandwidth part may be configured to the UE in addition to the configuration information. The information may be transferred to the UE by the base station through higher layer signaling, for example, radio resource control (RRC). Among one or multiple configured bandwidth parts, at least one bandwidth part may be activated. Information indicating whether the configured bandwidth parts is activated may be semi-stati-cally transferred from the base station to the UE through RRC signaling or may be dynamically transferred through downlink control information (DCI).

According to some embodiments, the UE before the RRC connection may receive a configuration of an initial BWP for initial access from the base station through a master infor-mation block (MIB). More specifically, the UE may receive configuration information for a control region (control resource set (CORESET)) and a search space in which a PDCCH for receiving system information (possibly corre-sponding to remaining system information (RMSI) or sys-tem information block 1 (SIB1)) required for initial access through the MIB may be transmitted in an initial access step. Each of the control region and the search space configured through the MIB may be considered as an identity (ID) 0. The base station may inform the UE of configuration infor-mation such as frequency allocation information for control region #0, time allocation information, numerology, and the like through the MIB. Furthermore, the base station may inform the UE of configuration information for a monitoring period and an occasion of control region #0, that is, con-figuration information for search space #0 through the MIB. The UE may consider a frequency region configured as control region #0 acquired from the MIB as an initial bandwidth part for initial access. Here, the ID of the initial BWP may be considered as 0. The UE may receive a physical downlink shared channel (PDSCH) through which a SIB is transferred through the configured initial bandwidth part. The initial bandwidth part may be used not only for reception of the SIB but also used for other system infor-mation (OSI), paging, or random access.

[Bandwidth Part (BWP) Change]

In case that one or multiple bandwidth parts are config-ured in the UE, the base station may indicate a change (or switching or transition) in the bandwidth parts to the UE through a bandwidth part indicator field within the DCI. For example, in FIG. 3, when a currently activated bandwidth part of the UE is bandwidth part #1 301, the base station may indicate bandwidth part #2 302 to the UE through a band-width part indicator within DCI and the UE may make a bandwidth part changing to bandwidth part #2 302 indicated by the received bandwidth part indicator within DCI.

[SS/PBCH Block]

Subsequently, a synchronization signal (SS)/PBCH block in 5G to is described.

An SS/PBCH block may correspond to a physical layer channel block including a primary SS (PSS), a secondary SS (SSS), and a PBCH. A detailed description thereof is given below.

PSS: is a signal which is a reference of downlink time/ frequency synchronization and provides partial infor-mation of a cell ID.

SSS: is a reference of downlink time/frequency synchro-nization and provides the remaining cell ID information which is not provided by the PSS. Additionally, the SSS may serve as a reference signal for demodulation of a PBCH.

PBCH: provides essential system information necessary for the UE to transmit and receive a data channel and a control channel. The essential system information may include search space-related control information indicating radio resource mapping information for a control channel and scheduling control information for a separate data channel for transmitting system infor-mation.

SS/PBCH block: includes a combination of PSS, SSS, and PBCH. One or multiple SS/PBCH blocks may be transmitted within a time of 5 ms, and each of the transmitted SS/PBCH blocks may be distinguished with an index.

The UE may detect the PSS and the SSS in an initial access stage and decode the PBCH. The UE may acquire an MIB from the PBCH and receive a configuration of control region (control resource set (CORESET)) #0 (corresponding to a control region having control region index 0) therefrom. The UE may monitor control region #0 based on the assumption that the selected SS/PBCH block and a demodu-lation reference signal (DMRS) transmitted in control region #0 are quasi co-located (QCLed). The UE may receive system information through downlink control information transmitted in control region #0. The UE may acquire configuration information related to a random access chan-nel (RACH) required for initial access from the received system information. The UE may transmit a physical RACH (PRACH) to the base station in consideration of the selected SS/PBCH block index, and the base station having received the PRACH may acquire the SS/PBCH block index selected by the UE. The base station may know which block is selected by the UE from among the SS/PBCH blocks and that control region #0 related thereto is monitored.

[PDCCH: In Relation to DCI]

Next, downlink control information (DCI) in the 5G system will be described in detail.

In the 5G system, scheduling information on uplink data (or a physical uplink shared channel (PUSCH)) or downlink data (or a physical downlink shared channel (PDSCH)) is transferred through DCI from a base station to a UE. The UE may monitor a fallback DCI format and a non-fallback DCI format for the PUSCH or the PDSCH. The fallback DCI format may be configured with a fixed field pre-defined between the base station and the UE, and the non-fallback DCI format may include a configurable field.

DCI may go through a channel coding and modulation process, and then be transmitted through a physical down-link control channel (PDCCH). A cyclic redundancy check (CRC) may be attached to a DCI message payload, and the CRC may be scrambled by a radio network temporary identifier (RNTI) corresponding to the identity of the UE. Different types of RNTIs may be used according to the purpose of a DCI message, for example, UE-specific (UE-specific) data transmission, a power control command, a random access response, or the like. That is, an RNTI may not be explicitly transmitted, and may be transmitted after being included in a CRC calculation process. If the UE has received a DCI message transmitted on a PDCCH, the UE may identify a CRC by using an allocated RNTI, and if a CRC identification result is correct, the UE may identify that the message has been transmitted to the UE. The RNTI may be changed depending on the use of DCI.

DCI format 0_0 may be used for fallback DCI scheduling a PUSCH, and in this case, a CRC may be scrambled by a C-RNTI. DCI format 0_0 having a CRC scrambled by a C-RNTI may include, for example, the information below.

TABLE 3

Identifier for DCI formats - [1] bit
Frequency domain resource assignment -[ ] bits
Time domain resource assignment - X bits
Frequency hopping flag- 1 bit.
Modulation and coding scheme- 5 bits
New data indicator- 1 bit

TABLE 3-continued

Redundancy version- 2 bits
HARQ process number- 4 bits
TPC command for scheduled PUSCH - [2] bits
UL/SUL indicator - 0 or 1 bit DCI format 0_1 may be used for non-fallback DCI scheduling a PUSCH, and in this case, a CRC may be scrambled by a C-RNTI. DCI format 0_1 having a CRC scrambled by a C-RNTI may include, for example, the information below.

TABLE 4

Carrier indicator- 0 or 3 bits
UL/SUL indicator - 0 or 1 bit
Identifier for DCI formats - [1] bits
Bandwidth part indicator- 0, 1 or 2 bits
Frequency domain resource assignment
For resource allocation type 0, bits
For resource allocation type 1, bits
Time domain resource assignment -1, 2, 3, or 4 bits
VRB-to-PRB mapping- 0 or 1 bit, only for resource allocation type 1.
0 bit if only resource allocation type 0 is configured;
1 bit otherwise.
Frequency hopping flag - 0 or 1 bit, only for resource allocation type 1.
0 bit if only resource allocation type 0 is configured;
1 bit otherwise.
Modulation and coding scheme - 5 bits
New data indicator - 1 bit
Redundancy version - 2 bits
HARQ process number - 4 bits
1st downlink assignment index- 1 or 2 bits
1 bit for semi-static HARQ-ACK codebook;
2 bits for dynamic HARQ-ACK codebook with single HARQ-ACK codebook.
2nd downlink assignment index - 0 or 2 bits
2 bits for dynamic HARQ-ACK codebook with two HARQ-ACK sub-codebooks;
0 bit otherwise.
TPC command for scheduled PUSCH - 2 bits
SRS resource indicator - or bits
bits for non-codebook based PUSCH transmission;
bits for codebook based PUSCH transmission.
Precoding information and number of layers-up to 6 bits
Antenna ports - up to 5 bits
SRS request- 2 bits
CSI request - 0, 1, 2, 3, 4, 5, or 6 bits
CBG transmission information- 0, 2, 4, 6, or 8 bits
PTRS-DMRS association- 0 or 2 bits.
beta offset indicator- 0 or 2 bits
DMRS sequence initialization- 0 or 1 bit DCI format 1_0 may be used for fallback DCI scheduling a PDSCH, and in this case, a CRC may be scrambled by a C-RNTI. DCI format 1_0 having a CRC scrambled by a C-RNTI may include, for example, the information below.

TABLE 5

Identifier for DCI formats - [1] bit
Frequency domain resource assignment -[ ] bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator- 3 bits
PDSCH-to-HARQ feedback timing indicator- [3] bits DCI format 1_1 may be used for non-fallback DCI scheduling a PDSCH, and in this case, a CRC may be scrambled by a C-RNTI. DCI format 1_1 having a CRC scrambled by a C-RNTI may include, for example, the information below.

TABLE 6

Carrier indicator - 0 or 3 bits
Identifier for DCI formats - [1] bits
Bandwidth part indicator - 0, 1 or 2 bits
Frequency domain resource assignment
For resource allocation type 0, bits
For resource allocation type 1, bits
Time domain resource assignment -1, 2, 3, or 4 bits
VRB-to-PRB mapping - 0 or 1 bit, only for resource allocation type 1.
0 bit if only resource allocation type 0 is configured;
1 bit otherwise.
PRB bundling size indicator - 0 or 1 bit
Rate matching indicator- 0, 1, or 2 bits
ZP CSI-RS trigger- 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ feedback timing indicator - 3 bits
Antenna ports - 4, 5 or 6 bits
Transmission configuration indication- 0 or 3 bits
SRS request - 2 bits
CBG transmission information - 0, 2, 4, 6, or 8 bits
CBG flushing out information- 0 or 1 bit
DMRS sequence initialization - 1 bit

[PDCCH: CORESET, REG, CCE, Search Space]

The downlink control channel in the 5G communication system will be described below in more detail with reference to the drawings.

Figure 4:
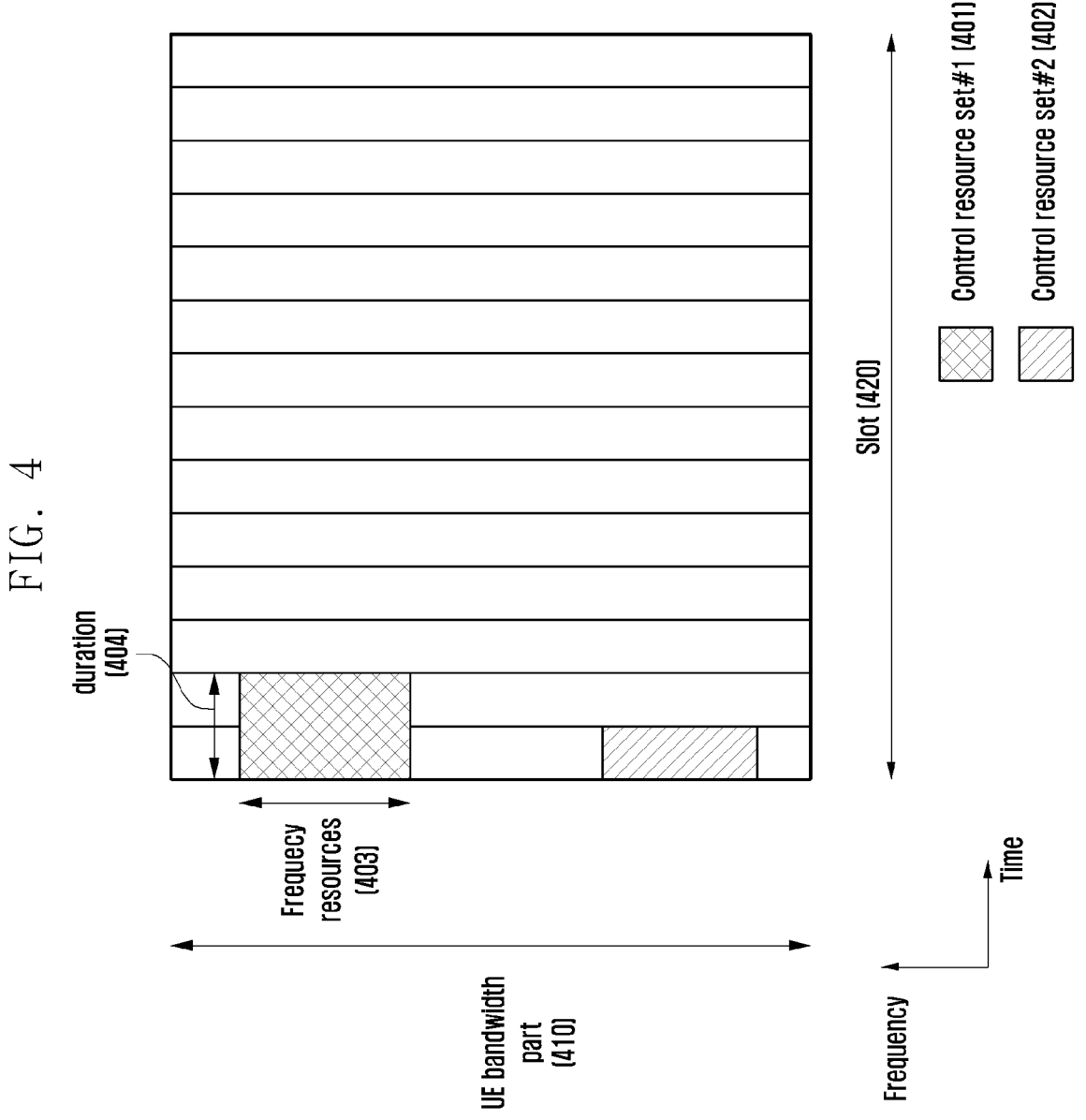
FIG. 4 illustrates an example of a control region configuration of a downlink control channel in a wireless communication system according to an embodiment of the disclosure.

FIG. 4 illustrates an example of a control region (control resource set (CORESET)) through which a downlink control channel is transmitted in the 5G wireless communication system. FIG. 4 illustrates an example in which a UE bandwidth part 410 is configured in the frequency axis and two control regions (control region #1 401 and control region #2 402) are configured within one slot 420 in the time axis. The control regions 401 and 402 may be configured in a specific frequency resource 403 within the entire UE bandwidth part 410 on the frequency axis. The control region may be configured as one or multiple OFDM symbols in the time axis, which may be defined as a control region duration (control resource set duration) 404. Referring to the example illustrated in FIG. 4, control region #1 401 may be configured as a control region duration of 2 symbols, and control region #2 402 may be configured as a control region duration of 1 symbol.

The aforementioned control region in 5G may be configured in the UE by the base station via higher layer signaling (e.g., system information, an MIB, and RRC signaling). Configuring a control region in a UE refers to providing information, such as an identity of the control region, a frequency position of the control region, and a symbol length of the control region. For example, information in Table 7 below may be included.

TABLE 7

```
ControlResourceSet ::=                    SEQUENCE {
     -- Corresponds to L1 parameter 'CORESET-ID'
     controlResourceSetId              ControlResourceSetId,
   (control resource set identity)
        frequency DomainResources      BIT STRING (SIZE
(45)),
     (frequency axis resource allocation information)
        duration                       INTEGER
(1..maxCoReSetDuration),
     (time axis resource allocation information)
        cce-REG-MappingType
        CHOICE {
   (CCE-to-REG mapping scheme)
           interleaved
           SEQUENCE {
              reg-BundleSize
           ENUMERATED {n2, n3, n6},
        (REG bundle size)
              precoderGranularity
           ENUMERATED {sameAsREG-bundle, allContiguousRBs},
              interleaverSize
           ENUMERATED {n2, n3, n6}
              (interleaver size)
              shiftIndex
           INTEGER(0..maxNrofPhysicalResourceBlocks-1)
                 OPTIONAL
                 (interleaver shift)
     },
        nonInterleaved               NULL
        },
        tci-StatesPDCCH
        SEQUENCE(SIZE (1..maxNrofTCI-StatesPDCCH)) OF TCI-
        StateId
           OPTIONAL,
   (QCL configuration information)
        tci-PresentInDCI             ENUMERATED
{enabled}
              OPTIONAL,   -- Need S

}
```

In Table 7, tci-StatesPDCCH (simply, referred to as a transmission configuration indication (TCI) state) configuration information may include information on one or multiple synchronization signal (SS)/physical broadcast channel (PBCH) block indexes or channel state information reference signal (CSI-RS) indexes having the quasi co-located (QCL) relationship with a DMRS transmitted in the corresponding control region.

Figure 5:
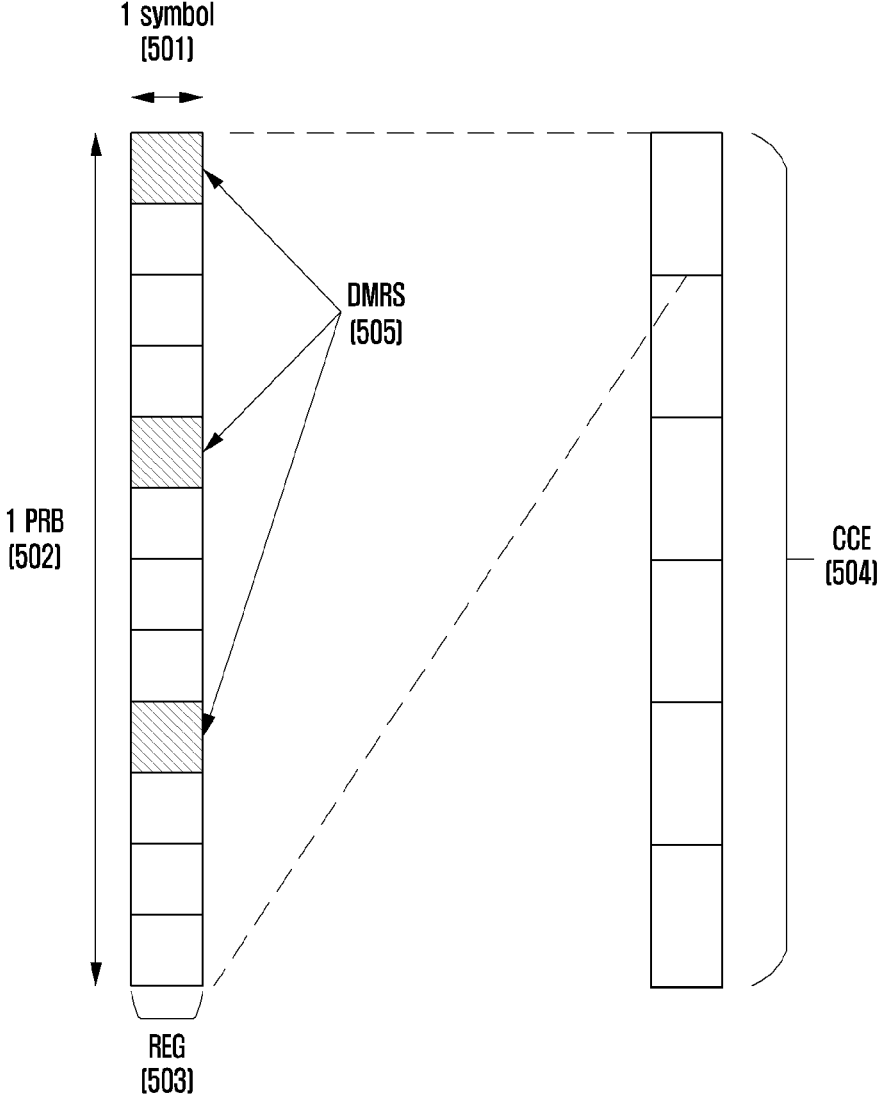
FIG. 5 illustrates a structure of a downlink control channel in a wireless communication system according to an embodiment of the disclosure.

FIG. 5 illustrates an example of a basic unit of time-and-frequency resources constituting a downlink control channel that may be used in the 5G. Referring to FIG. 5, the basic unit of time and frequency resources included in the control channel may be referred to as a resource element group (REG) 503, and the REG 503 may be defined as one OFDM symbol 501 in the time axis and one physical resource block (PRB) 502 in the frequency axis, that is, as 12 subcarriers. The base station may configure a downlink control channel allocation unit by concatenating the REGs 503.

As illustrated in FIG. 5, if the basic unit in which the downlink control channel is allocated in the 5G system is a control channel element (CCE) 504, one CCE 504 may consist of multiple REGs 503. Taking the REG 503 illustrated in FIG. 5 as an example, the REG 503 may include 12

REs and, when 1 CCE 504 includes 6 REGs 503, 1 CCE 504 may include 72 REs. In case that a downlink control region is configured, the corresponding region may include multiple CCEs 504, and a specific downlink control channel may be mapped to one or multiple CCEs 504 according to an aggregation level (AL) within the control region and then transmitted. CCEs 504 within the control region may be distinguished by numbers and the numbers of the CCEs 504 may be assigned according to a logical mapping scheme.

The basic unit REG 503 of a downlink control channel shown in FIG. 5 may include both REs to which DCI is mapped and an area to which a DMRS 505 corresponding to a reference signal for decoding the REs are mapped. As shown in FIG. 5, 3 DMRSs 505 may be transmitted within 1 REG 503. The number of CCEs required to transmit a PDCCH may be 1, 2, 4, 8, or 16 depending on an aggregation level (AL), and different numbers of CCEs may be used to implement link adaptation of the downlink control channel. For example, in case that AL=L, a single downlink control channel may be transmitted via L CCEs. The UE needs to detect a signal without knowing information on the downlink control channel, wherein a search space representing a set of CCEs is defined for blind decoding. The search space is a set of downlink control channel candidates including CCEs, for which the UE needs to attempt decoding on a given aggregation level, and since there are various aggregation levels that make one bundle with 1, 2, 4, 8, or 16 CCEs, the UE may have multiple search spaces. The search space set may be defined to be a set of search spaces at all configured aggregation levels.

The search space may include a common search space and a UE-specific search space. A certain group of UEs or all UEs may monitor a common search space of a PDCCH in order to receive cell-common control information, such as a paging message or dynamic scheduling for system information. For example, PDSCH scheduling allocation information for transmission of an SIB including cell operator information, etc. may be received by monitoring the common search space of the PDCCH. Since a certain group of UEs or all UEs need to receive the PDCCH, the common search space may be defined as a set of predetermined CCEs. Scheduling allocation information for a UE-specific PDSCH or PUSCH may be received by monitoring a UE-specific search space of the PDCCH. The UE-specific search space may be defined UE-specifically, based on an identity of the UE and functions of various system parameters.

In 5G, a parameter for a search space for a PDCCH may be configured for the UE by the base station through higher layer signaling (e.g., an SIB, an MIB, and RRC signaling). For example, the base station may configure, for the UE, the number of PDCCH candidates of each aggregation level L, a monitoring periodicity for a search space, a monitoring occasion in units of symbols in a slot for the search space, a search space type (common search space or UE-specific search space), a combination of an RNTI and a DCI format, which is to be monitored in the search space, a control region index for monitoring of the search space, etc. For example, information in Table 8 below may be included.

TABLE 8

```
Search Space ::=                    SEQUENCE {
     -- Identity of the search space. SearchSpaceId = 0 identifies the SearchSpace
configured via PBCH (MIB) or ServingCellConfigCommon.
        search SpaceId
        SearchSpaceId,
```

TABLE 8-continued

```
(search space identifier)
        controlResourceSetId                      ControlResourceSetId,
(control resource set identifier)
        monitoringSlotPeriodicityAndOffset        CHOICE {
(monitoring slot level period)
            sl1
            NULL,
            sl2
            INTEGER (0..1),
            sl4
            INTEGER (0..3),
            sl5
        INTEGER (0..4),
            sl8
          INTEGER (0..7),
            sl10
        INTEGER (0..9),
            sl16
        INTEGER (0..15),
            sl20
        INTEGER (0..19)
        }
        OPTIONAL,
    duration (monitoring length)      INTEGER (2 .. 2559)
        monitoringSymbolsWithinSlot               BIT STRING
(SIZE (14))
                OPTIONAL,
(monitoring symbol within slot)
        nrofCandidates                            SEQUENCE {
(number of PDCCH candidates at each aggregation level)
        aggregationLevel1
        ENUMERATED {n0, n1, n2, n3, n4, n5, n6, n8},
            aggregationLevel2
        ENUMERATED {n0, n1, n2, n3, n4, n5, n6, n8},
            aggregationLevel4
        ENUMERATED {n0, n1, n2, n3, n4, n5, n6, n8},
            aggregationLevel8
        ENUMERATED {n0, n1, n2, n3, n4, n5, n6, n8},
            aggregationLevel16
        ENUMERATED {n0, n1, n2, n3, n4, n5, n6, n8}
        },
        search SpaceType                          CHOICE {
        (search space type)
            -- Configures this search space as common search space (CSS) and DCI
formats to monitor.
            common
        SEQUENCE {
        (common search space)
        }
            ue-Specific
        SEQUENCE {
        (UE-specific search space)
            -- Indicates whether the UE monitors in this USS for DCI formats 0-
0 and 1-0 or for formats 0-1 and 1-1.
            formats
        ENUMERATED {formats0-0-And-1-0, formats0-1-And-1-1},
            ...
        }
```

According to configuration information, the base station may configure one or multiple search space sets in the UE. According to some embodiments, the base station may configure search space set 1 and search space 2 in the UE, and the configuration may be performed such that DCI format A scrambled by an X-RNTI in search space set 1 is monitored in the common search space and DCI format B scrambled by a Y-RNTI in search space set 2 is monitored in the UE-specific search space.

According to the configuration information, one or multiple search space sets may exist in the common search space or the UE-specific search space. For example, search space set #1 and search space set #2 may be configured to be a common search space, and search space set #3 and search space set #4 may be configured to be a UE-specific search space.

In the common search space, the following combinations of DCI formats and RNTIs may be monitored. Of course, the disclosure is not limited to the following examples:

DCI format 0_0/1_0 with CRC scrambled by C-RNTI, CS-RNTI, SP-CSI-RNTI, RA-RNTI, TC-RNTI, P-RNTI, SI-RNTI;

DCI format 2_0 with CRC scrambled by SFI-RNTI;

DCI format 2_1 with CRC scrambled by INT-RNTI;

DCI format 2_2 with CRC scrambled by TPC-PUSCH-RNTI, TPC-PUCCH-RNTI; and

DCI format 2_3 with CRC scrambled by TPC-SRS-RNTI.

In the UE-specific search space, the following combinations of DCI formats and RNTIs may be monitored. Of course, the disclosure is not limited to the following examples:

DCI format 0_0/1_0 with CRC scrambled by C-RNTI, CS-RNTI, TC-RNTI; and

DCI format 1_0/1_1 with CRC scrambled by C-RNTI, CS-RNTI, TC-RNTI.

The specified RNTIs may follow the definitions and uses below:

Cell RNTI (C-RNTI): For UE-specific PDSCH scheduling;

Temporary cell RNTI (TC-RNTI): For UE-specific PDSCH scheduling;

Configured scheduling RNTI (CS-RNTI): For semi-statically configured UE-specific PDSCH scheduling;

Random-Access RNTI (RA-RNTI): For PDSCH scheduling during random-access;

Paging RNTI (P-RNTI): For scheduling PDSCH on which paging is transmitted;

System Information RNTI (SI-RNTI): For scheduling PDSCH on which system information is transmitted;

Interruption RNTI (INT-RNTI): For indicating whether to puncture PDSCH;

Transmit power control for PUSCH RNTI (TPC-PUSCH-RNTI): For indicating power control command for PUSCH;

Transmit power control for PUCCH RNTI (TPC-PUCCH-RNTI): For indicating power control command for PUCCH; and/or Transmit power control for SRS RNTI (TPC-SRS-RNTI): For indicating power control command for SRS.

The specified DCI formats described above may conform to the following definition.

TABLE 9

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, a control region p and a search space of aggregation level L in control resource set s may be expressed as Equation 1 below.

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{CCE,p}}{L} \right\rfloor \right\} + i \qquad \text{[Equation 1]}$$

L: aggregation level;

$n_{CI}$: carrier index;

$N_{CCE,p}$: total number of CCEs existing within control resource set p;

$n_{s,f}^{\mu}$:

slot index;

$M_{s,max}^{(L)}$:

number of PDCCH candidates at aggregation level L;

$m_{s,n_{CI}} = 0, \ldots ,$ $M_{s,max}^{(L)} - 1$:

PDCCH candidate index of aggregation level L; i=0, . . . , L-1;

$$Y_{p,n_{s,f}^{\mu}} = \left( A_p \cdot Y_{p,n_{s,f}^{\mu}-1} \right) \bmod D,$$

$Y_{p,-1} = n_{RNTI} \neq 0$, $A_p = 19829$ for p mod 3=0, $A_p = 39839$ for p mod 3=1, $A_p = 39827$ for p mod 3=2, D=65537;

$n_{RNTI}$: UE identity; and $Y_{p,n_{s,f}^{\mu}}$ value may correspond to 0 in the case of the common search space.

$Y_{p,n_{s,f}^{\mu}}$ value may correspond to a value varying depending on a UE identity (a C-RNTI or an ID configured in the UE by the base station) and a time index in the case of the UE-specific search space.

Since multiple search space sets may be configured as different parameters (e.g., the parameters in Table 9) in 5G, a search space set which the UE monitors may be different each time. For example, in case that search space set #1 is configured on an X-slot period, search space set #2 is configured on a Y-slot period, and X and Y are different from each other, the UE may monitor all of search space set #1 and search space set #2 in a specific slot and monitor one of search space set #1 and search space set #2 in another specific slot.

[QCL, TCI State]

In the wireless communication system, one or more different antenna ports (or replaced with one or more channels, signals, and combinations thereof, but commonly referred to as different antenna ports for convenience in the following description of the disclosure) may be associated with each other by a quasi co-location (QCL) configuration shown in [Table 10] below. The TCI state is to inform of a QCL relation between a PDCCH (or a PDCCH DMRS) and another RS or channel, and a reference antenna port A (reference RS #A) and another purpose antenna port B (target RS #B) which are quasi co-located (QCLed) means that the UE is allowed to apply some or all of large-scale channel parameters estimated in the antenna port A to channel measurement from the antenna port B. The QCL is required to correlate different parameters according to 1) time tracking influenced by an average delay and a delay spread, 2) frequency tracking influenced by a Doppler shift and a Doppler spread, 3) radio resource management (RRM) influenced by an average gain, 4) beam management (BM) influenced by a spatial parameter, and the like. Accordingly, NR supports four types of QCL relations shown in [Table 10] below.

TABLE 10

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial Rx parameter may collectively refer to some or all of various parameters such as angle of arrival (AoA), power of angular spectrum (PAS) of AoA, angle of departure (AoD), PAS of AoD, transmission and reception channel correlation, transmitting/receiving beamforming, and spatial channel correlation.

The QCL relation may be configured in the UE through RRC parameter TCI-state and QCL-Info as shown in [Table 11] below. Referring to [Table 11] below, the base station may configure one or more TCI states in the UE and inform the UE of a maximum of two QCL relations (qcl-Type 1 and qcl-Type 2) for an RS referring to an ID of the TCI state, that is, a target RS. Here, each piece of the QCL information (QCL-Info) included in the TCI state includes a serving cell index and a BWP index of a reference RS indicated by the corresponding QCL information, a type and an ID of the reference RS, and the QCL type as shown in [Table 10] above.

TABLE 11

```
TCI-State ::=                          SEQUENCE {
  tci-StateId                          TCI-StateId,
  (ID of corresponding TCI state)
  qcl-Type1                            QCL-Info,
  (QCL information of first reference RS of RS (target RS) referring
to corresponding TCI state ID)
  qcl-Type2                            QCL-Info
       OPTIONAL, -- Need R
  (QCL information of second reference RS of RS (target RS)
referring to corresponding TCI state ID)
  ...
}
QCL-Info ::=                           SEQUENCE {
  cell                                 ServCellIndex
       OPTIONAL, -- Need R
  (serving cell index of reference RS indicated by corresponding QCL
information)
  bwp-Id                               BWP-Id
       OPTIONAL, -- Cond CSI-RS-Indicated
  (BWP index of reference RS indicated by corresponding QCL
information)
  referenceSignal                      CHOICE {
    csi-rs                             NZP-
CSI-RS-ResourceId,
    ssb
  SSB-Index
      (one of CSI-RSI ID or SSB ID indicated by corresponding QCL
      information)
  }
  qcl-Type                             ENUMERATED
{typeA, typeB, typeC, typeD},
       ...
}
```

Figure 6:
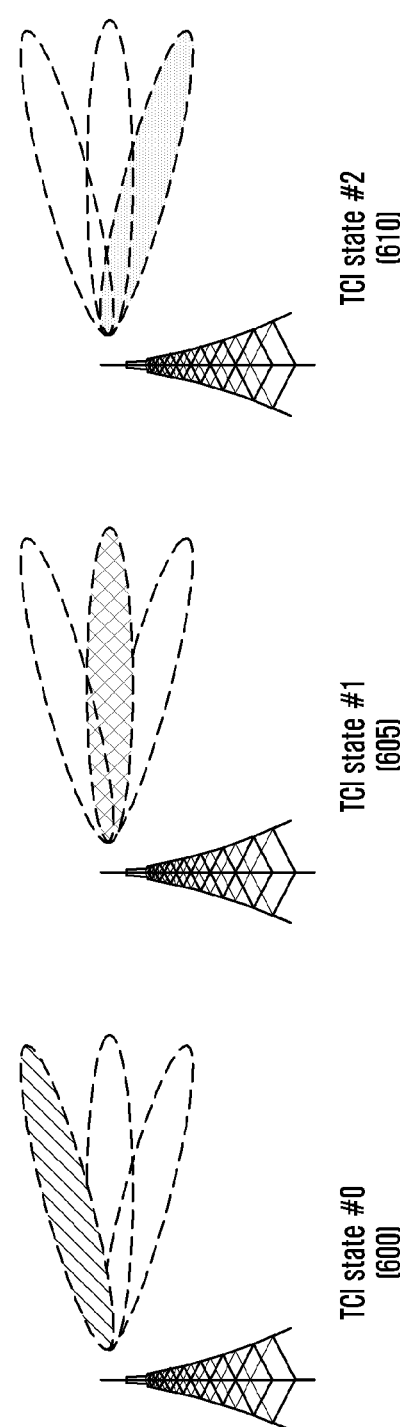
FIG. 6 illustrates an example of a base station beam allocation according to a TCI state configuration in a wireless communication system according to an embodiment of the disclosure.

FIG. 6 illustrates an example of a base station beam allocation according to a TCI state configuration. Referring to FIG. 6, the base station may transfer information on N different beams to the UE through N different TCI states. For example, when N=3 as illustrated in FIG. 6, the base station may notify that a qcl-Type 2 parameter included in three TCI states 600, 605, and 610 is associated with a CSI-RS or SSB corresponding to different beams to be configured as QCL type D and antenna ports referring to the different TCI states 600, 605, and 610 are associated with different spatial Rx parameters, that is, different beams.

[Table 12] to [Table 16] below show valid TCI state configurations according to the target antenna port type.

[Table 12] shows valid TCI state configurations when the target antenna port is a CSI-RS for tracking (TRS). The TRS is referred to as an NZP CSI-RS for which a repetition parameter is not configured and trs-Info is configured as true among CSI-RSs. The third configuration in [Table 12] may be used for an aperiodic TRS.

TABLE 12

| Valid TCI state configurations when target antenna port is CSI-RS for tracking (TRS) | | | | |
|---|---|---|---|---|
| Valid TCI state Configuration | DL RS 1 | qcl-Type1 | DL RS 2 (if configured) | qcl-Type2 (if configured) |
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

[Table 13] shows valid TCI state configurations when the target antenna port is a CSI-RS for CSI. The CSI-RS for CSI is an NZP CSI-RS for which a parameter (e.g., a repetition parameter) indicating repetition is not configured and trs-Info is not configured as true among the CSI-RSs.

TABLE 13

| Valid TCI state configurations when target antenna port is CSI-RS for CSI | | | | |
|---|---|---|---|---|
| Valid TCI state Configuration | DL RS 1 | qcl-Type1 | DL RS 2 (if configured) | qcl-Type2 (if configured) |
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

[Table 14] shows valid TCI state configurations when the target antenna port is a CSI-RS for beam management (BM) (that is the same meaning as a CSI-RS for L1 RSRP reporting). Among the CSI-RSs, the CSI-RS for BM is an NZP CSI-RS for which a repetition parameter is configured to have a value of on or off and trs-Info is not configured as true.

TABLE 14

| Valid TCI state configurations when target antenna port is CSI-RS for BM (for L1 RSRP reporting) | | | | |
|---|---|---|---|---|
| Valid TCI state Configuration | DL RS 1 | qcl-Type1 | DL RS 2 (if configured) | qcl-Type2 (if configured) |
| 1 | TRS | QCL-TypeA | TRS (same as DL RS 1) | QCL-TypeD |

TABLE 14-continued

| Valid TCI state configurations when target antenna port is CSI-RS for BM (for L1 RSRP reporting) | | | |
| Valid TCI state Configuration | DL RS 1 | qcl-Type1 | DL RS 2 (if configured) | qcl-Type2 (if configured) |
| --- | --- | --- | --- | --- |
| 2 | TRS | QCL-TypeA | CSI-RS (BM) | QCL-TypeD |
| 3 | SS/PBCH | QCL-TypeC | SS/PBCH Block | QCL-TypeD |

[Table 15] shows valid TCI state configurations when the target antenna port is a PDCCH DMRS.

TABLE 15

| Valid TCI state configurations when target antenna port is PDCCH DMRS | | | |
| Valid TCI state Configuration | DL RS 1 | qcl-Type1 | DL RS 2 (if configured) | qcl-Type2 (if configured) |
| --- | --- | --- | --- | --- |
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

[Table 16] shows valid TCI state configurations when the target antenna port is a PDSCH DMRS.

TABLE 16

| Valid TCI state configurations when target antenna port is PDSCH DMRS | | | |
| Valid TCI state Configuration | DL RS 1 | qcl-Type1 | DL RS 2 (if configured) | qcl-Type2 (if configured) |
| --- | --- | --- | --- | --- |
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In a representative QCL configuration method by [Table 12] to [Table 16], the target antenna port and the reference antenna port for each operation are configured and operated as "SSB"→"TRS"→"CSI-RS for CSI, CSI-RS for BM, PDCCH DMRS, or PDSCH DMRS." As such, it is possible to assist the reception operation of the UE by associating statistical characteristics which may be measured from the SSB and the TRS with respective antenna ports.

[PDCCH: In Relation to TCI state]

Specifically, combinations of TCI states which may be applied to a PDCCH DMRS antenna port are as shown in [Table 17] below. In [Table 17], a fourth row is a combination assumed by the UE before the RRC configuration, and configurations after RRC are impossible.

TABLE 17

| Valid TCI state Configuration | DL RS 1 | qcl-Type1 | DL RS 2 (if configured) | qcl-Type2 (if configured) |
| --- | --- | --- | --- | --- |
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |

TABLE 17-continued

| Valid TCI state Configuration | DL RS 1 | qcl-Type1 | DL RS 2 (if configured) | qcl-Type2 (if configured) |
| --- | --- | --- | --- | --- |
| 4 | SS/PBCH Block | QCL-TypeA | SS/PBCH Block | QCL-TypeD |

Figure 7:
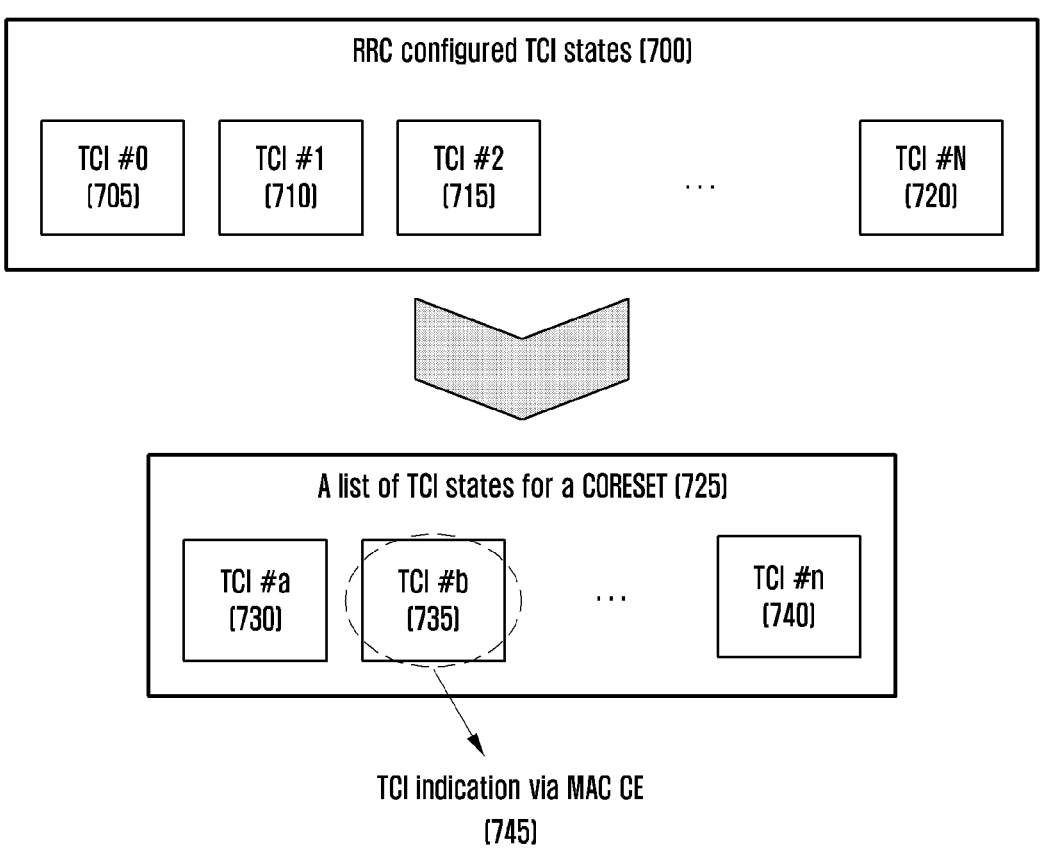
FIG. 7 illustrates an example of a TCI state allocation method in a wireless communication system according to an embodiment of the disclosure.

NR supports the hierarchical signaling method as shown in FIG. 7 for dynamical allocation of PDCCH beams. FIG. 7 is a view illustrating an example of a TCI state allocation method in a wireless communication system according to an embodiment of the disclosure.

Referring to FIG. 7, the base station may configure N TCI states 705, 710, . . . , 720 in the UE through RRC signaling 700 and configure some thereof as TCI states for the CORESET (725). Thereafter, the base station may indicate one of the TCI states 730, 735, and 740 for the CORESET to the UE through MAC CE signaling (745). The UE receives a PDCCH based on beam information included in the TCI state indicated by the MAC CE signaling.

Figure 8:
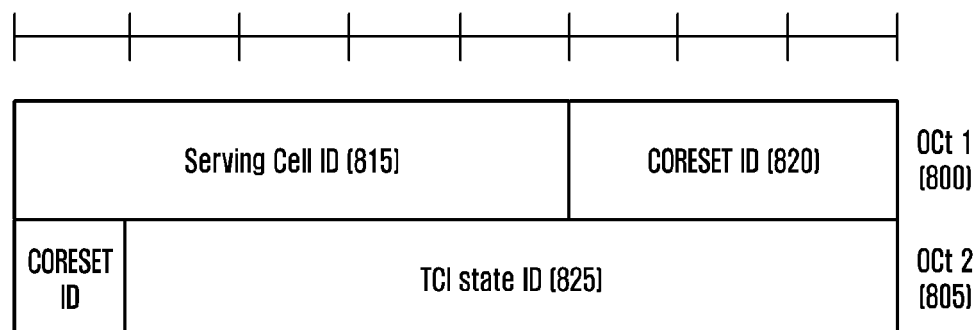
FIG. 8 illustrates an example of a TCI indication MAC CE signaling structure for a PDCCH DMRS in a wireless communication system according to an embodiment of the disclosure.

FIG. 8 illustrates a TCI indication MAC CE signaling structure for the PDCCH DMRS. Referring to FIG. 8, the TCI indication MAC CE signaling for the PDCCH DMRS is configured by 2 bytes (16 bits), and includes a serving cell ID 815 of 5 bits, a CORESET ID 820 of 4 bits, and a TCI state ID 825 of 7 bits.

Figure 9:
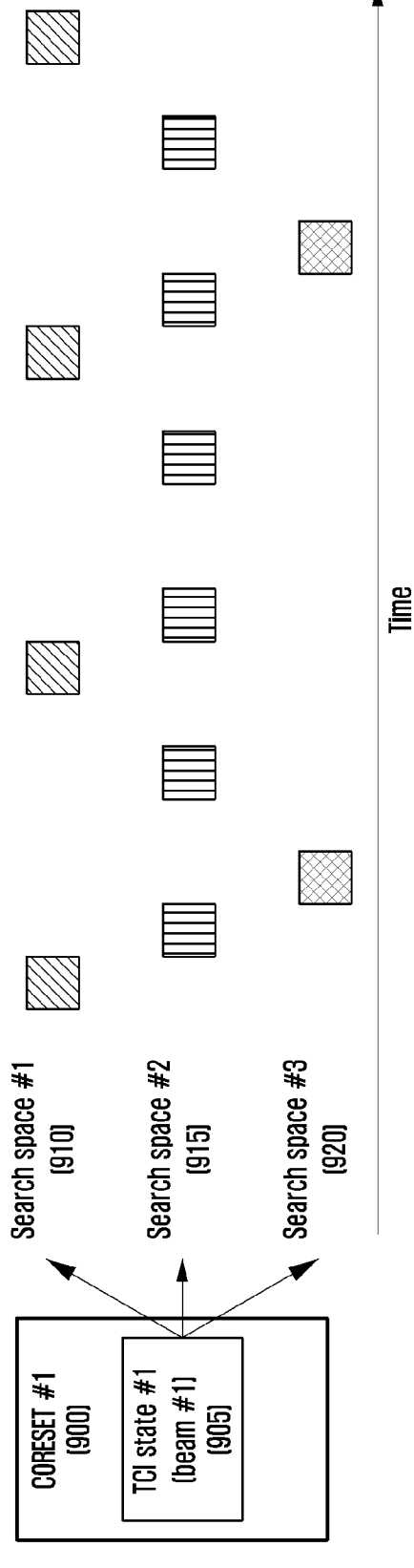
FIG. 9 illustrates a structure of a beam configuration for a CORESET and a search space in a wireless communication system according to an embodiment of the disclosure.

FIG. 9 illustrates a structure of a beam configuration for a CORESET and a search space. Referring to FIG. 9, the base station may indicate one state in the TCI state list included in the configuration of a CORSET 900 through MAC CE signaling (905). Thereafter, before another TCI state is indicated to the corresponding CORSET through other MAC CE signaling, the UE considers that the same QCL information 905 (beam #1) is applied to one or more search spaces 910, 915, and 920 connected to the CORE-SET.

The base station may configure one or multiple TCI states for a specific CORESET in the UE and activate one of the configured TCI states through a MAC CE activation command. For example, {TCI state #0, TCI state #1, TCI state #2} are configured in CORESET #1 as the TCI states, and the base station may transmit a command for activating TCI state #0 assumed as the TCI state for CORESET #1 to the UE through the MAC CE. The UE may correctly receive a DMRS of the corresponding CORESET based on QCL information within the activated TCI state according to the activation command for the TCI state received through the MAC CE.

In case that the UE does not receive the MAC CE activation command for the TCI state of CORESET #0 for the CORESET (CORESET #0) configured to have an index of 0, the UE may assume that a DMRS transmitted in CORESET #0 is QCLed with an SS/PBCH block identified in an initial access process or a non-contention-based random access process which is not triggered by a PDCCH command.

In case that the UE does not receive a configuration of the TCI state for CORESET #X or the UE receives the configuration of one or more TCI states but does not receive a MAC CE activation command for activating one of the TCI states for the CORESET (CORESET #X) configured to have an index of a value other than 0, the UE may assume that a DMRS transmitted in CORESET #X is QCLed with an SS/PBCH block identified in an initial access process.

[PDSCH: in Relation to Frequency Resource Allocation]

FIG. 10 illustrates an example of a frequency axis resource allocation for a physical downlink shared channel (PDSCH) in a wireless communication system according to an embodiment of the disclosure.

FIG. 10 illustrates three frequency axis resource allocation methods of type 0 1000, type 1 1005, and dynamic switch 1010 which may be configured through a higher layer in an NR wireless communication system.

Referring to FIG. 10, when the UE is configured to use only resource type 0 through higher-layer signaling (1000), some pieces of DCI for allocating the PDSCH to the corresponding UE includes a bitmap of NRBG bits. A condition therefor is described again below. In this case, NRBG is the number of resource block groups (RBGs) determined as shown in [Table 18] below according to a BWP size allocated by a BWP indicator and a higher-layer parameter rbg-Size, and data is transmitted to an RBG indicated as 1 by the bitmap.

TABLE 18

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

In case that the UE is configured to use only resource type 1 through higher-layer signaling (1005), some pieces of DCI for allocating the PDSCH to the corresponding UE has frequency axis resource allocation information including $$\lceil \log_2(N_{RB}^{DL,BWP}(N_{RB}^{DL,BWP} + 1)/2) \rceil$$

bits. A condition therefor is described again below. The base station may configure a starting VRB 1020 and a length 1025 of frequency axis resources allocated sequentially therefrom.

In case that the UE is configured to use both resource type 0 and resource type 1 through higher-layer signaling (1010), some pieces of DCI for allocating the PDSCH to the corresponding UE includes frequency axis resource allocation information of bits of a larger value 1035 among payload 1015 for configuring resource type 0 and payload 1020 and 1025 for configuring resource type 1. Here, one bit may be added to the first part (MSB) of the frequency axis resource allocation information within the DCI, and the use of resource type 0 may be indicated when the corresponding bit is "0" and the use of resource type 1 may be indicated when the corresponding bit is "1."

[PDSCH/PUSCH: in Relation to Time Resource Allocation]

A time domain resource allocation method for a data channel in a next-generation mobile communication system (5G or NR system) is described below.

The base station may configure, for the UE via higher layer signaling (e.g., RRC signaling), a table for time domain resource allocation information on a PDSCH and a PUSCH. A table including up to 16 entries (maxNrofDL-Allocations=16) may be configured for the PDSCH, and a table including up to 16 entries (maxNrofUL-Allocations=16) may be configured for the PUSCH. In an embodiment, the time domain resource allocation information may include a PDCCH-to-PDSCH slot timing (corresponding to a time interval in units of slots between a time point at which a PDCCH is received and a time point at which a PDSCH scheduled by the received PDCCH is transmitted, and denoted as K0), a PDCCH-to-PUSCH slot timing (corresponding to a time interval in units of slots between a time point at which a PDCCH is received and a time point at which a PUSCH scheduled by the received PDCCH is transmitted, and denoted as K2), information on a position and length of a start symbol in which the PDSCH or PUSCH is scheduled within a slot, a mapping type of the PDSCH or PUSCH, or the like. For example, information shown in [Table 19] or [Table 20] below may be transmitted from the base station to the UE.

TABLE 19

```
PDSCH-TimeDomainResourceAllocationList information element
PDSCH-TimeDomainResourceAllocationList ::= SEQUENCE (SIZE(1..
maxNrofDL-Allocations)) OF PDSCH-TimeDomainResourceAllocation
PDSCH-TimeDomainResourceAllocation ::=    SEQUENCE {
  k0                                      INTEGER(0..32)
OPTIONAL, -- Need S
mappingType          ENUMERATED {typeA, typeB },
startSymbolAndLength    INTEGER (0 .. 127)
}
```

TABLE 20

```
PUSCH-TimeDomainResourceAllocation information element
PUSCH-TimeDomainResourceAllocationList ::= SEQUENCE
(SIZE(1..maxNrofUL-Allocations)) OF PUSCH-
TimeDomainResourceAllocation
PUSCH-TimeDomainResourceAllocation ::=    SEQUENCE {
  k2                INTEGER(0..32)   OPTIONAL, -- Need S
  mapping Type              ENUMERATED {typeA, typeB },
startSymbolAndLength      INTEGER (0..127)
}
```

The base station may notify of one among the entries in the tables for the time domain resource allocation information to the UE via L1 signaling (e.g., DCI) (e.g., the entry may be indicated by a "time domain resource allocation" field in the DCI). The UE may acquire the time domain resource allocation information for the PDSCH or PUSCH, based on the DCI received from the base station.

Figure 11:
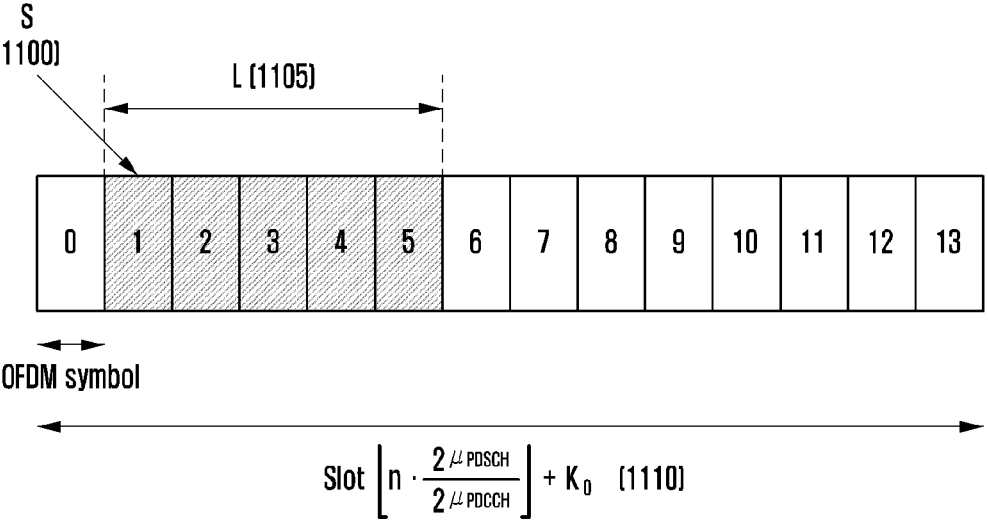
FIG. 11 illustrates an example of a time axis resource allocation for a PDSCH in a wireless communication system according to an embodiment of the disclosure.

FIG. 11 illustrates an example of a time axis resource allocation for a PDSCH in a wireless communication system according to an embodiment of the disclosure.

Referring to FIG. 11, the base station may indicate a time axis location of PDSCH resources according to subcarrier spacing (SCS) ($\mu_{PDSCH}$, $\mu_{PDCCH}$) of a data channel and a control channel configured using a higher layer, a scheduling offset (K0) value, and an OFDM symbol start location 1100 and length 1105 within one slot 1110 dynamically indicated through DCI.

Figure 12:
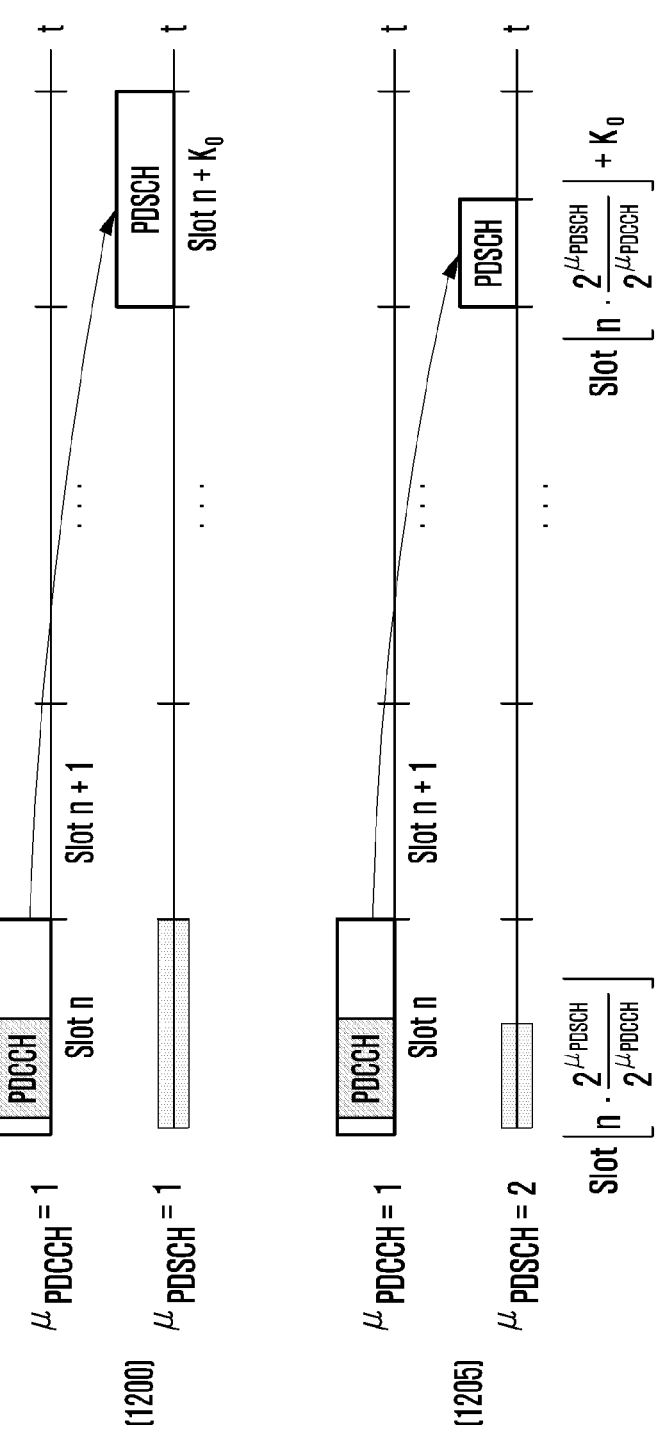
FIG. 12 illustrates an example of a time axis resource allocation according to subcarrier spacings of a data channel and control channel in a wireless communication system according to an embodiment of the disclosure.

FIG. 12 illustrates an example of a time axis resource allocation according to subcarrier spacings of a data channel and control channel in a wireless communication system according to an embodiment of the disclosure.

Referring to FIG. 12, in case that subcarrier spacings of a data channel and a control channel are the same as each other ($\mu_{PDSCH}=\mu_{PDCCH}$) (1200), slot numbers for the data and the control are the same as each other, and thus the base station and the UE may generate a scheduling offset according to a predetermined slot offset K0. On the other hand, in case that subcarrier spacings of a data channel and a control channel are different from each other ($\mu_{PDSCH}\neq\mu_{PDCCH}$) (1205), slot numbers for the data and the control are different from each other, and thus the base station and the UE may generate a scheduling offset according to a predetermined slot offset K0 based on subcarrier spacing of the PDCCH.

[PDSCH: TCI State Activation MAC-CE]

Figure 13:
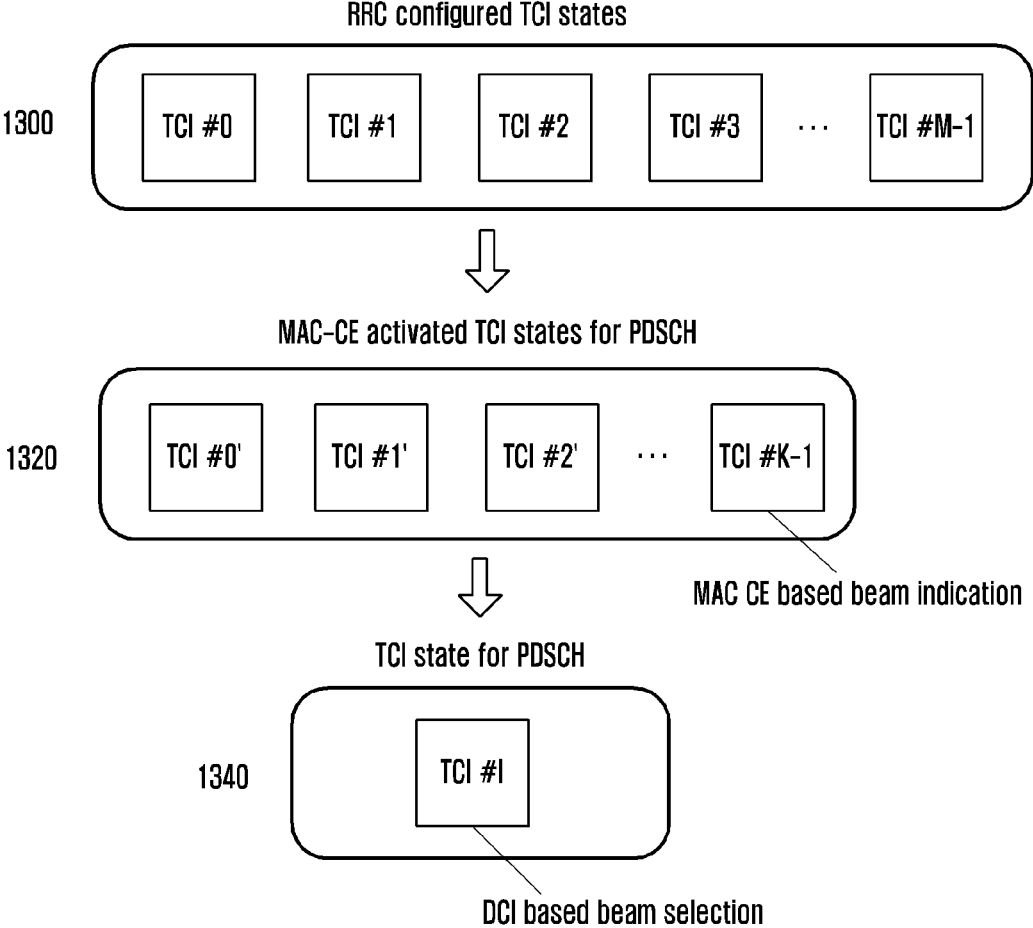
FIG. 13 illustrates a procedure for beam configuration and activation of a PDSCH according to an embodiment of the disclosure.

A beam configuration method for a PDSCH will be described below. FIG. 13 is a view illustrating an example of a procedure for beam configuration and activation of a PDSCH. A list of TCI states for a PDSCH may be indicated through a higher layer list such as RRC (1300). The list of TCI states may be indicated by, for example, tci-States-ToAddModList and/or tci-StatesToReleaseList in PDSCH-Config IE for each BWP. Next, a part of the list of the TCI states may be activated through the MAC-CE (1320). The maximum number of TCI states to be activated may be determined according to the capability reported by the UE. A TCI state for a PDSCH may correspond to one TCI state indicated through DCI among TCI states activated through MAC CE (1340).

Figure 14:
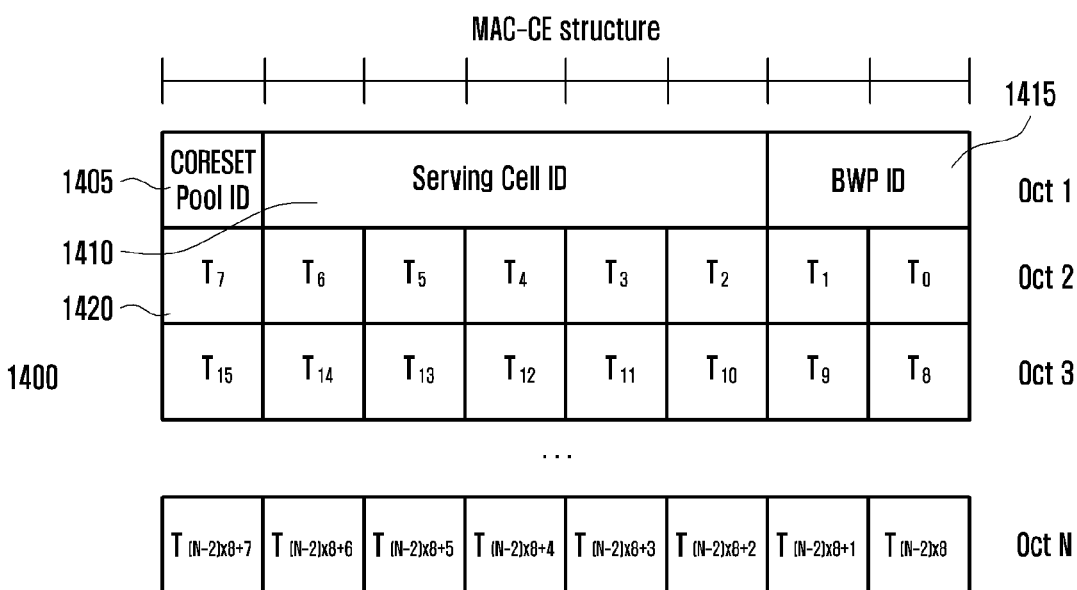
FIG. 14 illustrates an example of a MAC-CE structure for PDSCH TCI state activation/deactivation MAC CE structure according to an embodiment of the disclosure.

FIG. 14 illustrates an example of a MAC-CE structure for PDSCH TCI state activation/deactivation MAC CE structure.

The meaning of each field in the MAC CE 1400 and values configurable for each field are as follows.

Serving Cell ID (serving cell identity) 1410: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331, this MAC CE applies to all the Serving Cells configured in the set simultaneousTCI-UpdateList1 or simultaneousTCI-UpdateList2, respectively;

BWP ID (bandwidth part identity) 1415: This field indicates a DL BWP for which the MAC CE applies as the codepoint of the DCI bandwidth part indicator field as specified in TS 38.212. The length of the BWP ID field is 2 bits. This field is ignored if this MAC CE applies to a set of Serving Cells;

Ti (TCI state identifier, 1420): If there is a TCI state with TCI-StateId I as specified in TS 38.331, this field indicates the activation/deactivation status of the TCI state with TCI-StateId I, otherwise MAC entity may ignore the Ti field. The Ti field is set to 1 to indicate that the TCI state with TCI-StateId I may be activated and mapped to the codepoint of the DCI Transmission Configuration Indication field, as specified in TS 38.214. The Ti field is set to 0 to indicate that the TCI state with TCI-StateId I may be deactivated and is not mapped to the codepoint of the DCI Transmission Configuration Indication field. The codepoint to which the TCI State is mapped is determined by its ordinal position among all the TCI States with Ti field set to 1, the is, the first TCI State with Ti field set to 1 may be mapped to the codepoint value 0, second TCI State with Ti field set to 1 may be mapped to the codepoint value 1 and so on. The maximum number of activated TCI states is 8; and CORESET Pool ID (CORESET Pool ID identity) 1405: This field indicates that mapping between the activated TCI states and the codepoint of the DCI Transmission Configuration Indication set by field Ti is specific to the ControlResourceSetId configured with CORESET Pool ID as specified in TS 38.331. This field set to 1 indicates that this MAC CE may be applied for the DL transmission scheduled by CORESET with the CORESET pool ID equal to 1, otherwise, this MAC CE may be applied for the DL transmission scheduled by CORESET pool ID equal to 0. If the coresetPoolIndex is not configured for any CORESET, MAC entity may ignore the CORESET Pool ID field in this MAC CE when receiving the MAC CE. If the Serving Cell in the MAC CE is configured in a cell list that contains more than one Serving Cell, the CORESET Pool ID field may be ignored when receiving the MAC CE.

[In Relation to UE Capability Report]

In LTE and NR, the UE may perform a procedure of reporting a capability supported by the UE to the corresponding base station in a state in which the UE is connected to a serving base station. In the following description, this is referred to as a UE capability report.

The base station may transmit a UE capability enquiry message that corresponds to a request for a capability report to the UE in the connected state. The message may include a UE capability request for each radio access technology (RAT) type of the base station. The request for each RAT type may include supported frequency band combination information and the like. Furthermore, in the case of the UE capability enquiry message, UE capabilities for each of multiple RAT types may be requested through one RRC message container transmitted by the base station or the base station may insert the UE capability enquiry message including the UE capability request for each RAT type multiple times and transmit same to the UE. That is, the UE capability enquiry is repeated multiple times within one message and the UE may configure a UE capability information message corresponding thereto and report same multiple times. In the next-generation mobile communication system, a UE capability request for NR, LTE, E-UTRA-NR dual connectivity (EN-DC), and multi-RAT dual connectivity (MR-DC) may be made. In addition, the UE capability enquiry message is generally transmitted initially after the UE is connected to the base station, but may be requested at any time when the base station needs same.

The UE receiving the UE capability report request from the base station in the above operation configures a UE capability according to RAT type and band information requested by the base station. A method by which the UE configures the UE capability in the NR system will is described below.

In case that the UE receives a list of LTE and/or NR bands from the base station through a UE capability request, the UE configures a band combination (BC) for EN-DC and NR stand-alone (SA). That is, the UE configures a candidate list of BCs for EN-DC and NR SA, based on requested bands through FreqBandList to the base station. The bands sequentially have priorities as stated in FreqBandList.

In case that the base station sets a "eutra-nr-only" flag or a "eutra" flag and makes a request for the UE capability report, the UE completely removes NR SA BCs from the configured candidate list of BCs. Such an operation may occur only when the LTE base station (eNB) makes a request for a "eutra" capability.

Thereafter, the UE removes fallback BCs from the candidate list of BCs configured in the above operation. Here, the fallback BC is a BC which may be obtained by removing a band corresponding to at least one SCell from a predetermined BC, and a BC before the removal of the band corresponding at least one SCell may cover the fallback BC and thus the fallback BC may be omitted. This operation is applied to MR-DC, that is, LTE bands. BCs left after this operation correspond to a final "candidate BC list."

The UE selects BCs suitable for a requested RAT type in the final "candidate BC list" and selects BCs to be reported. In this operation, the UE configures supportedBandCombinationList according to a determined order. That is, the UE configures BCs and UE capability to be reported according to an order of a preconfigured rat-Type (nr→eutra-nr→eutra). Further, the UE configures featureSetCombination for the configured supportedBandCombinationList and configures a list of "candidate feature set combination" in a candidate BC list from which a list for fallback BCs (including capability at the same or lower level) is received. The "candidate feature set combination" may include all feature set combinations for NR and EUTRA-NR BCs, and may be acquired from a feature set combination of UE-NR-Capabilities and UE-MRDC-Capabilities containers.

In case that the requested rat Type is eutra-nr and influences, featureSetCombinations are included in all of the two containers of UE-MRDC-Capabilities and UE-NR-Capabilities. However, the NR feature set includes only UE-NR-Capabilities.

After the UE capability is configured, the UE transfers a UE capability information message including the UE capability to the base station. The base station performs scheduling and transmission/reception management suitable for the corresponding UE based on the UE capability received from the UE.

[In Relation to NC-JT]

According to an embodiment of the disclosure, non-coherent joint transmission (NC-JT) may be used for a UE to receive a PDSCH from multiple TRPs.

Unlike a conventional system, the 5G wireless communication system supports not only a service requiring a high transmission rate but also both a service having a very short transmission delay and a service requiring a high connection density. In a wireless communication network including multiple cells, transmission and reception points (TRPs), or beams, cooperative communication (coordinated transmission) between respective cells, TRPs, or/and beams may satisfy various service requirements by increasing the strength of a signal received by the UE or efficiently controlling interference between the cells, TRPs, or/and beams.

Joint transmission (JT) is one of representative transmission technologies for the above-described cooperative communication, and is a technology for increasing the strength or throughput of signal received by the UE, by transmitting the signal to one UE via multiple different cells, TRPs, and/or beams. Characteristics of channels between the UE and each cell, TRP, and/or beam may largely vary, and in particular, non-coherent joint transmission (NC-JT) supporting non-coherent precoding between cells, TRPs and/or beams may require individual precoding, MCS, resource allocation, TCI indication, or the like according to channel characteristics for each link between the UE and cell, TRP, and or beam.

The NC-JT may be applied to at least one of a downlink shared channel (PDSCH), a downlink control channel (PDCCH), an uplink shared channel (PUSCH), and an uplink control channel (PUCCH). In PDSCH transmission, transmission information such as precoding, MCS, resource allocation, and TCI may be indicated through DL DCI, and may be independently indicated for each cell, TRP, or/and beam for the NC-JT. This is a main factor that increases payload required for DL DCI transmission, which may have a bad influence on reception performance of a PDCCH for transmitting the DCI. Accordingly, in order to support JT of the PDSCH, it is required to carefully design a tradeoff between an amount of DCI information and reception performance of control information.

Figure 15:
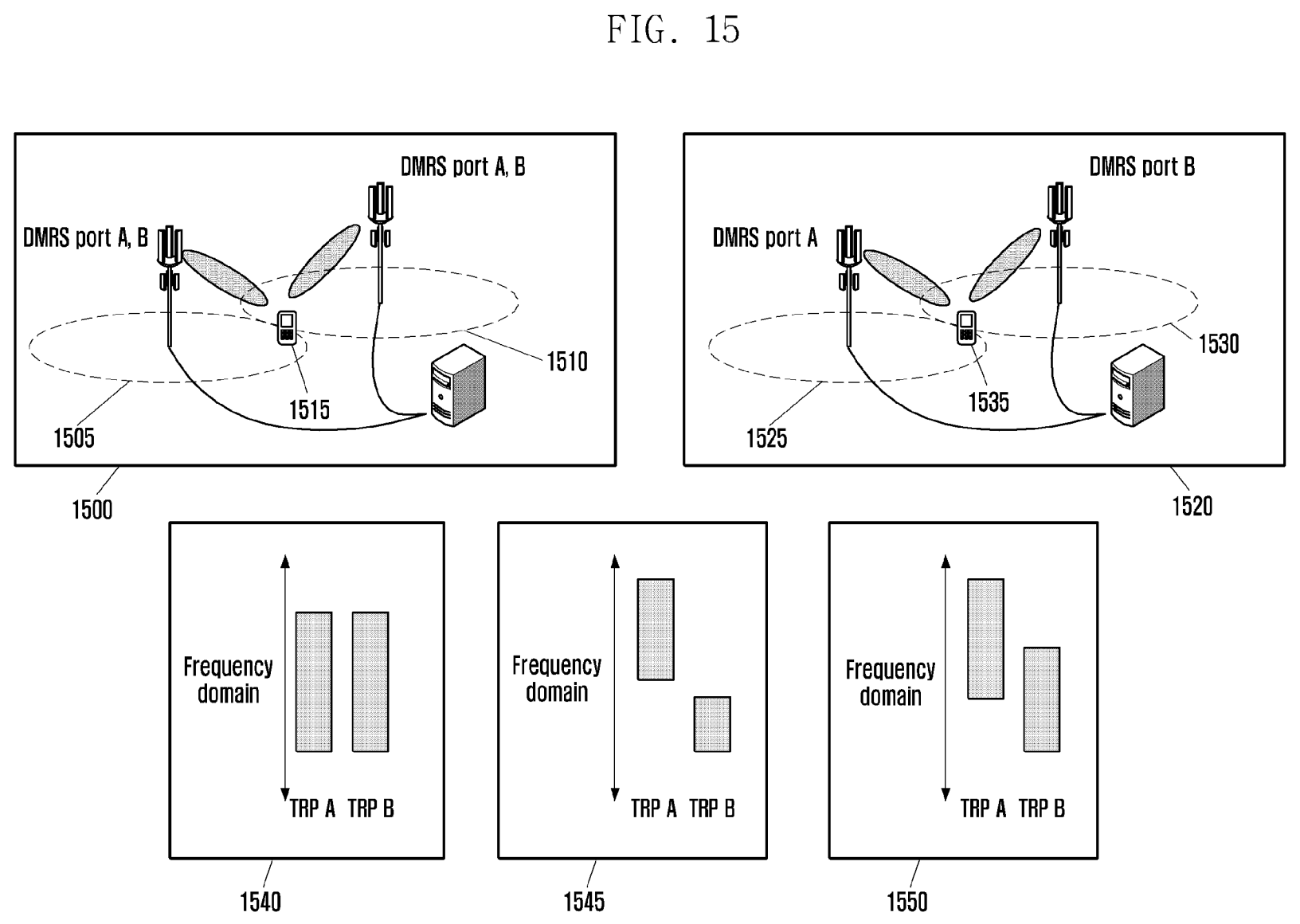

FIG. 15 illustrates an example of an antenna port configuration and resource allocation for cooperative communication in a wireless communication system according to an embodiment of the disclosure.

Referring to FIG. 15, the example for PDSCH transmission is described for each scheme of joint transmission (JT), and examples for allocating radio resources for each TRP are described.

An example 1500 of coherent joint transmission (C-JT) supporting coherent precoding between respective cells, TRPs, or/and beams is illustrated. In the case of C-JT, a TRP A 1505 and a TRP B 1510 transmit single data (PDSCH) to a UE 1515, and joint precoding may be performed in the multiple TRPs. This may mean that DMRSs is transmitted through the same DMRS ports so that the TRP A 1505 and the TPR B 1510 transmit the same PDSCH. For example, the TRP A 1505 and the TPR B 1510 may transmit DMRSs to the UE through a DMRS port A and a DMRS port B, respectively. In this case, the UE may receive one piece of DCI information for receiving one PDSCH demodulated based on the DMRSs transmitted through the DMRS port A and the DMRS port B.

FIG. 15 illustrates an example 1520 of non-coherent joint transmission (NC-JT) supporting non-coherent precoding between respective cells, TRPs, or/and beams for PDSCH transmission. In the case of NC-JT, the PDSCH is transmitted to a UE 1535 for each cell, TPR, or/and beam, and individual precoding may be applied to each PDSCH. Respective cells, TRPs, or/and beams may transmit different PDSCHs or different PDSCH layers to the UE, thereby improving throughput compared to single cell, TRP, or/and beam transmission. Furthermore, respective cells, TRPs, or/and beams may repeatedly transmit the same PDSCH to the UE, thereby improving reliability compared to single cell, TRP, or/and beam transmission. For convenience of description, the cell, TRP, or/and beam are collectively called a TRP.

Here, for the PDSCH transmission, various wireless resource allocations such as the case 1540 in which frequency and time resources used by multiple TRPs for PDSCH transmission are all the same, the case 1545 in which frequency and time resources used by multiple TRPs do not overlap at all, and the case 1550 in which some of the frequency and time resources used by multiple TRPs overlap each other may be considered.

In order to support NC-JT, DCI in various forms, structures, and relations may be considered to simultaneously allocate multiple PDSCHs to one UE.

Figure 16:
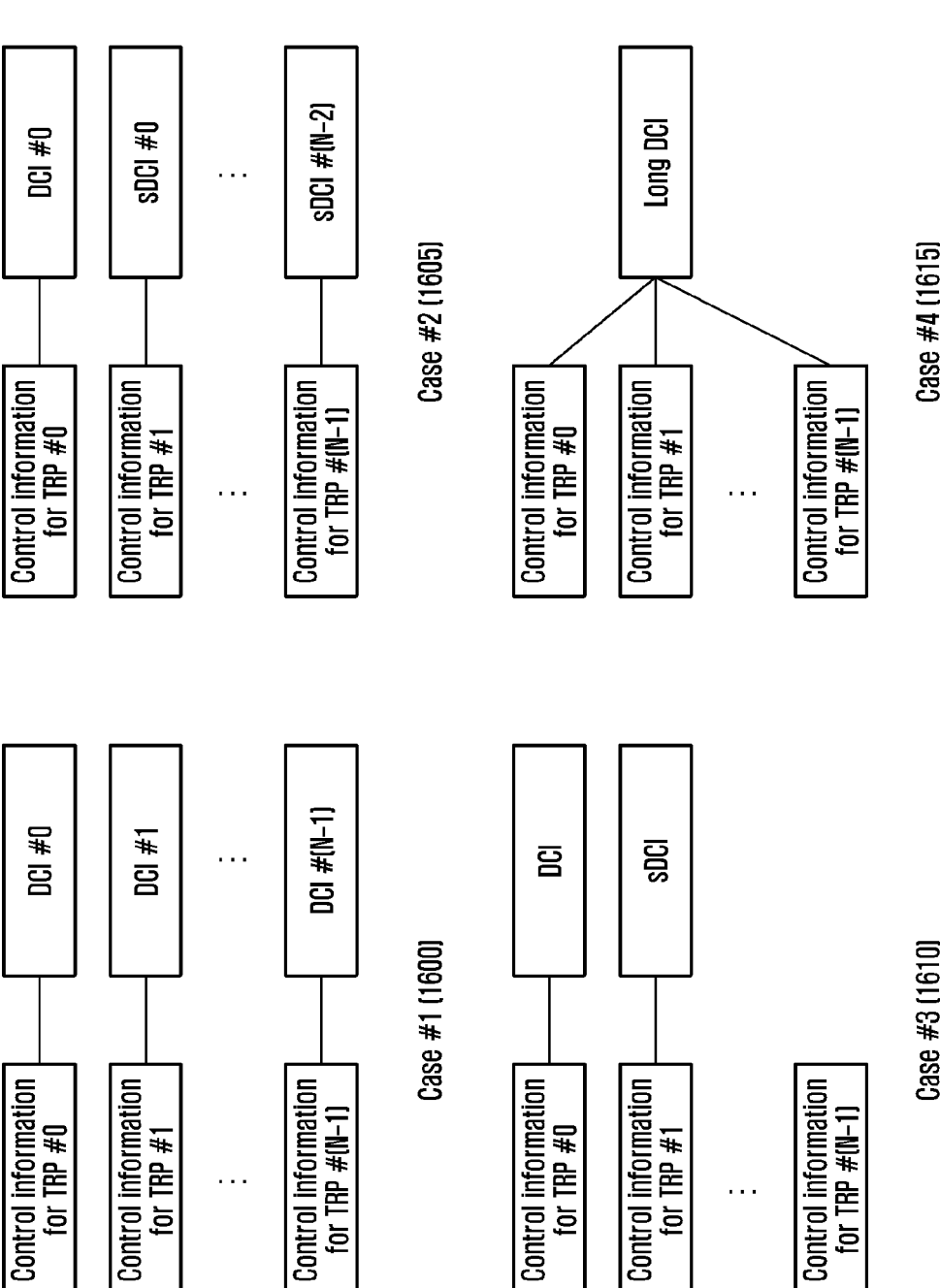
FIG. 16 illustrates an example of a configuration of downlink control information (DCI) for cooperative communication in a wireless communication system according to an embodiment of the disclosure.

FIG. 16 illustrates an example of a configuration of DCI for NC-JT in which respective TRPs transmit different PDSCHs or different PDSCH layers to the UE in a wireless communication system according to an embodiment of the disclosure.

Referring to FIG. 16, case #1 1600 is an example in which control information for PDSCHs transmitted from (N−1) additional TRPs is transmitted independently from control information for a PDSCH transmitted by a serving TRP in a situation in which (N−1) different PDSCHs are transmitted from the (N−1) additional TRPs (TRP #1 to TRP #(N−1)) other than the serving TRP (TRP #0) used for single PDSCH transmission. That is, the UE may acquire control information for PDSCHs transmitted from different TRPs (TRP #0 to TRP #(N−1)) through independent DCI (DCI #0 to DCI #(N−1)). Formats between the independent DCI may be identical to or different from each other, and payload between the DCI may also be identical to or different from each other. In case #1, a degree of freedom of PDSCH control or allocation may be completely guaranteed, but when respective pieces of DCI are transmitted by different TRPs, a difference between DCI coverages may be generated and reception performance may deteriorate.

Case #2 1605 is an example in which pieces of control information for PDSCHs of (N−1) additional TRPs are transmitted and each piece of the DCI is dependent on control information for the PDSCH transmitted from the serving TRP in a situation in which (N−1) different PDSCHs are transmitted from (N−1) additional TRPs (TRP #1 to TRP #(N−1)) other than the serving TRP (TRP #0) used for single PDSCH transmission.

For example, DCI #0 that is control information for a PDSCH transmitted from the serving TRP (TRP #0) may include all information elements of DCI format 1_0, DCI format 1_1, and DCI format 1_2, but shortened DCI (hereinafter, referred to as sDCI) (sDCI #0 to sDCI #(N−2)) that are control information for PDSCHs transmitted from the cooperative TRPs (TRP #1 to TRP #(N−1)) may include only some of the information elements of DCI format 1_0, DCI format 1_1, and DCI format 1_2. Accordingly, the sDCI for transmitting control information of PDSCHs transmitted from cooperative TPRs has smaller payload compared to the normal DCI (nDCI) for transmitting control information related to the PDSCH transmitted from the serving TRP, and thus may include reserved bits compared to the nDCI.

In case #2, a degree of freedom of each PDSCH control or allocation may be limited according to content of information elements included in the sDCI, but reception capability of the sDCI becomes better than the nDCI, and thus a probability of the generation of difference between DCI coverages may become lower.

Case #3 1610 is an example in which one piece of control information for PDSCHs of (N−1) additional TRPs is transmitted and the DCI is dependent on control information for the PDSCH transmitted from the serving TRP in a situation in which (N−1) different PDSCHs are transmitted from (N−1) additional TRPs (TRP #1 to TRP #(N−1)) other than the serving TRP (TRP #0) used for single PDSCH transmission.

For example, in the case of DCI #0 that is control information for the PDSCH transmitted from the serving TRP (TRP #0), all information elements of DCI format 1_0, DCI format 1_1, and DCI format 1_2 may be included, and in the case of control information for PDSCHs transmitted from cooperative TRPs (TRP #1 to TRP #(N−1)), only some of the information elements of DCI format 1_0, DCI format 1_1, and DCI format 1_2 may be gathered in one "secondary" DCI (sDCI) and transmitted. For example, the sDCI may include at least one piece of HARQ-related information such as frequency domain resource assignment, time domain resource assignment, and the MCS of the cooperative TRPs. In addition, information that is not included in the sDCI, such as a BWP indicator and a carrier indicator may follow DCI (DCI #0, normal DCI, or nDCI) of the serving TRP.

In case #3 1610, a degree of freedom of PDSCH control or allocation may be limited according to content of the information elements included in the sDCI but reception performance of the sDCI may be controlled, and case #3 may have smaller complexity of DCI blind decoding of the UE compared to case #1 1600 or case #2 1605.

Case #4 1615 is an example in which control information for PDSCHs transmitted from (N−1) additional TRPs is transmitted in DCI (long DCI) that is the same as that of control information for the PDSCH transmitted from the serving TRP in a situation in which different (N−1) PDSCHs are transmitted from the (N−1) additional TRPs (TRP #1 to TRP #(N−1)) other than the serving TRP (TRP #0) used for single PDSCH transmission. That is, the UE may acquire control information for PDSCHs transmitted from different TRPs (TRP #0 to TRP #(N−1)) through single DCI. In case

4 1615, complexity of DCI blind decoding of the UE may not be increased, but a degree of freedom of PDSCH control or allocation may be low since the number of cooperative TRPs is limited according to long DCI payload restriction.

In the following description and embodiments, the sDCI may refer to various pieces of supplementary DCI such as shortened DCI, secondary DCI, or normal DCI (DCI formats 1_0 and 1_1 described above) including PDSCH control information transmitted in the cooperative TRP, and unless a specific restriction is mentioned, the corresponding description may be similarly applied to the various pieces of supplementary DCI.

In the following description and embodiments, case #1 1600, case #2 1605, and case #3 1610 in which one or more pieces of DCI (PDCCHs) are used to support NC-JT may be classified as multiple PDCCH-based NC-JT and case #4 1615 in which single DCI (PDCCH) is used to support NC-JT may be classified as single PDCCH-based NC-JT. In multiple PDCCH-based PDSCH transmission, a CORESET for scheduling DCI of the serving TRP (TRP #0) may be separated from CORESETs for scheduling DCI of cooperative TRPs (TRP #1 to TRP #(N−1)). A method of distinguishing the CORESETs may include a distinguishing method through a higher-layer indicator for each CORESET and a distinguishing method through a beam configuration for each CORESET. Furthermore, in single PDCCH-based NC-JT, single DCI schedules a single PDSCH having multiple layers instead of scheduling multiple PDSCHs, and the multiple layers may be transmitted from multiple TRPs. Here, the correlation between the layer and the TRP transmitting the corresponding layer may be indicated through a transmission configuration indicator (TCI) indication for the layer.

The "cooperative TRP" of embodiments of the disclosure may be replaced with various terms such as a "cooperative panel" or a "cooperative beam" when actually applied.

In embodiments of the disclosure, "the case in which NC-JT is applied" may be variously interpreted as "the case in which the UE simultaneously receives one or more PDSCHs in one BWP," "the case in which the UE simultaneously receives PDSCHs based on two or more transmission configuration indicator (TCI) indications in one BWP," and "the case in which the PDSCHs received by the UE are associated with one or more DMRS port groups" in consideration of circumstances, but is used by one expression for convenience of description.

In the disclosure, the wireless protocol structure for NC-JT may be variously used according to a TRP development scenario. By way of example, in case that there is a small backhaul delay or no backhaul delay between cooperative TRPs, a method (CA-like method) using a structure based on MAC layer multiplexing may be used. On the other hand, in case that the backhaul delay between cooperative TRPs is too large to be ignored (e.g., when a time of 2 ms or longer is needed to exchange information such as CSI, scheduling, and HARQ-ACK between cooperative TRPs), a method (DC-like method) of securing a characteristic robust to a delay may be used through an independent structure for each TRP from an RLC layer.

The UE supporting C-JT and/or NC-JT may receive a C-JT and/or NC-JT-related parameter or setting value from a higher-layer configuration and set an RRC parameter of the UE based on the parameter or setting value. For the higher-layer configuration, the UE may use a UE capability parameter, for example, tci-StatePDSCH. The UE capability parameter, for example, tci-StatePDSCH may define TCI states for the purpose of PDSCH transmission, the number of TCI states may be configured as 4, 8, 16, 32, 64, and 128 in FR1 and as 64 and 128 in FR2, and a maximum of 8 states which may be indicated by 3 bits of a TCI field of the DCI may be configured through a MAC CE message among the configured numbers. A maximum value 128 means a value indicated by maxNumberConfiguredTCIstatesPerCC within the parameter tci-StatePDSCH which is included in capability signaling of the UE. As described above, a series of configuration procedures from the higher-layer configuration to the MAC CE configuration may be applied to a beamforming indication or a beamforming change command for at least one PDSCH in one TRP.

[Multi-DCI-Based Multi-TRP]

As an embodiment of the disclosure, a multi-DCI-based multi-TRP transmission method will be described. The multi-DCI-based multi-TRP transmission method may configure a downlink control channel for NC-JT based on multiple PDCCHs.

NC-JT based on multiple PDCCHs may include CORESETs or search spaces distinguished according to TRPs, when DCI for scheduling a PDSCH of each TRP is transmitted. The CORESET or search space for each TRP may be configured as at least one of following cases.

Higher layer index configuration for each CORESET: CORESET configuration information configured through a higher layer may include an index value, and a TRP transmitting a PDCCH from a corresponding CORESET may be distinguished by the configured index value for each CORESET. In other words, in a group of CORESETs having an identical higher layer index value, it may be considered that an identical TRP transmits a PDCCH or a PDCCH scheduling a PDSCH of an identical TRP is transmitted. The above-described index for each CORESET may be referred to as CORESETPoolIndex, and it may be considered that a PDCCH is transmitted from an identical TRP for CORESETs in which an identical value of CORESETPoolIndex is configured. With respect to a CORESET in which a CORESETPoolIndex value is not configured, it may be considered that a basic value is configured for CORESETPoolIndex, and the basic value may be 0.

In the disclosure, when types of CORESETPoolIndex of multiple CORESETs included in PDCCH-Config that is higher layer signaling exceed 1, that is, when the CORESETs have different CORESETPoolIndex, a UE may determine that a base station may use the multi-DCI-based multi-TRP transmission method.

One the contrary, in the disclosure, when types of CORESETPoolIndex included of multiple CORESETs included in PDCCH-Config that is higher layer signaling is 1, that is, when all CORESETs have CORESETPoolIndex of 0 or 1, the UE may determine that the base station does not use the multi-DCI-based multi-TRP transmission method, but uses a single TRP for transmission.

Configuration of multiple PDCCH-Config: Multiple PDCCH-Config may be configured in one BWP, and each PDCCH-Config may include a PDCCH configuration for each TRP. In other words, it may be considered that a list of CORESETs for each TRP and/or a list of search spaces for each TRP is configured in one PDCCH-Config, and one or more CORESETs and one or more search spaces included in one PDCCH-Config correspond to a specific TRP.

Configuration of CORESET beam/beam group: A TRP corresponding to the corresponding CORESET may be identified through a beam or a beam group configured for each CORESET. For example, when an identical TCI state is configured in multiple CORESETs, it may be considered that the corresponding CORESETs are transmitted through an identical TRP or a PDCCH for scheduling a PDSCH of an identical TRP is transmitted in the corresponding CORESET.

Configuration of search space beam/beam group: A beam or a beam group may be configured for each search space, and a TRP for each search space may be identified therethrough. For example, when an identical beam/beam group or TCI state is configured in multiple search spaces, it may be considered that an identical TRP transmits the PDCCH in the corresponding search space or a PDCCH for scheduling a PDSCH of an identical TRP is transmitted in the corresponding search space.

By distinguishing the CORESET or search space for each TRP as described above, it is possible to classify PDSCH and HARQ-ACK information for each TRP, and accordingly, it is possible to generate an independent HARQ-ACK codebook for each TRP and use an independent PUCCH resource.

The above-described configuration may be independent for each cell or BWP. For example, two different CORESETPoolIndex values may be configured for a PCell, while a CORESETPoolIndex value may not be configured for a specific SCell. In this case, it is considered that NC-JT is configured in the PCell, while NC-JT is not configured in the SCell in which the CORESETPoolIndex value is not configured.

A PDSCH TCI state activation/deactivation MAC-CE applicable to the multi-DCI-based multi-TRP transmission method may be as described in FIG. 14. If the UE does not receive a configuration of CORESETPoolIndex for each of all CORESETs in higher layer PDCCH-Config, the UE may ignore a CORESET Pool ID field 1405 in the corresponding MAC-CE 1400. If the UE is capable of supporting the multi-DCI-based multi-TRP transmission method, that is, the UE has a different CORESETPoolIndex for each CORESET within higher layer signaling PDCCH-Config, the UE may activate a TCI state in DCI including a PDCCH transmitted from CORESETs having a CORESETPoolIndex value identical to a value of the CORESET Pool ID field 1405 in the corresponding MAC-CE 1400. By way of example, when a value of the CORESET Pool ID field 1405 in the MAC CE 1400 is 0, the TCI state in the DCI included in the PDCCH transmitted from the CORESETs having CORESETPoolIndex of 0 may follow activation information of the corresponding MAC CE.

When a base station configures the UE to use the multi-DCI-based multi-TRP transmission method, that is, when types of CORESETPoolIndex of the multiple CORESETs included in the higher layer signaling PDCCH-Config exceed 1, or when the CORESETs have different CORESETPoolIndex, the UE may consider that following restrictions exist for PDSCHs scheduled by the PDCCHs in two CORESETs having different CORESETPoolIndex.

When the PDSCHs indicated from the PDCCHs in the two CORESETs having different CORESETPoolIndex completely or partially overlap, the UE may apply TCI states indicated from the PDCCHs to different CDM groups. That is, two or more TCI states may not be applied to one CDM group.

When the PDSCHs indicated from the PDCCHs in the two CORESETs having different CORESETPoolIndex completely or partially overlap, the UE may expect that the actual numbers of front-loaded DMRS symbols of each PDSCH, the actual numbers of additional DMRS symbols, actual locations of DMRS symbols, and DMRS types are not different from each other.

The UE may expect that BWPs indicated from the PDCCHs in the two CORESETs having different CORE-SETPoolIndex are identical, and that subcarrier spacings are also identical.

The UE may expect pieces of information on the PDSCHs scheduled from the PDCCHs in the two CORESETs having different CORESETPoolIndex are completely included in the respective PDCCHs.

[Single-DCI-Based Multi-TRP]

As an embodiment of the disclosure, a single-DCI-based multi-TRP transmission method will be described. The single-DCI-based multi-TRP transmission method may configure a downlink control channel for NC-JT based on a single PDCCH.

In the single-DCI-based multi-TRP transmission method, a PDSCH transmitted by multiple TRPs may be scheduled by one piece of DCI. Here, the number of TCI states may be used for a method of indicating the number of TRPs transmitting the corresponding PDSCH. That is, single PDCCH-based NC-JT may be considered when the number of TCI states indicated by DCI for scheduling the PDSCHs is 2, and single-TRP transmission may be considered when the number of TCI states is 1. The TCI states indicated by the DCI may correspond to one or two TCI states among TCI states activated by the MAC CE. When the TCI states of DCI correspond to two TCI states activated by the MAC CE, a TCI codepoint indicated by the DCI may be in a corresponding relation with the TCI states activated by the MAC CE wherein the number of TCI states activated by the MAC CE, corresponding to the TCI codepoint, may be 2.

For another example, at least one of all codepoints in a TCI state field in the DCI indicates two TCI states, the UE may consider that the base station may perform transmission based on the single-DCI-based multi-TRP transmission method. Here, the at least one codepoint indicating the two TCI states within the TCI state field may be activated through an enhanced PDSCH TCI state activation/deactivation MAC CE.

Figure 17:
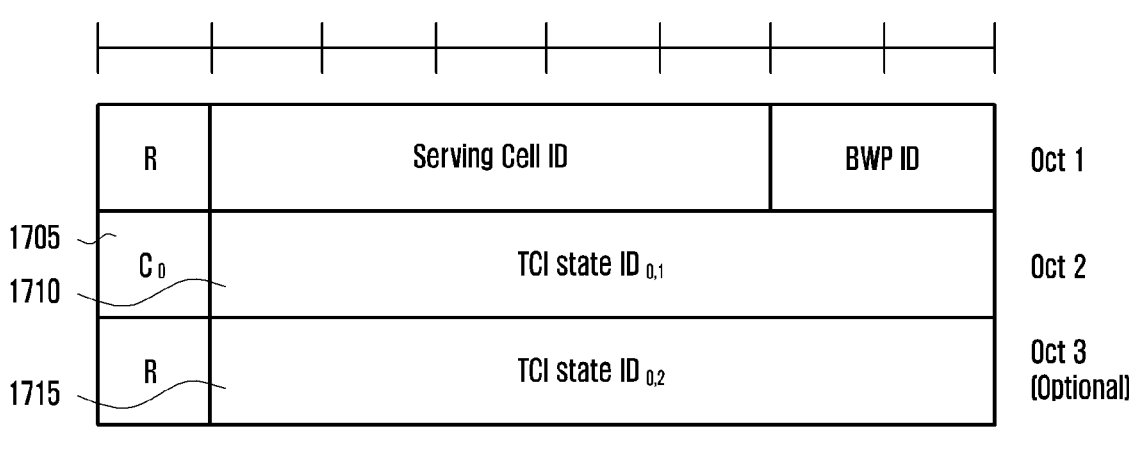
FIG. 17 illustrates an example of a MAC-CE structure for enhanced PDSCH TCI state activation/deactivation MAC CE structure according to an embodiment of the disclosure.

FIG. 17 illustrates an example of a MAC-CE structure for enhanced PDSCH TCI state activation/deactivation MAC CE structure. The meaning of each field in the corresponding MAC CE and values configurable for each field are as follows.

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331, this MAC CE applies to all the Serving Cells configured in the set simultaneousTCI-UpdateList1 or simultaneousTCI-UpdateList2, respectively;

BWP ID: This field indicates a DL BWP for which the MAC CE applies as the codepoint of the DCI bandwidth part indicator field as specified in TS 38.212. The length of the BWP ID field is 2 bits;

$C_i$: This field indicates whether the octet containing TCI state IDi,2 is present. If this field is set to "1," the octet containing TCI state IDi,2 is present. If this field is set to "0," the octet containing TCI state IDi,2 is not present;

TCI state IDi,j: This field indicates the TCI state identified by TCI-StateId as specified in TS 38.331, where i is the index of the codepoint of the DCI Transmission configuration indication field as specified in TS 38.212 and TCI state IDi,j denotes the j-th TCI state indicated for the i-th codepoint in the DCI Transmission Configuration Indication field. The TCI codepoint to which the TCI States are mapped is determined by its ordinal position among all the TCI codepoints with sets of TCI state IDi,j fields, that is, the first TCI codepoint with TCI state ID0,1 and TCI state ID0,2 may be mapped to the codepoint value 0, the second TCI codepoint with TCI state ID1,1 and TCI state ID1,2 may be mapped to the codepoint value 1 and so on. The TCI state IDi,2 is optional based on the indication of the Ci field. The maximum number of activated TCI codepoint is 8 and the maximum number of TCI states mapped to a TCI codepoint is 2; and R: Reserved bit, set to "0."

In FIG. 17, when a value of a C0 field 1705 is 1, a corresponding MAC CE may include, in addition to a TCI state ID0,1 field 1710, a TCI state ID0,2 1715. This indicates that a TCI state ID0,1 and a TCI state ID0,2 are activated for a 0th codepoint of a TCI state field included in DCI, and when a base station indicates the corresponding codepoint to a UE, the UE may receive an indication of two TCI states. If the value of the C0 field 1705 is 0, the corresponding MAC-CE is unable to include the TCI state ID0,2 field 1715, and this indicates that one TCI state corresponding to the TCI state ID0,1 is activated for the 0th codepoint of the TCI state field included in the DCI.

The above-described configuration may be independent for each cell or BWP. For example, while a maximum number of activated TCI states corresponding to one TCI codepoint is 2 in the PCell, a maximum number of activated TCI states corresponding to one TCI codepoint may be 1 in a specific SCell. In this case, it may be considered that NC-JT is configured in the PCell but NC-JT is not configured in the SCell.

[Single-DCI-Based Multi-TRP PDSCH Repetitive Transmission Scheme (TDM/FDM/SDM) Distinguishing Method]

Next, a method of distinguishing single-DCI-based multi-TRP PDSCH repetitive transmission schemes will be described. A UE may receive, from a base station, an instruction of different single-DCI-based multi-TRP PDSCH repetitive transmission schemes (e.g., TDM, FDM, and SDM), according to a value indicated by a DCI field and a higher layer signaling configuration. [Table 21] below shows a method of distinguishing between single or multi-TRP-based schemes indicated to the UE, according to a value of a specific DCI field and a higher layer signaling configuration.

TABLE 21

| Combination | The number of TCI states | The number of CDM groups | Repetition Number configuration and indication condition | Regarding repetition Scheme configuration | Transmission scheme indicated to UE |
|---|---|---|---|---|---|
| 1 | 1 | ≥1 | Condition 2 | Not configured | Single-TRP |
| 2 | 1 | ≥1 | Condition 2 | Configured | Single-TRP |
| 3 | 1 | ≥1 | Condition 3 | Configured | Single-TRP |
| 4 | 1 | 1 | Condition 1 | Configured or not configured | Single-TRP TDM scheme B |

TABLE 21-continued

| Combi-nation | The number of TCI states | The number of CDM groups | Repetition Number configura-tion and indication condition | Regarding repetition Scheme configuration | Transmission scheme indicated to UE |
|---|---|---|---|---|---|
| 5 | 2 | 2 | Condition 2 | Not configured | Multi-TRP SDM |
| 6 | 2 | 2 | Condition 3 | Not configured | Multi-TRP SDM |
| 7 | 2 | 2 | Condition 3 | Configured | Multi-TRP SDM |
| 8 | 2 | 1 | Condition 3 | Configured | Multi-TRP FDM scheme A/FDM scheme B/TDM scheme A |
| 9 | 2 | 1 | Condition 1 | Not configured | Multi-TRP TDM scheme B |

Each column in [Table 21] may be described as below.

Number of TCI states (second column): denotes the number of TCI states indicated by a TCI state field in DCI, and may be one or two.

Number of CDM groups (third column): denotes the number of different CDM groups of DMRS ports indicated by an antenna port field in the DCI. The number may be 1, 2, or 3.

repetitionNumber configuration and indication condition (fourth column): may have three conditions depending on whether repetitionNumber is configured for all time domain resource allocation (TDRA) entries indicated by TDRA field in the DCI, and whether an actually indicated TDRA entry includes a repetitionNumber configuration.

Condition 1: When at least one of all TDRA entries which may be indicated by the time domain resource allocation field includes the configuration for repetitionNumber, and the TDRA entry indicated by the time domain resource allocation field in the DCI includes the configuration for repetitionNumber greater than 1.

Condition 2: When at least one of all TDRA entries which may be indicated by the time domain resource allocation field includes the configuration for repetitionNumber, and the TDRA entry indicated by the time domain resource allocation field in the DCI does not include the configuration for repetition-Number.

Condition 3: When any of TDRA entries which may be indicated by the time domain resource allocation field do not include the configuration for repetition-Number.

Regarding repetitionScheme configuration (fifth column): denotes whether higher layer signaling repetition-Scheme is configured. The higher layer signaling repetitionScheme may be configured with one of "tdmSchemeA," "fdmSchemeA," and "fdmSchemeB."

Transmission scheme indicated to UE (sixth column): denotes single or multi-TRP schemes indicated according to combinations (first column) in [Table 24].

Single-TRP: denotes single TRP-based PDSCH transmission. If the UE is configured with pdsch-AggregationFactor in a higher layer signaling PDSCH-config, the UE may be scheduled with single TRP-based PDSCH repetitive transmission by a configured number of times. Otherwise, the UE may be scheduled with single TRP-based PDSCH single transmission.

Single-TRP TDM scheme B: denotes PDSCH repetitive transmission based on time resource division single-TRP-based slots. According to Condition 1 above regarding repetitionNumber, the UE repeatedly transmits a PDSCH on a time resource by the number of slots of the number of times of repetitionNumber greater than 1 configured in the TDRA entry indicated by the time domain resource allocation field. Here, a starting symbol and symbol length of the PDSCH indicated by the TDRA entry are equally applied for each slot by the number of times of repetitionNumber, and an identical TCI state is applied for each PDSCH repetitive transmission. This scheme is similar to a slot aggregation scheme in that the PDSCH repetitive transmission is performed between slots on a time resource, but is different from the slot aggregation scheme in that whether to indicate repetitive transmission is dynamically determined based on the time domain resource allocation field in the DCI.

Multi-TRP SDM: denotes a multi-TRP-based spatial resource division PDSCH transmission scheme. This is a method of dividing and receiving a layer from each TRP, and although the multi-TRP SDM is not a repetitive transmission scheme, reliability of PDSCH transmission may be increased as the number of layers is increased to decrease a coding rate. The UE may apply two TCI state indicated through the TCI state field in the DCI respectively to two CDM groups indicated by the base station to receive the PDSCH.

Multi-TRP FDM scheme A: denotes a multi-TRP-based frequency resource division PDSCH transmission scheme, and although this scheme is not repetitive transmission like the multi-TRP SDM because there is one PDSCH transmission location (occasion), a frequency resource amount is increased to decrease a coding rate, and thus transmission reliability may be high. In the multi-TRP FDM scheme A, two TCI states indicated through the TCI state field in the DCI may be respectively applied to frequency resources that do not overlap each other. When the PRB bundling size is determined as a wideband and the number of RBs indicated by the frequency domain resource allocation field is N, the UE may receive first ceil (N/2) RBs by applying a first TCI state and receive the remaining floor(N/2) RBs by applying a second TCI state. Here, ceil(.) and floor(.) are each an operator indicating rounding up or rounding down of a first decimal point. When the PRB bundling size is determined as 2 or 4, even-numbered PRGs are received by applying a first TCI state and odd-numbered PRGs are received by applying a second TCI state.

Multi-TRP FDM scheme B: denotes a multi-TRP-based frequency resource division PDSCH repetitive transmission scheme, and a PDSCH may be repeatedly transmitted at each of two PDSCH transmission locations (occasions). In the multi-TRP FDM scheme B, like the multi-TRP FDM scheme A, two TCI states indicated through the TCI state field in the DCI may be respectively applied to frequency resources that do not overlap each other. When the PRB bundling size is determined as a wideband and the number of RBs indicated by the frequency domain resource allocation field is N, the UE may receive first ceil (N/2) RBs by applying a first TCI state and receive the remaining floor(N/2) RBs by applying a second TCI state. Here, ceil(.) and floor(.) are each an operator indicating rounding up or rounding down of a first decimal point. When the PRB bundling size is determined as 2 or 4, even-numbered PRGs are received by applying a first TCI state and odd-numbered PRGs are received by applying a second TCI state.

Multi-TRP TDM scheme A: denotes a PDSCH repetitive transmission scheme in a multi-TRP-based time resource division slot. The UE has two PDSCH transmission locations (occasions) within one slot, and a first reception location may be determined based on a start symbol and a symbol length of the PDSCH indicated through the time domain resource allocation field within DCI. A start symbol of a second reception location of the PDSCH may be a location to which a symbol offset by higher-layer signaling StartingSymbolOffsetK from the last symbol of the first transmission location, and the transmission location corresponding to the symbol length indicated therefrom may be determined. When higher-layer signaling StartingSymbolOffsetK is not configured, the symbol offset may be considered as 0.

Multi-TRP TDM scheme B: denotes a PDSCH repetitive transmission scheme between multi-TRP-based time resource division slots. The UE has one PDSCH transmission location (occasion) within one slot and may receive repetitive transmission based on a start symbol and a symbol length of the same PDSCH during slots corresponding to repetitionNumber indicated by the time domain resource allocation field within DCI. In case that repetitionNumber is 2, the UE may receive PDSCH repetitive transmission of first and second slots by applying first and second TCI states, respectively. In case that repetitionNumber is larger than 2, the UE may use different TCI state application methods depending on how higher layer signaling tciMapping is configured. When tciMapping is configured as cyclicMapping, first and second TCI states may be applied to first and second PDSCH transmission locations, respectively, and the same TCI state application method is equally applied to the remaining PDSCH transmission locations. When tciMapping is configured as sequentialMapping, a first TCI state may be applied to first and second PDSCH transmission locations, a second TCI state may be applied to third and fourth PDSCH transmission locations, and the same TCI state application method may be equally applied to the remaining PDSCH transmission locations.

Hereinafter, embodiments of the disclosure will be described in detail with reference to the accompanying drawings. The contents of the disclosure may be applicable to FDD and TDD systems. Hereinafter, in the disclosure, higher signaling (or higher-layer signaling) may be a method of transmitting a signal from the base station to the UE through a downlink data channel of a physical layer or from the UE to the base station through an uplink data channel of a physical layer, and may also be referred to as RRC signaling, PDCP signaling, or a medium access control (MAC) control element (CE) (MAC CE).

In the disclosure, determining the priority between A and B may refer to selecting the one having a higher priority according to a predetermined priority rule and performing an operation corresponding thereto, or omitting or dropping an operation corresponding to the one having a lower priority, etc.

In the disclosure, the embodiments described above through multiple embodiments, but these are not independent, and it is possible that one or more embodiments may be applied simultaneously or in combination.

[In Relation to DMRS]

Next, an antenna field indication included in DCI format 1_1 and DCI format 1_2 defined in [Table 6] above will be described. The antenna port field within DCI format 1_1 and DCI format 1_2 may be expressed in 4, 5, or 6 bits, and the base station may indicate antenna port-related information to the UE based on [Table 22] to [Table 29] below.

TABLE 22

| Antenna port(s) (1000 + DMRS port), dmrs-Type = 1, maxLength = 1 One Codeword: Codeword 0 enabled, Codeword 1 disabled | | |
|---|---|---|
| Value | Number of DMRS CDM group(s) without data | DMRS port(s) |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 23

| Antenna port(s) (1000 + DMRS port), dmrs-Type = 1, maxLength = 1 One Codeword: Codeword 0 enabled, Codeword 1 disabled | | |
|---|---|---|
| Value | Number of DMRS CDM group(s) without data | DMRS port(s) |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12 | 2 | 0, 2, 3 |
| 13-15 | Reserved | Reserved |

TABLE 24

Antenna port(s) (1000 + DMRS port), dmrs-Type = 1, maxLength = 2

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

TABLE 25

Antenna port(s) (1000 + DMRS port), dmrs-Type = 1, maxLength = 2

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 3 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |

TABLE 25-continued

Antenna port(s) (1000 + DMRS port), dmrs-Type = 1, maxLength = 2

TABLE 25-continued

| Antenna port(s) (1000 + DMRS port), dmrs-Type = 1, maxLength = 2 | | | | | | |
|---|---|---|---|---|---|---|
| One Codeword: Codeword 0 enabled, Codeword 1 disabled | | | | Two Codewords: Codeword 0 enabled, Codeword 1 enabled | | |
| Value | Number of DMRS CDM group(s) without data | DMRS port(s) | Number of front-load symbols | Value | Number of DMRS CDM group(s) without data | DMRS port(s) | Number of front-load symbols |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | 2 | 0, 2, 3 | 1 | | | | |

TABLE 26

| Antenna port(s) (1000 + DMRS port), dmrs-Type = 2, maxLength = 1 | | | | | |
|---|---|---|---|---|---|
| One codeword: Codeword 0 enabled, Codeword 1 disabled | | | Two codewords: Codeword 0 enabled, Codeword 1 enabled | | |
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |

TABLE 26-continued

| Antenna port(s) (1000 + DMRS port), dmrs-Type = 2, maxLength = 1 | | | | | |
|---|---|---|---|---|---|
| One codeword: Codeword 0 enabled, Codeword 1 disabled | | | Two codewords: Codeword 0 enabled, Codeword 1 enabled | | |
| Value | Number of DMRS CDM group(s) without data | DMRS port(s) | Value | Number of DMRS CDM group(s) without data | DMRS port(s) |
| 23 | 2 | 0, 2 | | | |
| 24-31 | Reserved | Reserved | | | |

TABLE 27

| Antenna port(s) (1000 + DMRS port), dmrs-Type = 2, maxLength = 1 | | | | | |
|---|---|---|---|---|---|
| One codeword: Codeword 0 enabled, Codeword 1 disabled | | | Two codewords: Codeword 0 enabled, Codeword 1 enabled | | |
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24 | 2 | 0, 2, 3 | | | |
| 25-31 | Reserved | Reserved | | | |

TABLE 28

| Antenna port(s) (1000 + DMRS port), dmrs-Type = 2, maxLength = 2 | | | | | | | |
|---|---|---|---|---|---|---|---|
| One codeword: Codeword 0 enabled, Codeword 1 disabled | | | | Two Codewords: Codeword 0 enabled, Codeword 1 enabled | | | |
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |

TABLE 28-continued

| Antenna port(s) (1000 + DMRS port), dmrs-Type = 2, maxLength = 2 | | | | | | | |
|---|---|---|---|---|---|---|---|
| One codeword: Codeword 0 enabled, Codeword 1 disabled | | | | Two Codewords: Codeword 0 enabled, Codeword 1 enabled | | | |
| Value | Number of DMRS CDM group(s) without data | DMRS port(s) | Number of front-load symbols | Value | Number of DMRS CDM group(s) without data | DMRS port(s) | Number of front-load symbols |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

TABLE 29

| Antenna port(s) (1000 + DMRS port), dmrs-Type = 2, maxLength = 2 | | | | | | | |
|---|---|---|---|---|---|---|---|
| One codeword: Codeword 0 enabled, Codeword 1 disabled | | | | Two Codewords: Codeword 0 enabled, Codeword 1 enabled | | | |
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0.1, 2.3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58 | 2 | 0, 2, 3 | 1 | | | | |
| 59-63 | Reserved | Reserved | Reserved | | | | |

[Table 22] and [Table 23] are tables used when indicating that dmrs-type is 1 and maxLength is 1, [Table 24] and [Table 25] are tables used when indication that dmrs-type=1 and maxLength=2, [Table 26] and [Table 27] indicate DMRS ports used when dmrs-type=2, and maxLength=1, and [Table 28] and [Table 29] indicate DMRS ports used when dmrs-type is 2, and maxLength is 2.

When the UE receives an MAC-CE for activating a codepoint indicating two TCI states with respect to at least one codepoint in the TCI state field within DCI, the UE may receive an indication of DMRS ports by using [Table 23], [Table 25], [Table 27], and [Table 29], and otherwise, may receive an indication of DMRS ports by using [Table 22], [Table 24], [Table 26], and [Table 28]. When the UE receives an indication of a codepoint indicating two TCI states through the TCI state field, the UE may receive an indication of an entry indicating DMRS ports 1000, 1002, and 1003 for a NC-JT scheduling purpose in [Table 23], [Table 25], [Table 27], and [Table 29], and the entry may correspond to #12 in [Table 23], #31 in [Table 25], #24 in [Table 27], and #58 in [Table 29].

With respect to DCI format 1_1, if the higher layer signaling dmrs-DownlinkForPDSCH-MappingTypeA and dmrs-DownlinkForPDSCH-MappingTypeB are both configured for the UE, a bit length of an antenna port field in DCI format 1_1 may be determined as max{xA, xB}, and in this case, xA and xB may denote bit lengths of an antenna port field determined through dmrs-DownlinkForPDSCH-MappingTypeA and dmrs-DownlinkForPDSCH-MappingTypeB, respectively. If a PDSCH mapping type corresponding to the smaller value among xA and xB is scheduled, each MSB bit, the number of which is equal to |xA−xB|, may be allocated 0 bits and then transmitted.

With respect to DCI format 1_2, if the higher layer signaling antennaPortsFieldPresenceDCI-1-2 is not configured for the UE, there may be no antenna port field in DCI format 1_2. That is, the length of the antenna port field may be 0 bits, and the UE may determine a DMRS port by assuming the 0-th entry in [Table 22], [Table 24], [Table 26], and [Table 28]. If the higher layer signaling antennaPorts-FieldPresenceDCI-1-2 is configured for the UE, the bit length of an antenna port field in DCI format 1_2 may be determined similarly to the case of DCI format 1_1. If the higher layer signaling dmrs-DownlinkForPDSCH-MappingTypeA-DCI-1-2 and dmrs-DownlinkForPDSCH-MappingTypeB-DCI-1-2 are both configured for the UE, the bit length of an antenna port field in DCI format 1_2 may be determined as max{xA, xB}, and in this case, xA and xB may denote bit lengths of an antenna port field determined through dmrs-DownlinkForPDSCH-MappingTypeA-DCI-1-2 and dmrs-DownlinkForPDSCH-MappingTypeB-DCI-1-2, respectively. If a PDSCH mapping type corresponding to the smaller value among xA and xB is scheduled, each MSB bit, the number of which is equal to |xA−xB|, may be allocated 0 bits and then transmitted.

The numbers 1, 2, and 3 indicated by number of DMRS CDM group(s) without data in [Table 22] to [Table 29] may indicate CDM groups {0}, {0, 1}, and {0, 1, 2}, respectively. DMRS port(s) shows indexes of used ports in sequence. Antenna port may be indicated by DMRS port+1000. A CDM group of a DMRS is connected to a method of generating a DMRS sequence and an antenna port as shown in [Table 30] and [Table 31]. [Table 30] shows parameters of a case of using dmrs-type=1, and [Table 31] shows parameters of a case of using dmrs-type=2.

TABLE 30

Parameters for PDSCH DM-RS dmrs-type = 1.

| p | CDM group λ | Δ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 31

Parameters for PDSCH DM-RS dmrs-type = 2.

| p | CDM group λ | Δ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

A DMRS sequence according to each parameter is determined by Equation 2 below. In Equation 2, p denotes a DMRS port, k denotes a subcarrier index, 1 denotes an OFDM symbol index, μ denotes a subcarrier spacing, $w_f(k')$ and $w_t(l')$ denote a frequency domain orthogonal cover code (FD-OCC) coefficient and a time domain orthogonal cover code (TD-OCC) coefficient according to a k' value and a l' value, respectively, and Δ expresses the interval between CDM groups by using the number of subcarriers. In Equation 2, $$\beta_{PUSCH}^{DMRS}$$

is a scaling factor indicating the ratio between the energy-per-RE (EPRE) of a PDSCH and the EPRE of a DMRS, and may be calculated by $$\beta_{PDSCH}^{DMRS} = 10^{-\frac{\beta_{DMRS}}{20}},$$

and the value of $\beta_{DMRS}$ may be 0 dB, −3 dB, and −4.77 dB according to the number of CDM groups of 1, 2, and 3.

$$a_{k,l}^{(p,\mu)} = \beta_{PDSCH}^{DMRS} w_f(k')w_t(l')r(2n + k') \qquad \text{[Equation 2]}$$

$$k = \begin{cases} 4n + 2k' + \Delta & \text{Configuration type 1} \\ 6n + k' + \Delta & \text{Configuration type 2} \end{cases}$$

51
-continued $$k' = 0, 1$$
$$l = \bar{l} + l'$$
$$n = 0, 1, \ldots$$

In case that DMRS type 1 is used, if a single codeword is scheduled and entries #2, #9, #10, #11, and #30 are indicated to a UE by using [Table 22] and [Table 24], if a single codeword is scheduled and entries #2, #9, #10, #11, and #12 are indicated thereto by using [Table 23], if a single codeword is scheduled and entries #2, #9, #10, #11, #30, and #31 are indicated thereto by using [Table 25], or if two codewords are scheduled, the UE may consider that the scheduling is single-user MIMO scheduling. That is, the UE may assume that a different UE is not scheduled to all remaining orthogonal DMRS ports other than DMRS ports allocated to a scheduled PDSCH, and may not expect multi-user MIMO (MU-MIMO) scheduling. In this case, the UE does not assume that a different UE is co-scheduled, and may not perform a multi-user MIMO reception operation like canceling, nulling, or whitening multi-user interference.

In case that DMRS type 2 is used, if a single codeword is scheduled and entries #2, #10, and #23 are indicated to a UE by using [Table 26] and [Table 28], if a single codeword is scheduled and entries #2, #10, #23, and #24 are indicated thereto by using [Table 27], if a single codeword is scheduled and entries #2, #10, #23, and #58 are indicated thereto by using [Table 29], or if two codewords are scheduled, the UE may consider that the scheduling is single-user MIMO scheduling. That is, the UE may assume that a different UE is not scheduled to all remaining orthogonal DMRS ports other than DMRS ports allocated to a scheduled PDSCH, and may not expect multi-user MIMO scheduling. In this case, the UE does not assume that a different UE is co-scheduled, and may not perform a multi-user MIMO reception operation like canceling, nulling, or whitening multi-user interference.

The UE may not expect that while the number of maximum front-loaded DMRS symbols is configured to be len2 through the higher layer signaling maxLength, more than one additional DMRS symbol is configured through the higher layer signaling dmrs-AdditionalPosition.

The UE may not expect that the number of actual front-loaded DMRS, the number of actual additional DMRS symbol, a DMRS symbol position, and a DMRS type configuration are different for all UEs subject to multi-user MIMO scheduling.

In a case of a UE having a PRG size of 2 or 4, the UE may not expect that frequency resource allocation does not match in a PRG unit grid for a different UE co-scheduled using different orthogonal DMRS ports in the same CDM group as that of a DMRS port indicated to the UE.

In a case of a PDSCH scheduled by DCI format 1_1 and 1_2, a UE may assume that CDM groups indicated through the column of "number of DMRS CDM group(s) without data" in [Table 22] to [Table 29] may include DMRS ports allocated to a different UE which may be co-scheduled through a multi-user MIMO scheme, and may not be used for data transmission of the corresponding UE, and the values of 1, 2, and 3 indicated through the column of "number of DMRS CDM group(s) without data" in [Table 22] to [Table 29] may be understood that the indexes of CDM groups corresponding to the described values correspond to CDM groups 0, {0,1}, and {0,1,2}, respectively.

If the higher layer signaling dmrs-FD-OCC-disableForRank1PDSCH is configured for a UE and one DMRS port is allocated to the UE for PDSCH scheduling, the UE may not expect that a different UE is allocated a DMRS port in which a different FD-OCC is used, among different orthogonal DMRS ports belonging to the same CDM group as that of the one allocated DMRS port.

Next, an antenna field indication included in DCI format 0_1 and DCI format 0_2 defined in [Table 4] above will be described. The antenna port field within DCI format 0_1 and DCI format 0_2 may be expressed in 3, 4, or 5 bits, and the base station may indicate antenna-related information to the UE based on [Table 32] to [Table 47] below.

TABLE 32

Antenna port(s), transform precoder is disabled,
dmrs-Type = 1, maxLength = 1, rank = 1

| Value | Number of DMRS CDM group(s) without data | DMRS port(s) |
|---|---|---|
| 0 | 1 | 0 |
| 1 | 1 | 1 |
| 2 | 2 | 0 |
| 3 | 2 | 1 |
| 4 | 2 | 2 |
| 5 | 2 | 3 |
| 6-7 | Reserved | Reserved |

TABLE 33

Antenna port(s), transform precoder is disabled, dmrs-Type = 1,
maxLength = 1, rank = 2

| Value | Number of DMRS CDM group(s) without data | DMRS port(s) |
|---|---|---|
| 0 | 1 | 0,1 |
| 1 | 2 | 0,1 |
| 2 | 2 | 2,3 |
| 3 | 2 | 0,2 |
| 4-7 | Reserved | Reserved |

TABLE 34

Antenna port(s), transform precoder is disabled, dmrs-Type = 1,
maxLength = 1, rank = 3

| Value | Number of DMRS CDM group(s) without data | DMRS port(s) |
|---|---|---|
| 0 | 2 | 0-2 |
| 1-7 | Reserved | Reserved |

TABLE 35

Antenna port(s), transform precoder is disabled, dmrs-Type = 1,
maxLength = 1, rank = 4

| Value | Number of DMRS CDM group(s) without data | DMRS port(s) |
|---|---|---|
| 0 | 2 | 0-3 |
| 1-7 | Reserved | Reserved |

TABLE 36

| | Antenna port(s), transform precoder is disabled, dmrs-Type = 1, maxLength = 2, rank = 1 | | |
| --- | --- | --- | --- |
| Value | Number of DMRS CDM group(s) without data | DMRS port(s) | Number of front-load symbols |
| 0 | 1 | 0 | 1 |
| 1 | 1 | 1 | 1 |
| 2 | 2 | 0 | 1 |
| 3 | 2 | 1 | 1 |
| 4 | 2 | 2 | 1 |
| 5 | 2 | 3 | 1 |
| 6 | 2 | 0 | 2 |
| 7 | 2 | 1 | 2 |
| 8 | 2 | 2 | 2 |
| 9 | 2 | 3 | 2 |
| 10 | 2 | 4 | 2 |
| 11 | 2 | 5 | 2 |
| 12 | 2 | 6 | 2 |
| 13 | 2 | 7 | 2 |
| 14-15 | Reserved | Reserved | Reserved |

TABLE 37

| | Antenna port(s), transform precoder is disabled, dmrs-Type = 1, maxLength = 2, rank = 2 | | |
| --- | --- | --- | --- |
| Value | Number of DMRS CDM group(s) without data | DMRS port(s) | Number of front-load symbols |
| 0 | 1 | 0,1 | 1 |
| 1 | 2 | 0,1 | 1 |
| 2 | 2 | 2,3 | 1 |
| 3 | 2 | 0,2 | 1 |
| 4 | 2 | 0,1 | 2 |
| 5 | 2 | 2,3 | 2 |
| 6 | 2 | 4,5 | 2 |
| 7 | 2 | 6,7 | 2 |
| 8 | 2 | 0,4 | 2 |
| 9 | 2 | 2,6 | 2 |
| 10-15 | Reserved | Reserved | Reserved |

TABLE 38

| | Antenna port(s), transform precoder is disabled, dmrs-Type = 1, maxLength = 2, rank = 3 | | |
| --- | --- | --- | --- |
| Value | Number of DMRS CDM group(s) without data | DMRS port(s) | Number of front-load symbols |
| 0 | 2 | 0-2 | 1 |
| 1 | 2 | 0,1,4 | 2 |
| 2 | 2 | 2,3,6 | 2 |
| 3-15 | Reserved | Reserved | Reserved |

TABLE 39

| | Antenna port(s), transform precoder is disabled, dmrs-Type = 1, maxLength = 2, rank = 4 | | |
| --- | --- | --- | --- |
| Value | Number of DMRS CDM group(s) without data | DMRS port(s) | Number of front-load symbols |
| 0 | 2 | 0-3 | 1 |
| 1 | 2 | 0,1,4,5 | 2 |
| 2 | 2 | 2,3,6,7 | 2 |
| 3 | 2 | 0,2,4,6 | 2 |
| 4-15 | Reserved | Reserved | Reserved |

TABLE 40

| | Antenna port(s), transform precoder is disabled, dmrs-Type = 2, maxLength = 1, rank = 1 | |
| --- | --- | --- |
| Value | Number of DMRS CDM group(s) without data | DMRS port(s) |
| 0 | 1 | 0 |
| 1 | 1 | 1 |
| 2 | 2 | 0 |
| 3 | 2 | 1 |
| 4 | 2 | 2 |
| 5 | 2 | 3 |
| 6 | 3 | 0 |
| 7 | 3 | 1 |
| 8 | 3 | 2 |
| 9 | 3 | 3 |
| 10 | 3 | 4 |
| 11 | 3 | 5 |
| 12-15 | Reserved | Reserved |

TABLE 41

| | Antenna port(s), transform precoder is disabled, dmrs-Type = 2, maxLength = 1, rank = 2 | |
| --- | --- | --- |
| Value | Number of DMRS CDM group(s) without data | DMRS port(s) |
| 0 | 1 | 0,1 |
| 1 | 2 | 0,1 |
| 2 | 2 | 2,3 |
| 3 | 3 | 0,1 |
| 4 | 3 | 2,3 |
| 5 | 3 | 4,5 |
| 6 | 2 | 0,2 |
| 7-15 | Reserved | Reserved |

TABLE 42

| | Antenna port(s), transform precoder is disabled, dmrs-Type = 2, maxLength = 1, rank = 3 | |
| --- | --- | --- |
| Value | Number of DMRS CDM group(s) without data | DMRS port(s) |
| 0 | 2 | 0-2 |
| 1 | 3 | 0-2 |
| 2 | 3 | 3-5 |
| 3-15 | Reserved | Reserved |

TABLE 43

| | Antenna port(s), transform precoder is disabled, dmrs-Type = 2, maxLength = 1, rank = 4 | |
| --- | --- | --- |
| Value | Number of DMRS CDM group(s) without data | DMRS port(s) |
| 0 | 2 | 0-3 |
| 1 | 3 | 0-3 |
| 2-15 | Reserved | Reserved |

TABLE 44

| | Antenna port(s), transform precoder is disabled, dmrs-Type = 2, maxLength = 2, rank = 1 | | |
| --- | --- | --- | --- |
| Value | Number of DMRS CDM group(s) without data | DMRS port(s) | Number of front-load symbols |
| 0 | 1 | 0 | 1 |
| 1 | 1 | 1 | 1 |
| 2 | 2 | 0 | 1 |
| 3 | 2 | 1 | 1 |
| 4 | 2 | 2 | 1 |

55

TABLE 44-continued

| | Antenna port(s), transform precoder is disabled, dmrs-Type = 2, maxLength = 2, rank = 1 | | |
|---|---|---|---|
| Value | Number of DMRS CDM group(s) without data | DMRS port(s) | Number of front-load symbols |
| 5 | 2 | 3 | 1 |
| 6 | 3 | 0 | 1 |
| 7 | 3 | 1 | 1 |
| 8 | 3 | 2 | 1 |
| 9 | 3 | 3 | 1 |
| 10 | 3 | 4 | 1 |
| 11 | 3 | 5 | 1 |
| 12 | 3 | 0 | 2 |
| 13 | 3 | 1 | 2 |
| 14 | 3 | 2 | 2 |
| 15 | 3 | 3 | 2 |
| 16 | 3 | 4 | 2 |
| 17 | 3 | 5 | 2 |
| 18 | 3 | 6 | 2 |
| 19 | 3 | 7 | 2 |
| 20 | 3 | 8 | 2 |
| 21 | 3 | 9 | 2 |
| 22 | 3 | 10 | 2 |
| 23 | 3 | 11 | 2 |
| 24 | 1 | 0 | 2 |
| 25 | 1 | 1 | 2 |
| 26 | 1 | 6 | 2 |
| 27 | 1 | 7 | 2 |
| 28-31 | Reserved | Reserved | Reserved |

TABLE 45

| | Antenna port(s), transform precoder is disabled, dmrs-Type = 2, maxLength = 2, rank = 2 | | |
|---|---|---|---|
| Value | Number of DMRS CDM group(s) without data | DMRS port(s) | Number of front-load symbols |
| 0 | 1 | 0,1 | 1 |
| 1 | 2 | 0,1 | 1 |
| 2 | 2 | 2,3 | 1 |
| 3 | 3 | 0.1 | 1 |
| 4 | 3 | 2,3 | 1 |
| 5 | 3 | 4,5 | 1 |
| 6 | 2 | 0,2 | 1 |
| 7 | 3 | 0,1 | 2 |
| 8 | 3 | 2,3 | 2 |
| 9 | 3 | 4,5 | 2 |
| 10 | 3 | 6,7 | 2 |
| 11 | 3 | 8.9 | 2 |
| 12 | 3 | 10,11 | 2 |
| 13 | 1 | 0,1 | 2 |
| 14 | 1 | 6,7 | 2 |
| 15 | 2 | 0,1 | 2 |
| 16 | 2 | 2,3 | 2 |
| 17 | 2 | 6,7 | 2 |
| 18 | 2 | 8,9 | 2 |
| 19-31 | Reserved | Reserved | Reserved |

TABLE 46

| | Antenna port(s), transform precoder is disabled, dmrs-Type = 2, maxLength = 2, rank = 3 | | |
|---|---|---|---|
| Value | Number of DMRS CDM group(s) without data | DMRS port(s) | Number of front-load symbols |
| 0 | 2 | 0-2 | 1 |
| 1 | 3 | 0-2 | 1 |
| 2 | 3 | 3-5 | 1 |

56

TABLE 46-continued

| | Antenna port(s), transform precoder is disabled, dmrs-Type = 2, maxLength = 2, rank = 3 | | |
|---|---|---|---|
| Value | Number of DMRS CDM group(s) without data | DMRS port(s) | Number of front-load symbols |
| 3 | 3 | 0,1,6 | 2 |
| 4 | 3 | 2,3,8 | 2 |
| 5 | 3 | 4,5,10 | 2 |
| 6-31 | Reserved | Reserved | Reserved |

TABLE 47

| | Antenna port(s), transform precoder is disabled, dmrs-Type = 2, maxLength = 2, rank = 4 | | |
|---|---|---|---|
| Value | Number of DMRS CDM group(s) without data | DMRS port(s) | Number of front-load symbols |
| 0 | 2 | 0-3 | 1 |
| 1 | 3 | 0-3 | 1 |
| 2 | 3 | 0,1,6,7 | 2 |
| 3 | 3 | 2,3,8,9 | 2 |
| 4 | 3 | 4,5,10,11 | 2 |
| 5-31 | Reserved | Reserved | Reserved |

[Table 32] to [Table 35] are tables used when indicating that dmrs-type is 1 and maxLength is 1, [Table 36] to [Table 39] are tables used when indicating that dmrs-type=1 and maxLength=2, [Table 40] to [Table 43] indicate DMRS ports used when dmrs-type=2, and maxLength=1, and [Table 44] to [Table 47] indicate DMRS ports used when dmrs-type is 2, and maxLength is 2.

With respect to DCI format 0_1, if the higher layer signaling dmrs-UplinkForPUSCH-MappingTypeA and dmrs-UplinkForPUSCH-MappingTypeB are both configured for the UE, a bit length of an antenna port field in DCI format 0_1 may be determined as max{xA, xB}, and in this case, xA and xB may denote bit lengths of an antenna port field determined through dmrs-UplinkForPUSCH-MappingTypeA and dmrs-UplinkForPUSCH-MappingTypeB, respectively. If a PUSCH mapping type corresponding to the smaller value among xA and xB is scheduled, each MSB bit, the number of which is equal to |xA−xB|, may be allocated 0 bits and then transmitted.

With respect to DCI format 0_2, if the higher layer signaling antennaPortsFieldPresenceDCI-0-2 is not configured for the UE, there may be no antenna port field in DCI format 0_2. That is, the length of the antenna port field may be 0 bits, and the UE may determine a DMRS port by assuming the 0-th entry in [Table 32] to [Table 47]. If the higher layer signaling antennaPortsFieldPresenceDCI-0-2 is configured for the UE, the bit length of an antenna port field in DCI format 0_2 may be determined similarly to the case of DCI format 0_1. If the higher layer signaling dmrs-UplinkForPUSCH-MappingTypeA-DCI-0-2 and dmrs-UplinkForPUSCH-MappingTypeB-DCI-0-2 are both configured for the UE, the bit length of an antenna port field in DCI format 0_2 may be determined as max{xA, xB}, and in this case, xA and xB may denote bit lengths of an antenna port field determined through dmrs-UplinkForPUSCH-MappingTypeA-DCI-0-2 and dmrs-UplinkForPUSCH-MappingTypeB-DCI-0-2, respectively. If a PUSCH mapping type corresponding to the smaller value among xA and xB is scheduled, each MSB bit, the number of which is equal to |xA−xB|, may be allocated 0 bits and then transmitted.

The numbers 1, 2, and 3 indicated by number of DMRS CDM group(s) without data in [Table 32] to [Table 47] may indicate CDM groups {0}, {0, 1}, and {0, 1, 2}, respectively. DMRS port(s) shows indexes of used ports in sequence. Antenna port may be indicated by DMRS port+1000. A CDM group of a DMRS is connected to a method of generating a DMRS sequence and an antenna port as shown in [Table 48] and [Table 49]. [Table 48] shows parameters of a case of using dmrs-type=1, and [Table 49] shows parameters of a case of using dmrs-type=2.

TABLE 48

| Parameters for PUSCH DM-RS dmrs-type = 1. | | | | | | |
|---|---|---|---|---|---|---|
| | CDM | | | $w_f(k')$ | | $w_t(l')$ |
| $\tilde{p}$ | group λ | Δ | k' = 0 | k' = 1 | l' = 0 | l' = 1 |
| 0 | 0 | 0 | +1 | +1 | +1 | +1 |
| 1 | 0 | 0 | +1 | −1 | +1 | +1 |
| 2 | 1 | 1 | +1 | +1 | +1 | +1 |
| 3 | 1 | 1 | +1 | −1 | +1 | +1 |
| 4 | 0 | 0 | +1 | +1 | +1 | −1 |
| 5 | 0 | 0 | +1 | −1 | +1 | −1 |
| 6 | 1 | 1 | +1 | +1 | +1 | −1 |
| 7 | 1 | 1 | +1 | −1 | +1 | −1 |

TABLE 49

| Parameters for PUSCH DM-RS dmrs-type = 2. | | | | | | |
|---|---|---|---|---|---|---|
| | CDM | | | $w_f(k')$ | | $w_t(l')$ |
| $\tilde{p}$ | group λ | Δ | k' = 0 | k' = 1 | l' = 0 | l' = 0 |
| 0 | 0 | 0 | +1 | +1 | +1 | +1 |
| 1 | 0 | 0 | +1 | −1 | +1 | +1 |
| 2 | 1 | 2 | +1 | +1 | +1 | +1 |
| 3 | 1 | 2 | +1 | −1 | +1 | +1 |
| 4 | 2 | 4 | +1 | +1 | +1 | +1 |
| 5 | 2 | 4 | +1 | −1 | +1 | +1 |
| 6 | 0 | 0 | +1 | +1 | +1 | −1 |
| 7 | 0 | 0 | +1 | −1 | +1 | −1 |
| 8 | 1 | 2 | +1 | +1 | +1 | −1 |
| 9 | 1 | 2 | +1 | −1 | +1 | −1 |
| 10 | 2 | 4 | +1 | +1 | +1 | −1 |
| 11 | 2 | 4 | +1 | −1 | +1 | −1 |

A DMRS sequence according to each parameter is determined by Equation 3 below. In Equation 3, $\tilde{p}$ denotes a DMRS port, k denotes a subcarrier index, l denotes an OFDM symbol index, μ denotes a subcarrier spacing, $w_f(k')$ and $w_t(l')$ denote a frequency domain orthogonal cover code (FD-OCC) coefficient and a time domain orthogonal cover code (TD-OCC) coefficient according to a k' value and a l' value, respectively, and Δ expresses the interval between CDM groups by using the number of subcarriers. In Equation 3, $$\beta_{PUSCH}^{DMRS}$$

is a scaling factor indicating the ratio between the energy-per-RE (EPRE) of a PUSCH and the EPRE of a DMRS, and may be calculated by $$\beta_{PDSCH}^{DMRS} = 10^{\frac{\beta_{DMRS}}{20}},$$

and the value of $\beta_{DMRS}$ may be 0 dB, −3 dB, and −4.77 dB according to the number of CDM groups of 1, 2, and 3.

$$a_{k,i}^{(p_j,\mu)} = w_f(k')w_r(l')r(2n + k') \qquad \text{[Equation 3]}$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

$$j = 0, 1, \ldots, \nu - 1$$

$$\begin{bmatrix} a_{k,i}^{(p_0,\mu)} \\ \vdots \\ a_{k,i}^{(p_{\rho-1},\mu)} \end{bmatrix} = \beta_{PUSCH}^{DMRS} W \begin{bmatrix} \tilde{a}_{k,i}^{(p_0,\mu)} \\ \vdots \\ \tilde{a}_{k,i}^{(p_{\nu-1},\mu)} \end{bmatrix}$$

If frequency hopping is not used, the UE may need to assume that higher layer signaling dmrs-AdditionalPosition is configured to be "pos2" and up to two additional DMRS symbols may be used for PUSCH transmission. If frequency hopping is used, the UE may need to assume that higher layer signaling dmrs-AdditionalPosition is configured to be "pos1" and up to one additional DMRS symbol may be used for PUSCH transmission.

In a case of a PUSCH scheduled by DCI format 0_1 and 1_2, a UE may assume that CDM groups indicated through the column of "number of DMRS CDM group(s) without data" in [Table 32] to [Table 47] may include DMRS ports allocated to a different UE which may be co-scheduled through a multi-user MIMO scheme, and may not be used for data transmission of the corresponding UE, and the values of 0, 2, and 3 indicated through the column of "number of DMRS CDM group(s) without data" in [Table 32] to [Table 47] may be understood that the indexes of CDM groups corresponding to the described values correspond to CDM groups 0, {0,1}, and {0,1,2}, respectively.

Embodiment 1: Method of Supporting Enhanced DMRS Types 1 and 2 Supporting Increased Number of Orthogonal Ports As an embodiment of the disclosure, a method of supporting enhanced DMRS types 1 and 2 supporting increased number of orthogonal ports will be described.

An evolved standard of 5G may support enhanced DMRS type 1 and enhanced DMRS type 2 supporting an increased number of orthogonal ports while maintaining the same RE use amount and the same overhead as those of DMRS type 1 and DMRS type 2 which have been supported in an initial standard of 5G for all uplink and downlink. Conventional DMRS type 1 may support up to 4 and 8 orthogonal DMRS ports if the number of front-loaded symbols is 1 and 2, respectively, and conventional DMRS type 2 may support up to 6 and 12 orthogonal DMRS ports if the number of front-loaded symbols is 1 and 2, respectively.

From the supporting of the conventional DMRS, enhanced DMRS type 1 may support up to 8 and 16 orthogonal DMRS ports if the number of front-loaded symbols is 1 and 2, respectively, and enhanced DMRS type 2 may support up to 12 and 24 orthogonal DMRS ports if the number of front-loaded symbols is 1 and 2, respectively.

Hereinafter, a new DMRS type supporting an increased number of orthogonal ports as described above may be named one of "enhanced DMRS types 1 and 2," "new DMRS types 1 and 2," "new DMRS types 1 and 2," "DMRS types 1-1 and 2-1," or "DMRS types 3 and 4," and other similar expanded names which may be used to indicate a function improved compared to that of conventional DMRS types 1 and 2 may not be excluded. The following items are described mainly for downlink, but may also be applied similarly to uplink DMRS support.

If a UE supports enhanced DMRS types 1 and 2, the UE may report a UE capability of supporting enhanced DMRS types 1 and 2 to a base station. The UE capability report may be transmitted to the base station per band and, more specifically, may be possible also per feature set (FS) or per feature set per component carrier (FSPC). In addition, the UE capability report may be differently supported for each frequency range (FR), or may be limited to FR1.

Furthermore, the UE capability report may include, as described above, the meaning that enhanced DMRS type 1 may support up to 8 and 16 orthogonal DMRS ports if the number of front-loaded symbols is 1 and 2, respectively, and enhanced DMRS type 2 may support up to 12 and 24 orthogonal DMRS ports if the number of front-loaded symbols is 1 and 2, respectively. The UE may report on enhanced DMRS types 1 and 2 through a common UE capability report, and may report whether the UE supports only enhanced DMRS type 1, supports only enhanced DMRS type 2, or supports both enhanced DMRS types 1 and 2 or may report whether the UE supports each of enhanced DMRS types 1 and 2 through an individual UE capability.

In addition, if the UE supports a dynamic switching function between an enhanced DMRS type and a conventional DMRS type, the UE may report the function through a UE capability. The dynamic switching function between an enhanced DMRS type and a conventional DMRS type may mean that a DMRS type configured through higher layer signaling is changeable through a MAC-CE, that selection between an enhanced DMRS type and a conventional DMRS type is possible through DCI, or both of them. If the UE reports, through a common UE capability, whether enhanced DMRS types 1 and 2 are supported, the UE may report, through one UE capability, whether a dynamic switching function for DMRS types 1 and 2 is supported, while reporting whether the UE supports only dynamic switching between DMRS type 1 and enhanced DMRS type 1, the UE supports only dynamic switching between DMRS type 2 and enhanced DMRS type 2, or the UE supports dynamic switching between an enhanced DMRS type and a conventional DMRS type for both of two DMRS types. On the contrary, in case that the UE reports, through an individual UE capability, whether enhanced DMRS types 1 and 2 are supported, the UE may report, through an individual UE capability for each DMRS type, that dynamic switching between a conventional DMRS type and an enhanced DMRS type is possible.

In case that the UE operates in enhanced DMRS type 1 or 2, if the UE supports conventional DMRS type 1 or 2 and multi-user MIMO scheduling, the UE may report the function through a UE capability. The multi-user MIMO scheduling may indicate co-scheduling between conventional DMRS type 1 and enhanced DMRS type 1, or co-scheduling between conventional DMRS type 2 and enhanced DMRS type 2. Similarly to the above description, by reporting a UE capability relating to whether co-scheduling between a conventional DMRS type and an enhanced DMRS type is possible through a common UE capability, the UE may report that only co-scheduling between conventional DMRS type 1 and enhanced DMRS type 1 is possible, only co-scheduling between conventional DMRS type 2 and enhanced DMRS type 2 is possible, or co-scheduling between a conventional DMRS type and an enhanced DMRS type is possible for both DMRS types 1 and 2, or the reports may be performed through an individual UE capability for each DMRS type.

With respect to the UE having reported a UE capability, a base station may configure an enhanced DMRS type 1 and 2 scheme for the UE through higher layer signaling by using the following methods.

[Higher layer configuration method 1] For example, a UE may receive a configuration that an enhanced DMRS type is supported through the higher layer signaling DMRS-DownlinkConfig.

[Higher layer configuration method 1-1] The higher layer signaling dmrs-Type-r18 similar to the higher layer signaling dmrs-Type used to determine a conventional DMRS type may be configured, and dmrs-Type-r18 may be used to define an enhanced DMRS type other than DMRS type 1 or 2. DMRS type 2 is used when a conventional dmrs-Type is configured and DMRS type 1 is used when a conventional dmrs-Type is not configured. An RRC IE called dmrs-Type-r18 in addition to dmrs-Type may be newly configured in the higher layer signaling DMRS-DownlinkConfig and through dmrs-Type-r18, one of DMRS types 1 and 2 and enhanced DMRS types 1 and 2 may be indicated, or one of enhanced DMRS types 1 and 2 may be indicated.

For example, as shown in [Table 50] below, if dmrs-Type-r18 is configured, one of DMRS type 2 and enhanced DMRS type 1 or 2 may be configured, and existing dmrs-Type may be disregarded, and if dmrs-Type-r18 is not configured, a DMRS type may be determined according to a dmrs-Type configuration scheme. For another example, if dmrs-Type-r18 is configured, one of enhanced DMRS types 1 and 2 may be configured, and existing dmrs-Type may be disregarded and if dmrs-Type-r18 is not configured, a DMRS type may be determined according to a dmrs-Type configuration scheme. In case that the above-described higher layer configuration methods are used, the UE may use only one of a conventional scheme (e.g., DMRS type 1 or 2) and an enhanced scheme (e.g., enhanced DMRS type 1 or 2) of DMRS type with respect to each of PDSCH mapping type A or B. The scheme may be a higher layer configuration scheme in which dynamic switching between a conventional scheme and an enhanced scheme is impossible, or dynamic switching is not considered. Here, dmrs-Type-r18 which is the name of an RRC IE is merely an example, and may be different from the name of an actual RRC IE.

TABLE 50

| DMRS-DownlinkConfig ::= | SEQUENCE { |
| dmrs-Type | ENUMERATED {type2} |
| OPTIONAL, -- Need S | |
| dmrs-AdditionalPosition | ENUMERATED {pos0, pos1, pos3} |
| OPTIONAL, -- Need S | |

TABLE 50-continued

| maxLength | ENUMERATED {len2} |
| OPTIONAL, -- Need S | |
| scramblingID0 | INTEGER (0..65535) |
| OPTIONAL, -- Need S | |
| scramblingID1 | INTEGER (0..65535) |
| | OPTIONAL, -- Need S |
| phase TrackingRS | SetupRelease { PTRS-DownlinkConfig } |
| OPTIONAL, -- Need M | |
| ..., | |
| [[ | |
| dmrs-Downlink-r16 | ENUMERATED {enabled} |
| OPTIONAL -- Need R | |
| ]] | |
| dmrs-Type-r18 | ENUMERATED {type2, etype1, etype2} |
| OPTIONAL, -- Need S | |
| } | |

[Higher layer configuration method 1-2] While maintaining a conventional meaning of an existing dmrs-Type switching from the base station through dynamicSwitchType that is additional higher layer signaling.

TABLE 51

| DMRS-DownlinkConfig ::= | SEQUENCE { |
| dmrs-Type | ENUMERATED {type2} |
| OPTIONAL, -- Need S | |
| dmrs-AdditionalPosition | ENUMERATED {pos0, pos1, pos3 } |
| OPTIONAL, -- Need S | |
| maxLength | ENUMERATED {len2} |
| OPTIONAL, -- Need S | |
| scramblingID0 | INTEGER (0..65535) |
| OPTIONAL, -- Need S | |
| scramblingID1 | INTEGER (0..65535) |
| | OPTIONAL, -- Need S |
| phase TrackingRS | SetupRelease { PTRS-DownlinkConfig } |
| OPTIONAL, -- Need M | |
| ..., | |
| [[ | |
| dmrs-Downlink-r16 | ENUMERATED {enabled} |
| OPTIONAL -- Need R | |
| ]] | |
| enhanced-Dmrs-Type-r18 | ENUMERATED {enabled} |
| OPTIONAL, -- Need S | |
| } | | for which one of DMRS types 1 and 2 is determined, a new RRC IE having the meaning of whether enhanced DMRS type 1 or 2 is available may be additionally configured to a UE. As shown in [Table 51] below, if the higher layer signaling dmrs-Type is not configured for a UE by a base station and enhanced-Dmrs-Type-r18 is not configured therefor, the UE may support a conventional scheme for DMRS type 1. In addition, if dmrs-Type is not configured for the UE and enhanced-Dmrs-Type-r18 is configured to be enabled, this may indicate that the UE may support an enhanced scheme for DMRS type 1. For example, it may mean that if dmrs-Type is configured as type 2 and enhanced-Dmrs-Type-r18 is not configured, DMRS type2 is supported and in this case, dmrs-Type is configured as type 2 and enhanced-Dmrs-Type-r18 is configured, enhanced DMRS type2 is supported. Here, in case that the UE supports dynamic switching between a conventional DMRS type and an enhanced DMRS type, if enhanced-Dmrs-Type-r18 is configured for the UE, the UE may perform dynamic switching without additional higher layer signaling for dynamic switching, or may receive a configuration on whether to perform dynamic

[Higher layer configuration method 2] A UE may not use the higher layer signaling DMRS-DownlinkConfig for supporting an enhanced DMRS type, and may individually receive a configuration that an enhanced DMRS type is supported through a new RRC IE in PDSCH-Config. As shown in [Table 52] below, if the higher layer signaling enhanced-Dmrs-Type-r18 is not configured for a UE by a base station, the UE may determine a DMRS type according to an existing DMRS-DownlinkConfig configuration. If the higher layer signaling enhanced-Dmrs-Type-r18 is configured for the UE by the base station, the UE may use an improved scheme for a DMRS type determined according to an existing DMRS-DownlinkConfig configuration. Here, in case that the UE supports dynamic switching between a conventional DMRS type and an enhanced DMRS type, if enhanced-Dmrs-Type-r18 is configured for the UE, the UE may perform dynamic switching without additional higher layer signaling for dynamic switching, or may receive a configuration on whether to perform dynamic switching from the base station through dynamicSwitchType that is additional higher layer signaling.

TABLE 52

| | |
|---|---|
| PDSCH-Config ::= | SEQUENCE { |
| dataScramblingIdentityPDSCH | INTEGER (0..1023) |
| OPTIONAL, -- Need S | |
| dmrs-DownlinkForPDSCH-MappingTypeA | SetupRelease { DMRS- |
| DownlinkConfig } OPTIONAL, -- Need M | |
| dmrs-DownlinkForPDSCH-MappingTypeB | SetupRelease { DMRS- |
| DownlinkConfig } OPTIONAL, -- Need M | |
| ... | |
| enhanced-Dmrs-Type-r18 | ENUMERATED {enabled} |
| OPTIONAL, -- Need S | |

Hereinafter, various support methods of determining specific RE mapping and an OCC for enhanced DMRS types 1 and 2 will be described.

[Enhanced DMRS Type 1 Support Method 1]

As an embodiment of a method of supporting enhanced DMRS type 1 described above, time and frequency resource mapping of a DMRS RE and a FD-OCC and TD-OCC coefficient therefor may be determined in case that enhanced DMRS type 1 is used based on [Equation 4] and [Table 53] below.

$$a_{k,l}^{(p,\mu)} = \beta_{PDSCH}^{DMRS} w_f(k')w_t(l')r(2n+k')$$ [Equation 4]

$$k = 8n + 4k' + \Delta \text{ (for new DMRS type 1)}$$

$$k' = 0, 1$$

$$l = \bar{l} + l'$$

$$n = 0, 1, \dots$$

$$\Delta = 0, 1, 2, 3$$

TABLE 53

Parameters for [Enhanced DMRS type 1 support method 1]

| p | CDM group λ | Δ | w_f(k') k' = 0 | w_f(k') k' = 1 | w_t(l') l' = 0 | w_t(l') l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 2 | 2 | +1 | +1 | +1 | +1 |
| 1005 | 2 | 2 | +1 | −1 | +1 | +1 |
| 1006 | 3 | 3 | +1 | +1 | +1 | +1 |
| 1007 | 3 | 3 | +1 | −1 | +1 | +1 |
| 1008 | 0 | 0 | +1 | +1 | +1 | −1 |
| 1009 | 0 | 0 | +1 | −1 | +1 | −1 |
| 1010 | 1 | 1 | +1 | +1 | +1 | −1 |
| 1011 | 1 | 1 | +1 | −1 | +1 | −1 |
| 1012 | 2 | 2 | +1 | +1 | +1 | −1 |
| 1013 | 2 | 2 | +1 | −1 | +1 | −1 |
| 1014 | 3 | 3 | +1 | +1 | +1 | −1 |
| 1015 | 3 | 3 | +1 | −1 | +1 | −1 |

In [Enhanced DMRS type 1 support method 1] based on [Equation 4] and [Table 53] above, a total of four CDM groups are used. In a case of one front-loaded DMRS symbol, two DMRS ports may be included in each CDM group and thus enhanced DMRS type 1 may support a total of eight orthogonal DMRS ports, and in a case of two front-loaded DMRS symbols, four DMRS ports may be included in each CDM group and thus enhanced DMRS type 1 may support a total of 16 orthogonal DMRS ports. Compared to the interval between REs allocated to a particular DMRS port in the same CDM group being two REs in conventional DMRS type 1, enhanced DMRS type 1 supports four CDM groups, and thus the interval may increase to four REs. According to method 1, the number of CDM groups is increased while the number of DMRS ports in each CDM group is maintained, and thus scheduling of a PDSCH to be transmitted together with a DMRS may be limited to the unit of two RBs. In Equation 4, $$\beta_{PDSCH}^{DMRS}$$

is a scaling factor indicating the ratio between the energy-per-RE (EPRE) of a PDSCH and the EPRE of a DMRS, and may be calculated by $$\beta_{PDSCH}^{DMRS} = 10^{-\frac{\beta_{DMRS}}{20}},$$

and the value of $\beta_{DMRS}$ may be 0 dB, −3 dB, −4.77 dB, and −6 dB according to the number of CDM groups of 1, 2, 3, and 4.

[Enhanced DMRS Type 1 Support Method 2]

As another embodiment of a method of supporting enhanced DMRS type 1 described above, time and frequency resource mapping of a DMRS RE and a FD-OCC and TD-OCC coefficient therefor may be determined in case that enhanced DMRS type 1 is used based on [Equation 5] and [Table 54] below.

$$a_{k,l}^{(p,\mu)} = \beta_{PDSCH}^{DMRS} w_f(k')w_t(l')r(2n+k')$$ [Equation 5]

$$k = 8n + 2k' + \Delta \text{ (for new DMRS type 1)}$$

$$k' = 0, 1$$

$$l = \bar{l} + l'$$

$$n = 0, 1, \dots$$

TABLE 54

Parameters for [Enhanced DMRS type 1 support method 2]

| p | CDM group λ | Δ | w_f(k') k' = 0 | w_f(k') k' = 1 | w_t(l') l' = 0 | w_t(l') l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 2 | 4 | +1 | +1 | +1 | +1 |

TABLE 54-continued

| | Parameters for [Enhanced DMRS type 1 support method 2] | | | | | |
|---|---|---|---|---|---|---|
| | CDM | | $w_f(k')$ | | $w_t(l')$ | |
| p | group λ | Δ | k' = 0 | k' = 1 | l' = 0 | l' = 1 |
| 1005 | 2 | 4 | +1 | −1 | +1 | +1 |
| 1006 | 3 | 5 | +1 | +1 | +1 | +1 |
| 1007 | 3 | 5 | +1 | −1 | +1 | +1 |
| 1008 | 0 | 0 | +1 | +1 | +1 | −1 |
| 1009 | 0 | 0 | +1 | −1 | +1 | −1 |
| 1010 | 1 | 1 | +1 | +1 | +1 | −1 |
| 1011 | 1 | 1 | +1 | −1 | +1 | −1 |
| 1012 | 2 | 4 | +1 | +1 | +1 | −1 |
| 1013 | 2 | 4 | +1 | −1 | +1 | −1 |
| 1014 | 3 | 5 | +1 | +1 | +1 | −1 |
| 1015 | 3 | 5 | +1 | −1 | +1 | −1 |

In [Enhanced DMRS type 1 support method 2] based on [Equation 5] and [Table 54] above, a total of four CDM groups are used. In a case of one front-loaded DMRS symbol, two DMRS ports may be included in each CDM group and thus enhanced DMRS type 1 may support a total of eight orthogonal DMRS ports, and in a case of two front-loaded DMRS symbols, four DMRS ports may be included in each CDM group and thus enhanced DMRS type 1 may support a total of 16 orthogonal DMRS ports. The number of CDM groups is increased while the number of DMRS ports in each CDM group is maintained, and thus scheduling of a PDSCH to be transmitted together with a DMRS may be limited to the unit of two RBs.

According to method 2, as in conventional DMRS type 1, the interval between REs allocated to a particular DMRS port in the same CDM group is maintained to be two REs, but there may be a situation where for each DMRS port, the DMRS density of a particular RB among two RBs is high and the DMRS density of the other RB is low. For example, in a case of DMRS ports 1000 to 1003 (or in a case of CDM groups 0 and 1), the DMRS density of the even-numbered RBs among allocated RBs is twice the DMRS density of the odd-numbered RBs, but in a case of DMRS ports 1004 to 1008 (or in a case of CDM groups 2 and 3), the opposite situation may occur. In Equation 5, $$\beta_{PDSCH}^{DMRS}$$

is a scaling factor indicating the ratio between the EPRE of a PDSCH and the EPRE of a DMRS, and may be calculated by $$\beta_{PDSCH}^{DMRS} = 10^{-\frac{\beta_{DMRS}}{20}},$$

and the value of $\beta_{DMRS}$ may be 0 dB, −3 dB, −4.77 dB, and −6 dB according to the number of CDM groups of 1, 2, 3, and 4.

[Enhanced DMRS Type 1 Support Method 3]

As another embodiment of a method of supporting enhanced DMRS type 1 described above, time and frequency resource mapping of a DMRS RE and a FD-OCC and TD-OCC coefficient therefor may be determined in case that enhanced DMRS type 1 is used based on [Equation 2] above and [Table 55] below.

Differences between conventional DMRS type 1 and method 3 are as follows. According to method 3, if the number of front-loaded symbols is 1, indication of DMRS ports 1000 to 1003 (or allocation of DMRS ports 1000 to 1003) for an even-numbered RBs in which a PDSCH is scheduled may be possible, and indication of DMRS ports 1004 to 1007 (or allocation of DMRS ports 1004 to 1007) for an odd-numbered RBs may be possible. If the number of front-loaded symbols is 2, indication of DMRS ports 1000 to 1007 for an even-numbered RBs in which a PDSCH is scheduled is possible, and indication of DMRS ports 1008 to 1015 for an odd-numbered RBs is possible. Therefore, as shown in [Table 55] below, when the indexes of DMRS ports are different from each other by eight indexes, the FD-OCC coefficients and the TD-OCC coefficients may be the same. Alternatively, while supporting only indication for DMRS ports 1000 to 1007 by using [Table 30] described above, the base station may use a method by which, even for the same DMRS port 1000, DMRS ports are distinguished according to an RB in which a DMRS RE is disposed by additionally indicating of whether the DMRS RE is disposed in either the even-numbered or odd-numbered RBs in the frequency resource where the PDSCH is scheduled. A detailed DMRS port indication and RB position indication method will be described later.

TABLE 55

| | Parameters for [Enhanced DMRS type 1 support method 3] | | | | | |
|---|---|---|---|---|---|---|
| | CDM | | $w_f(k')$ | | $w_t(l')$ | |
| p | group λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |
| 1008 | 0 | 0 | +1 | +1 | +1 | +1 |
| 1009 | 0 | 0 | +1 | −1 | +1 | +1 |
| 1010 | 1 | 1 | +1 | +1 | +1 | +1 |
| 1011 | 1 | 1 | +1 | −1 | +1 | +1 |
| 1012 | 0 | 0 | +1 | +1 | +1 | −1 |
| 1013 | 0 | 0 | +1 | −1 | +1 | −1 |
| 1014 | 1 | 1 | +1 | +1 | +1 | −1 |
| 1015 | 1 | 1 | +1 | −1 | +1 | −1 |

In [Enhanced DMRS type 1 support method 3] based on [Equation 2] and [Table 55] above, a total of two CDM groups are used. In a case of one front-loaded DMRS symbol, two DMRS ports may be included in each CDM group and DMRS ports are divided to be allocated to even-numbered RBs and odd-numbered RBs, and thus enhanced DMRS type 1 may support a total of eight orthogonal DMRS ports, and in a case of two front-loaded DMRS symbols, four DMRS ports may be included in each CDM group and thus DMRS type 1 may support a total of 16 orthogonal DMRS ports. According to method 3, DMRSs are divided to be allocated to even-numbered RBs and odd-numbered RBs while the number of DMRS ports in each CDM group and the number of CDM groups are maintained, and thus scheduling of a PDSCH to be transmitted together with the DMRSs may be limited to the unit of three or more RBs.

[Enhanced DMRS Type 2 Support Method 1]

As an embodiment of a method of supporting enhanced DMRS type 2 described above, time and frequency resource mapping of a DMRS RE and a FD-OCC and TD-OCC coefficient therefor may be determined in case that enhanced DMRS type 2 is used based on [Equation 6] and [Table 56] below.

$$a_{k,l}^{(p,\mu)} = \beta_{PDSCH}^{DMRS} w_f(k') w_t(l') r(4n + k') \qquad \text{[Equation 6]}$$

$$k = 12n + k' + \Delta \quad \text{(for new DMRS type 2)}$$

$$k' = 0, 1, 2, 3$$

$$l = \bar{l} + l'$$

$$n = 0, 1, \ldots$$

TABLE 56

Parameters for [Enhanced DMRS type 2 support method 1]

| p | CDM group λ | Δ | w_f(k') k' = 0 | k' = 1 | k' = 2 | k' = 3 | w_t(l') l' = 0 | l' = 1 |
|---|---|---|---|---|---|---|---|---|
| 1000 | 0 | 0 | +1 | +1 | +1 | +1 | +1 | +1 |
| 1001 | 0 | 0 | −1 | −1 | +1 | +1 | +1 | +1 |
| 1002 | 0 | 0 | −1 | +1 | −1 | +1 | +1 | +1 |
| 1003 | 0 | 0 | +1 | −1 | −1 | +1 | +1 | +1 |
| 1004 | 1 | 4 | +1 | +1 | +1 | +1 | +1 | +1 |
| 1005 | 1 | 4 | −1 | −1 | +1 | +1 | +1 | +1 |
| 1006 | 1 | 4 | −1 | +1 | −1 | +1 | +1 | +1 |
| 1007 | 1 | 4 | +1 | −1 | −1 | +1 | +1 | +1 |
| 1008 | 2 | 8 | +1 | +1 | +1 | +1 | +1 | +1 |
| 1009 | 2 | 8 | −1 | −1 | +1 | +1 | +1 | +1 |
| 1010 | 2 | 8 | −1 | +1 | −1 | +1 | +1 | +1 |
| 1011 | 2 | 8 | +1 | −1 | −1 | +1 | +1 | +1 |
| 1012 | 0 | 0 | +1 | +1 | +1 | +1 | +1 | +1 |
| 1013 | 0 | 0 | −1 | −1 | +1 | +1 | +1 | −1 |
| 1014 | 0 | 0 | −1 | +1 | −1 | +1 | +1 | −1 |
| 1015 | 0 | 0 | +1 | −1 | −1 | +1 | +1 | −1 |
| 1016 | 1 | 4 | +1 | +1 | +1 | +1 | +1 | −1 |
| 1017 | 1 | 4 | −1 | −1 | +1 | +1 | +1 | −1 |
| 1018 | 1 | 4 | −1 | +1 | −1 | +1 | +1 | −1 |
| 1019 | 1 | 4 | +1 | −1 | −1 | +1 | +1 | −1 |
| 1020 | 2 | 8 | +1 | +1 | +1 | +1 | +1 | −1 |
| 1021 | 2 | 8 | −1 | −1 | +1 | +1 | +1 | −1 |
| 1022 | 2 | 8 | −1 | +1 | −1 | +1 | +1 | −1 |
| 1023 | 2 | 8 | +1 | −1 | −1 | +1 | +1 | −1 |

In [Enhanced DMRS type 2 support method 1] based on [Equation 6] and [Table 56] above, a total of three CDM groups are used. In a case of one front-loaded DMRS symbol, four DMRS ports may be included in each CDM group and thus enhanced DMRS type 2 may support a total of 12 orthogonal DMRS ports, and in a case of two front-loaded DMRS symbols, eight DMRS ports may be included in each CDM group and thus enhanced DMRS type 2 may support a total of 24 orthogonal DMRS ports.

According to method 1, the number of DMRS ports in each CDM group is increased while the number of CDM groups is maintained, and thus scheduling of a PDSCH to be transmitted together with a DMRS may be maintained to the unit of one RB identically to the conventional unit. However, a position of the DMRS RE is concentrated in a specific position in the RB and thus when scheduling a PDSCH for two or more RBs, DMRS channel estimation performance may be secured. For example, the RE positions in a RB for DMRS ports 1000 to 1003 in CDM group #0 are arranged the 0-th to 4-th subcarriers, and thus a DMRS is concentrated on only subcarriers having low indexes in an RB and in this case, DMRS channel estimation performance for a subcarrier with a high index may be degraded. In Equation 6, $$\beta_{PDSCH}^{DMRS}$$

is a scaling factor indicating the ratio between the EPRE of a PDSCH and the EPRE of a DMRS, and may be calculated by $$\beta_{PDSCH}^{DMRS} = 10^{-\frac{\beta_{DMRS}}{20}},$$

and the value of $\beta_{DMRS}$ may be 0 dB, −3 dB, and −4.77 dB according to the number of CDM groups of 1, 2, and 3.

[Enhanced DMRS Type 2 Support Method 2]

As another embodiment of a method of supporting enhanced DMRS type 2 described above, time and frequency resource mapping of a DMRS RE and a FD-OCC and TD-OCC coefficient therefor may be determined in case that enhanced DMRS type 2 is used based on [Equation 2] above and [Table 57] below. Here, a difference between conventional DMRS type 2 and enhanced DMRS type 2 is that indication of DMRS ports 1000 to 1011 (or allocation of DMRS ports 1000 to 1011) for an even-numbered RBs in which a PDSCH is scheduled is possible, and indication of DMRS ports 1012 to 1023 (or allocation of DMRS ports 1012 to 1023) for an odd-numbered RBs is possible. This is similar to [Enhanced DMRS type 1 support method 3]. Therefore, as shown in [Table 57] below, when the indexes of DMRS ports are different from each other by 12 indexes, the FD-OCC coefficients and the TD-OCC coefficients may be the same. Alternatively, while supporting only indication for DMRS ports 1000 to 1011 by using [Table 31] described above, the base station may use a method by which, even for the same DMRS port 1000, DMRS ports are distinguished according to an RB in which a DMRS RE is disposed by additionally indicating of whether the DMRS RE is disposed in either the even-numbered or odd-numbered RBs in the frequency resource where the PDSCH is scheduled. A detailed DMRS port indication and RB position indication method will be described later.

TABLE 57

Parameters for [Enhanced DMRS type 2 support method 2]

| p | CDM group λ | Δ | w_f(k') k' = 0 | k' = 1 | w_t(l') l' = 0 | l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |
| 1012 | 0 | 0 | +1 | +1 | +1 | +1 |
| 1013 | 0 | 0 | +1 | −1 | +1 | +1 |
| 1014 | 1 | 2 | +1 | +1 | +1 | +1 |
| 1015 | 1 | 2 | +1 | −1 | +1 | +1 |
| 1016 | 2 | 4 | +1 | +1 | +1 | +1 |
| 1017 | 2 | 4 | +1 | −1 | +1 | +1 |
| 1018 | 0 | 0 | +1 | +1 | +1 | −1 |
| 1019 | 0 | 0 | +1 | −1 | +1 | −1 |
| 1020 | 1 | 2 | +1 | +1 | +1 | −1 |

TABLE 57-continued

Parameters for [Enhanced DMRS type 2 support method 2]

| p | CDM group λ | Δ | $w_f(k')$ k' = 0 | $w_f(k')$ k' = 1 | $w_t(l')$ l' = 0 | $w_t(l')$ l' = 1 |
|---|---|---|---|---|---|---|
| 1021 | 1 | 2 | +1 | −1 | +1 | −1 |
| 1022 | 2 | 4 | +1 | +1 | +1 | −1 |
| 1023 | 2 | 4 | +1 | −1 | +1 | −1 |

In [Enhanced DMRS type 2 support method 2] based on [Equation 2] and [Table 57] above, a total of three CDM groups are used. In a case of one front-loaded DMRS symbol, two DMRS ports may be included in each CDM group and DMRS ports are divided to be allocated to even-numbered RBs and odd-numbered RBs, and thus enhanced DMRS type 2 may support a total of 12 orthogonal DMRS ports, and in a case of two front-loaded DMRS symbols, four DMRS ports may be included in each CDM group and thus DMRS type 2 may support a total of 24 orthogonal DMRS ports. DMRSs are divided to be allocated to even-numbered RBs and odd-numbered RBs while the number of DMRS ports in each CDM group and the number of CDM groups are maintained, and thus scheduling of a PDSCH to be transmitted together with the DMRSs may be limited to the unit of three or more RBs.

Embodiment 1-1: Method of Additionally Supporting Enhanced DMRS Types 1 and 2 Supporting Increased Number of Orthogonal Ports As an embodiment of the disclosure, there will be described a method of additionally supporting enhanced DMRS types 1 and 2 supporting the additionally increased number of orthogonal ports in addition to [Enhanced DMRS type 1 support method 1], [Enhanced DMRS type 1 support method 2], [Enhanced DMRS type 1 support method 3], [Enhanced DMRS type 2 support method 1], and [Enhanced DMRS type 2 support method 2] within Embodiment 1 described above.

[Enhanced DMRS Type 1 Support Method 4]

As another embodiment of a method of supporting enhanced DMRS type 1 described above, time and frequency resource mapping of a DMRS RE and a FD-OCC and TD-OCC coefficient therefor may be determined in case that enhanced DMRS type 1 is used based on [Equation 7] and [Table 58] below.

$$a_{k,l}^{(p,\mu)} = \beta_{PDSCH}^{DMRS} w_f(k') w_t(l') r(2n + k') \qquad \text{[Equation 7]}$$

$$k = 12n + 2k' + \Delta \text{ (for new DMRS type 1)}$$

$$k' = 0, 1, 2, 3, 4, 5$$

$$l = \bar{l} + l'$$

$$n = 0, 1, \dots$$

TABLE 58

Parameters for [Enhanced DMRS type 1 support method 4]

| p | CDM group λ | Δ | $w_f(k')$ k' = 0 | k' = 1 | k' = 2 | k' = 3 | k' = 4 | k' = 5 | $w_t(l')$ l' = 0 | l' = 1 |
|---|---|---|---|---|---|---|---|---|---|---|
| 1000 | 0 | 0 | +1 | +1 | +1 | +1 | +1 | +1 | +1 | +1 |
| 1001 | 0 | 0 | +1 | −1 | +1 | −1 | +1 | −1 | +1 | +1 |
| 1002 | 1 | 1 | +1 | +1 | +1 | +1 | +1 | +1 | +1 | +1 |
| 1003 | 1 | 1 | +1 | −1 | +1 | −1 | +1 | −1 | +1 | +1 |
| 1004 | 0 | 0 | +1 | +1 | +1 | +1 | +1 | +1 | +1 | −1 |
| 1005 | 0 | 0 | +1 | −1 | +1 | −1 | +1 | −1 | +1 | −1 |
| 1006 | 1 | 1 | +1 | +1 | +1 | +1 | +1 | +1 | +1 | −1 |
| 1007 | 1 | 1 | +1 | −1 | +1 | −1 | +1 | −1 | +1 | −1 |
| 1008 | 0 | 0 | +A | +A | +B | +B | +C | +C | +1 | +1 |
| 1009 | 0 | 0 | +A | −A | +B | −B | +C | −C | +1 | +1 |
| 1010 | 1 | 1 | +A | +A | +B | +B | +C | +C | +1 | +1 |
| 1011 | 1 | 1 | +A | −A | +B | −B | +C | −C | +1 | +1 |
| 1012 | 0 | 0 | +A | +A | +B | +B | +C | +C | +1 | −1 |
| 1013 | 0 | 0 | +A | −A | +B | −B | +C | −C | +1 | −1 |
| 1014 | 1 | 1 | +A | +A | +B | +B | +C | +C | +1 | −1 |
| 1015 | 1 | 1 | +A | −A | +B | −B | +C | −C | +1 | −1 |

In [Enhanced DMRS type 1 support method 4] based on [Equation 7] and [Table 58] above, a total of two CDM groups are used. In a case of one front-loaded DMRS symbol, four DMRS ports may be included in each CDM group, and in a case of two front-loaded DMRS symbols, eight DMRS ports may be included in each CDM group and thus enhanced DMRS type 1 may support a total of 16 orthogonal DMRS ports.

According to [Enhanced DMRS type 1 support method 4], since the number of DMRS ports in the CDM group is increased while maintaining two, the number of CDM groups of conventional DMRS type 1, scheduling of a PDSCH to be transmitted together with a DMRS may be maintained to the unit of one RB identically to the conventional unit and the DMRS may be mapped to the same RE position as that of conventional DMRS type 1. However, in case that conventional DMRS type 1 is used, under the assumption that channels of two REs (e.g., RE #0 and RE #2) at positions spaced 2 REs apart from each other are the same, a receiver has applied an OCC to the two REs to distinguish orthogonal ports, and in a case of one front-loaded DMRS symbol, a total of six REs in one RB are used per port, and three OCCs having a length of 2 have been used.

Based on [Enhanced DMRS type 1 support method 4], in a case of one front-loaded DMRS symbol, a total of six REs in one RB are used per port, and a receiver may distinguish a total of four orthogonal ports by using one OCC having a length of 6. Here, an OCC having a length of 6 is applied to six REs, and the REs may exist at positions spaced apart two REs from each other (i.e., a subcarrier index difference for each RE is 2). That is, the receiver may apply an OCC by assuming six REs having relative RE positions of 0, 2, 4, 6, 8, and 10 belong to the same channel, and thus channel estimation performance may be degraded compared to conventional DMRS type 1. Therefore, this enhanced DMRS type 1 may be used for multi-user MIMO in a channel with small frequency-selective characteristic.

In [Table 58] above, values of A, B, and C among OCCs having a length of 6 are determined to give orthogonality between all ports, and it is possible that A=1, B=$e^{j2\pi/3}$, and C=$e^{j4\pi/3}$, for example, but other values are not excluded. As such, The value of A, B, or C may be defined in a standard in advance to be appointed between the UE and the base station, may be configured for the UE through higher layer signaling, may be activated to the UE through a MAC-CE, may be dynamically indicated to the UE through DCI, or may be notified of to the UE through a combination of these signalings. In [Equation 7] above, $$\beta_{PDSCH}^{DMRS}$$

is a scaling factor indicating the ratio between the EPRE of a PDSCH and the EPRE of a DMRS, and may be calculated by $$\beta_{PDSCH}^{DMRS} = 10^{-\frac{\beta_{DMRS}}{20}},$$

and the value of $\beta_{DMRS}$ may be 0 dB, and −3 dB according to the number of CDM groups of 1 and 2.

[Enhanced DMRS Type 1 Support Method 5]

As another embodiment of a method of supporting enhanced DMRS type 1 described above, time and frequency resource mapping of a DMRS RE and a FD-OCC and TD-OCC coefficient therefor may be determined in case that enhanced DMRS type 1 is used based on [Equation 8] and [Table 59] below.

$$a_{k,l}^{(p,\mu)} = \beta_{PDSCH}^{DMRS} w_o(m) w_f(k') w_t(l') r(2n + k') \qquad \text{[Equation 8]}$$

$$k = 4n + 2k' + \Delta \quad \text{(for new DMRS type 1)}$$

$$k' = 0, 1$$

$$l = \bar{l} + l'$$

$$n = 0, 1, \ldots$$

$$m = \mod(n, 3)$$

TABLE 59

Parameters for [Enhanced DMRS type 1 support method 5]

| | CDM | | | $w_f(k')$ | | $w_t(l')$ | | $w_o(m)$ | | |
|---|---|---|---|---|---|---|---|---|---|---|
| p | group λ | Δ | k' = 0 | k' = 1 | l' = 0 | l' = 1 | m = 0 | m = 1 | m = 2 |
| 1000 | 0 | 0 | +1 | +1 | +1 | +1 | +1 | +1 | +1 |
| 1001 | 0 | 0 | +1 | −1 | +1 | +1 | +1 | +1 | +1 |
| 1002 | 1 | 1 | +1 | +1 | +1 | +1 | +1 | +1 | +1 |
| 1003 | 1 | 1 | +1 | −1 | +1 | +1 | +1 | +1 | +1 |
| 1004 | 0 | 0 | +1 | +1 | +1 | −1 | +1 | +1 | +1 |
| 1005 | 0 | 0 | +1 | −1 | +1 | −1 | +1 | +1 | +1 |
| 1006 | 1 | 1 | +1 | +1 | +1 | −1 | +1 | +1 | +1 |
| 1007 | 1 | 1 | +1 | −1 | +1 | −1 | +1 | +1 | +1 |
| 1008 | 0 | 0 | +1 | +1 | +1 | +1 | +A | +B | +C |
| 1009 | 0 | 0 | +1 | −1 | +1 | +1 | +A | +B | +C |
| 1010 | 1 | 1 | +1 | +1 | +1 | +1 | +A | +B | +C |
| 1011 | 1 | 1 | +1 | −1 | +1 | +1 | +A | +B | +C |
| 1012 | 0 | 0 | +1 | +1 | +1 | −1 | +A | +B | +C |
| 1013 | 0 | 0 | +1 | −1 | +1 | −1 | +A | +B | +C |
| 1014 | 1 | 1 | +1 | +1 | +1 | −1 | +A | +B | +C |
| 1015 | 1 | 1 | +1 | −1 | +1 | −1 | +A | +B | +C |

In [Enhanced DMRS type 1 support method 5] based on [Equation 8] and [Table 59] above, a total of two CDM groups are used. In a case of one front-loaded DMRS symbol, four DMRS ports may be included in each CDM group, and in a case of two front-loaded DMRS symbols, eight DMRS ports may be included in each CDM group and thus enhanced DMRS type 1 may support a total of 16 orthogonal DMRS ports. Since the number of DMRS ports in the CDM group is increased while maintaining two, the number of CDM groups of conventional DMRS type 1, scheduling of a PDSCH to be transmitted together with a DMRS may be maintained to the unit of one RB identically to the conventional unit and the DMRS may be mapped to the same RE position as that of conventional DMRS type 1. However, in case that conventional DMRS type 1 is used, under the assumption that channels of two REs (e.g., RE #0 and RE #2) at positions spaced 2 REs apart from each other are the same, a receiver has applied an OCC to the two REs to distinguish orthogonal ports, and in a case of one front-loaded DMRS symbol, a total of six REs in one RB are used per port, and three OCCs having a length of 2 have been used.

Based on [Enhanced DMRS type 1 support method 5], in a case of one front-loaded DMRS symbol, a total of six REs in one RB are used per port, and a receiver may distinguish a total of four orthogonal ports by using one OCC having a length of 6. Here, an OCC having a length of 6 is applied to six REs, and the REs may exist at positions spaced apart two REs from each other (i.e., a subcarrier index difference for each RE is 2). That is, the receiver may apply an OCC by assuming six REs having relative RE positions of 0, 2, 4, 6, 8, and 10 belong to the same channel, and thus channel estimation performance may be degraded compared to conventional DMRS type 1. Therefore, this enhanced DMRS type 1 may be used for multi-user MIMO in a channel with small frequency-selective characteristic.

In [Table 59] above, values of A, B, and C are determined to give orthogonality between all ports among OCCS having a length of 6 and it is possible that A=1, B=$e^{j2\pi/3}$, and C=$e^{j4\pi/3}$, for example, but other values are not excluded. As such, The value of A, B, or C may be defined in a standard in advance to be appointed between the UE and the base station, may be configured for the UE through higher layer signaling, may be activated to the UE through a MAC-CE, may be dynamically indicated to the UE through DCI, or may be notified of to the UE through a combination of these signalings. In [Equation 5-2] above, $$\beta_{PDSCH}^{DMRS}$$

is a scaling factor indicating the ratio between the energy per RE (EPRE) of a PDSCH and the EPRE of a DMRS, and may be calculated by $$\beta_{PDSCH}^{DMRS} = 10^{-\frac{\beta_{DMRS}}{20}},$$

and the value of $\beta_{DMRS}$ may be 0 dB, and −3 dB according to the number of CDM groups of 1 and 2.

[Enhanced DMRS Type 1 Support Method 6]

As another embodiment of a method of supporting enhanced DMRS type 1 described above, time and frequency resource mapping of a DMRS RE and a FD-OCC and TD-OCC coefficient therefor may be determined in case that enhanced DMRS type 1 is used based on [Equation 9] and [Table 60] below.

$$a_{k,l}^{(p,\mu)} = \beta_{PDSCH}^{DMRS} w_f(k') w_t(l') r(2n + k') \qquad \text{[Equation 9]}$$

-continued $$k = 8n + 2k' + \Delta \text{ (for new DMRS type 1)}$$

$$k' = 0, 1, 2, 3$$

$$l = \bar{l} + l'$$

$$n = 0, 1, \ldots$$

TABLE 60

| | | | w_f(k') | | | | w_t(l') | |
|---|---|---|---|---|---|---|---|---|
| p | CDM group λ | Δ | k' = 0 | k' = 1 | k' = 2 | k' = 3 | l' = 0 | l' = 1 |
| 1000 | 0 | 0 | +1 | +1 | +1 | +1 | +1 | +1 |
| 1001 | 0 | 0 | +1 | -1 | +1 | -1 | +1 | +1 |
| 1002 | 1 | 1 | +1 | +1 | +1 | +1 | +1 | +1 |
| 1003 | 1 | 1 | +1 | -1 | +1 | -1 | +1 | +1 |
| 1004 | 0 | 0 | +1 | +1 | +1 | +1 | +1 | -1 |
| 1005 | 0 | 0 | +1 | -1 | +1 | -1 | +1 | -1 |
| 1006 | 1 | 1 | +1 | +1 | +1 | +1 | +1 | -1 |
| 1007 | 1 | 1 | +1 | -1 | +1 | -1 | +1 | -1 |
| 1008 | 0 | 0 | +1 | +1 | -1 | -1 | +1 | +1 |
| 1009 | 0 | 0 | +1 | +1 | -1 | -1 | +1 | +1 |
| 1010 | 1 | 1 | +1 | -1 | -1 | +1 | +1 | +1 |
| 1011 | 1 | 1 | +1 | -1 | -1 | +1 | +1 | +1 |
| 1012 | 0 | 0 | +1 | +1 | -1 | -1 | +1 | -1 |
| 1013 | 0 | 0 | +1 | +1 | -1 | -1 | +1 | -1 |
| 1014 | 1 | 1 | +1 | -1 | -1 | +1 | +1 | -1 |
| 1015 | 1 | 1 | +1 | -1 | -1 | +1 | +1 | -1 |

In [Enhanced DMRS type 1 support method 6] based on [Equation 9] and [Table 60] above, a total of two CDM groups are used. In a case of one front-loaded DMRS symbol, four DMRS ports may be included in each CDM group and thus enhanced DMRS type 1 may support up to eight orthogonal DMRS ports, and in a case of two front-loaded DMRS symbols, eight DMRS ports may be included in each CDM group and thus enhanced DMRS type 1 may support a total of 16 orthogonal DMRS ports. Since the number of DMRS ports in the CDM group is increased while maintaining two, the number of CDM groups of conventional DMRS type 1, and an OCC length is increased to be 4 therefor, scheduling of a PDSCH to be transmitted together with a DMRS may be possible in the unit of two RBs and the DMRS may be mapped to the same RE position as that of conventional DMRS type 1. However, in case that conventional DMRS type 1 is used, under the assumption that channels of two REs (e.g., RE #0 and RE #2) at positions spaced 2 REs apart from each other are the same, a receiver has applied an OCC to the two REs to distinguish orthogonal ports, and in a case of one front-loaded DMRS symbol, a total of six REs in one RB are used per port, and three OCCs having a length of 2 have been used.

Based on [Enhanced DMRS type 1 support method 6], in a case of one front-loaded DMRS symbol, a total of 12 REs in two RBs are used per port, and a receiver may distinguish a total of four orthogonal antenna ports by using an OCC having a length of 4 applied to four adjacent REs. Here, an OCC having a length of 4 is applied to four REs, and the four REs may exist at positions spaced apart two REs from each other (i.e., a subcarrier index difference between REs is 2). That is, the receiver may apply an OCC by assuming four REs having relative RE positions of 0, 2, 4, and 6 belong to the same channel, and thus channel estimation performance may be degraded compared to conventional DMRS type 1.

Therefore, this enhanced DMRS type 1 may be used for multi-user MIMO in a channel with small frequency-selective characteristic.

In [Table 60] above, $w_f(k')$ values of ports 1000 to 1015 among OCCs having a length of 4 are determined to give orthogonality between all ports, and the values in the table above do not exclude other values by way of example. In [Equation 9] above, $$\beta_{PDSCH}^{DMRS}$$

is a scaling factor indicating the ratio between the EPRE of a PDSCH and the EPRE of a DMRS, and may be calculated by $$\beta_{PDSCH}^{DMRS} = 10^{-\frac{\beta_{DMRS}}{20}},$$

and the value of $\beta_{DMRS}$ may be 0 dB, and -3 dB according to the number of CDM groups of 1 and 2.

[Enhanced DMRS Type 2 Support Method 3]

Time and frequency resource mapping of a DMRS RE and a FD-OCC and TD-OCC coefficient therefor may be determined in case that enhanced DMRS type 2 is used based on [Equation 10] and [Table 61] below.

$$a_{k,l}^{(p,\mu)} = \beta_{PDSCH}^{DMRS} w_f(k') w_t(l') r(2n + k') \qquad \text{[Equation 10]}$$

$$k = 12n + 6\left\lfloor \frac{k'}{2} \right\rfloor + \mathrm{mod}(k', 2) + \Delta \text{ (for new DMRS type 2)}$$

$$k' = 0, 1, 2, 3$$

$$l = \bar{l} + l'$$

$$n = 0, 1, \ldots$$

TABLE 61

| | | | w_f(k') | | | | w_t(l') | |
|---|---|---|---|---|---|---|---|---|
| p | CDM group λ | Δ | k' = 0 | k' = 1 | k' = 2 | k' = 3 | l' = 0 | l' = 1 |
| 1000 | 0 | 0 | +1 | +1 | +1 | +1 | +1 | +1 |
| 1001 | 0 | 0 | +1 | -1 | +1 | -1 | +1 | +1 |
| 1002 | 1 | 2 | +1 | +1 | +1 | +1 | +1 | +1 |
| 1003 | 1 | 2 | +1 | -1 | +1 | -1 | +1 | +1 |
| 1004 | 2 | 4 | +1 | +1 | +1 | +1 | +1 | +1 |
| 1005 | 2 | 4 | +1 | -1 | +1 | -1 | +1 | +1 |
| 1006 | 0 | 0 | +1 | +1 | +1 | +1 | +1 | -1 |
| 1007 | 0 | 0 | +1 | -1 | +1 | -1 | +1 | -1 |
| 1008 | 1 | 2 | +1 | +1 | +1 | +1 | +1 | -1 |
| 1009 | 1 | 2 | +1 | -1 | +1 | -1 | +1 | -1 |
| 1010 | 2 | 4 | +1 | +1 | +1 | +1 | +1 | -1 |
| 1011 | 2 | 4 | +1 | -1 | +1 | -1 | +1 | -1 |
| 1012 | 0 | 0 | +1 | +1 | -1 | +1 | +1 | +1 |
| 1013 | 0 | 0 | +1 | -1 | -1 | -1 | +1 | +1 |
| 1014 | 1 | 2 | +1 | +1 | -1 | +1 | +1 | +1 |
| 1015 | 1 | 2 | +1 | -1 | -1 | -1 | +1 | +1 |
| 1016 | 2 | 4 | +1 | +1 | -1 | +1 | +1 | +1 |
| 1017 | 2 | 4 | +1 | -1 | -1 | -1 | +1 | +1 |
| 1018 | 0 | 0 | +1 | +1 | -1 | +1 | +1 | -1 |

TABLE 61-continued

Parameters for [Enhanced DMRS type 2 support method 3]

| p | CDM group λ | Δ | w_f(k') k' = 0 | k' = 1 | k' = 2 | k' = 3 | w_t(l') l' = 0 | l' = 1 |
|---|---|---|---|---|---|---|---|---|
| 1019 | 0 | 0 | +1 | −1 | −1 | −1 | +1 | −1 |
| 1020 | 1 | 2 | +1 | +1 | −1 | +1 | +1 | −1 |
| 1021 | 1 | 2 | +1 | −1 | −1 | −1 | +1 | −1 |
| 1022 | 2 | 4 | +1 | +1 | −1 | +1 | +1 | −1 |
| 1023 | 2 | 4 | +1 | −1 | −1 | −1 | +1 | −1 |

In [Enhanced DMRS type 10 support method 2] based on [Equation 3] and [Table 61] above, a total of three CDM groups are used. In a case of one front-loaded DMRS symbol, four DMRS ports may be included in each CDM group and thus enhanced DMRS type 2 may support a total of 12 orthogonal DMRS ports, and in a case of two front-loaded DMRS symbols, eight DMRS ports may be included in each CDM group and thus enhanced DMRS type 2 may support a total of 24 orthogonal DMRS ports. Since the number of DMRS ports in the CDM group is increased while maintaining the number of CDM groups, scheduling of a PDSCH to be transmitted together with a DMRS may be maintained to the unit of one RB identically to the conventional unit and the DMRS may be mapped to the same RE position as that of conventional DMRS type 2. However, in conventional DMRS type 2, under the assumption that channels of two consecutive REs are the same, an OCC is applied to the two REs to distinguish orthogonal ports, and in a case of one front-loaded DMRS symbol, a total of four REs in one RB are used per port, and two OCCs having a length of 2 are used.

Based on [Enhanced DMRS type 2 support method 3], in a case of one front-loaded DMRS symbol, a total of six REs in one RB are used per port, and a receiver may distinguish a total of four orthogonal ports by using one OCC having a length of 4. Here, an OCC having a length of 4 is applied to two consecutive RE sets spaced 6 REs apart from each other (i.e., a subcarrier index difference between REs is 6), that is, the receiver may apply an OCC by assuming four REs having relative RE positions of 0, 1, 6, and 7 belong to the same channel, and thus channel estimation performance may be degraded compared to conventional DMRS type 2. Therefore, this enhanced DMRS type 2 may be used for multi-user MIMO in a channel with small frequency-selective characteristic.

In Equation 10, $$\beta_{PDSCH}^{DMRS}$$

is a scaling factor indicating the ratio between the EPRE of a PDSCH and the EPRE of a DMRS, and may be calculated by $$\beta_{PDSCH}^{DMRS} = 10^{-\frac{\beta_{DMRS}}{20}},$$

and the value of $\beta_{DMRS}$ may be 0 dB, −3 dB, and −4.77 dB according to the number of CDM groups of 1, 2, and 3.

[Enhanced DMRS Type 2 Support Method 4]

Time and frequency resource mapping of a DMRS RE and a FD-OCC and TD-OCC coefficient therefor may be determined in case that enhanced DMRS type 2 is used based on [Equation 11] and [Table 62] or [Table 63] below.

$$a_{k,l}^{(p,\mu)} = \beta_{PDSCH}^{DMRS} w_f(k') w_t(l') r(2n + k') \qquad \text{[Equation 11]}$$

$$k = 12n + k' + \Delta \text{ (for new DMRS type 2)}$$

$$k' = 0, 1$$

$$l = \bar{l} + l'$$

$$n = 0, 1, \ldots$$

TABLE 62

Parameters for [Enhanced DMRS type 2 support method 4]

| p | CDM group λ | Δ | w_f(k') k' = 0 | k' = 1 | w_t(l') l' = 0 | l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |
| 1012 | 3 | 6 | +1 | +1 | +1 | +1 |
| 1013 | 3 | 6 | +1 | −1 | +1 | +1 |
| 1014 | 4 | 8 | +1 | +1 | +1 | +1 |
| 1015 | 4 | 8 | +1 | −1 | +1 | +1 |
| 1016 | 5 | 10 | +1 | +1 | +1 | +1 |
| 1017 | 5 | 10 | +1 | −1 | +1 | +1 |
| 1018 | 3 | 6 | +1 | +1 | +1 | −1 |
| 1019 | 3 | 6 | +1 | −1 | +1 | −1 |
| 1020 | 4 | 8 | +1 | +1 | +1 | −1 |
| 1021 | 4 | 8 | +1 | −1 | +1 | −1 |
| 1022 | 5 | 10 | +1 | +1 | +1 | −1 |
| 1023 | 5 | 10 | +1 | −1 | +1 | −1 |

TABLE 63

Parameters for [Enhanced DMRS type 2 support method 4]

| p | CDM group λ | Δ | w_f(k') k' = 0 | k' = 1 | w_t(l') l' = 0 | l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 3 | 6 | +1 | +1 | +1 | +1 |
| 1007 | 3 | 6 | +1 | −1 | +1 | +1 |
| 1008 | 4 | 8 | +1 | +1 | +1 | +1 |
| 1009 | 4 | 8 | +1 | −1 | +1 | +1 |
| 1010 | 5 | 10 | +1 | +1 | +1 | +1 |
| 1011 | 5 | 10 | +1 | −1 | +1 | +1 |
| 1012 | 0 | 0 | +1 | +1 | +1 | −1 |
| 1013 | 0 | 0 | +1 | −1 | +1 | −1 |
| 1014 | 1 | 2 | +1 | +1 | +1 | −1 |
| 1015 | 1 | 2 | +1 | −1 | +1 | −1 |
| 1016 | 2 | 4 | +1 | +1 | +1 | −1 |
| 1017 | 2 | 4 | +1 | −1 | +1 | −1 |
| 1018 | 3 | 6 | +1 | +1 | +1 | −1 |
| 1019 | 3 | 6 | +1 | −1 | +1 | −1 |
| 1020 | 4 | 8 | +1 | +1 | +1 | −1 |

TABLE 63-continued

| Parameters for [Enhanced DMRS type 2 support method 4] | | | | | | |
|---|---|---|---|---|---|---|
| | CDM group | | $w_f(k')$ | | $w_t(l')$ | |
| p | λ | Δ | k' = 0 | k' = 1 | l' = 0 | l' = 1 |
| 1021 | 4 | 8 | +1 | −1 | +1 | −1 |
| 1022 | 5 | 10 | +1 | +1 | +1 | −1 |
| 1023 | 5 | 10 | +1 | −1 | +1 | −1 |

In [Enhanced DMRS type 2 support method 4] based on [Equation 11] and [Table 62] or [Table 63], a total of six CDM groups are used, in a case of one front-loaded DMRS symbol, two DMRS ports may be included in each CDM group and thus enhanced DMRS type 2 may support a total of 12 orthogonal DMRS ports, and in a case of two front-loaded DMRS symbols, four DMRS ports may be included in each CDM group and thus enhanced DMRS type 2 may support a total of 24 orthogonal DMRS ports. Since the number CDM groups is increased while maintaining the number of DMRS ports in the CDM group, scheduling of a PDSCH to be transmitted together with a DMRS may be maintained to the unit of one RB identically to the conventional unit and the DMRS may be mapped to some RE positions of the RE positions of conventional DMRS type 2.

However, while a receiver estimates a channel by using a total of four REs in one RB in case that conventional DMRS type 2 is used, when based on [Enhanced DMRS type 2 support method 4], a receiver may us a total of two REs, which are half of conventional DMRS type 2, in one RB per port and distinguish a total of two orthogonal ports by using one OCC having a length of 2. Here, only two DMRS REs are used in one RB and thus channel estimation performance may be degraded compared to conventional DMRS type 2. Therefore, this enhanced DMRS type 2 may be used for multi-user MIMO in a channel with small frequency-selective characteristic.

In Equation 11, $$\beta_{PDSCH}^{DMRS}$$

is a scaling factor indicating the ratio between the EPRE of a PDSCH and the EPRE of a DMRS, and may be calculated by $$\beta_{PDSCH}^{DMRS} = 10^{-\frac{\beta_{DMRS}}{20}},$$

and the value of $\beta_{DMRS}$ may be 0 dB, −3 dB, −4.77 dB, −6 dB, −6.99 dB, and −7.7 dB according to the number of CDM groups of 1, 2, 3, 4, 5, and 6. Here, in case that the number of CDM groups exceeds a predetermined number (e.g., four or more), a value of $\beta_{DMRS}$ may be limited to a predetermined upper limit value. Here, the predetermined number of CDM groups and the predetermined upper limit value of $\beta_{DMRS}$ corresponding thereto may be configured to the UE from the base station through higher layer signaling, activated through MAC-CE signaling, indicated through L1 signaling, notified through a combination of higher layer signaling and L1 signaling, or fixedly defined in a standard.

With respect to [Enhanced DMRS type 1 support method 1] to [Enhanced DMRS type 1 support method 6] and

[Enhanced DMRS type 2 support method 1] to [Enhanced DMRS type 2 support method 4], the UE may report a UE capability indicating that each support method is possible to the base station. The corresponding UE capability may be valid for FR1 or valid for both FR1 and FR2. The corresponding UE capability may include an indication of the maximum number of DMRS antenna ports supported as 8 when one front-loaded DMRS symbol is used and 16 when two front-loaded DMRS symbols are used with respect to enhanced DMRS type 1, and 12 when one front-loaded DMRS symbol is used and 24 when two front-loaded DMRS symbols are used with respect to enhanced DMRS type 2. After receiving the UE capability, the base station may configure higher layer signaling corresponding thereto and the higher layer signaling may correspond to one of the methods described above or independent higher layer signaling.

The base station and the UE may support at least one of the support methods ([Enhanced DMRS type 1 support method 1], [Enhanced DMRS type 1 support method 2], [Enhanced DMRS type 1 support method 3], [Enhanced DMRS type 2 support method 1], or [Enhanced DMRS type 2 support method 2]) mentioned in Embodiment 1 described above and the additional support methods ([Enhanced DMRS type 1 support method 4], [Enhanced DMRS type 1 support method 5], [Enhanced DMRS type 1 support method 6], [Enhanced DMRS type 2 support method 3], or [Enhanced DMRS type 2 support method 4]) for enhanced DMRS types 1 and 2 described in the embodiment through a configuration using higher layer signaling, an indication based on L1 signaling, a combination of higher layer signaling and L1 signaling, or a method fixedly specified in a standard.

[Equations 4] to [Equation 11] and [Table 53] to [Table 63] described above may also be modified and applied in an obvious manner without impairing the spirit of the disclosure.

Embodiment 2: Orthogonal Cover Code Deactivation Method when Supporting Enhanced DMRS Types 1 and 2

As an embodiment of the disclosure, a method of deactivating an orthogonal cover code during supporting enhanced DMRS types 1 and 2, which may be notified from a base station to a UE through the embodiments described above. The UE may receive signaling for deactivating an orthogonal cover code applied to a DMRS RE from the base station in a predetermined situation. In this case, the base station may support orthogonal cover code deactivation by using a configuration method through higher layer signaling, using an indication method based on L1 signaling, using a combination method of higher layer and L1 signaling, or using a method fixedly specified in the standard. The aforementioned signaling from the base station may be notified to the UE through a combination of at least one of [Method 2-1] to [Method 2-3] below.

[Method 2-1]

In case that the UE receives a configuration of higher layer signaling from the base station and is scheduled for rank 1 PDSCH, an orthogonal cover code used when receiving the PDSCH may be deactivated. In case that the UE receives a configuration of higher layer signaling from the base station and is scheduled for a PDSCH through DCI format 1_1 or 1_2, and in case that the number of DMRS ports of an antenna port field indicated through the corresponding DCI format is 1, that is, a PDSCH including a single layer is scheduled, the UE may assume that another DMRS port orthogonal to the corresponding DMRS port within the CDM group including the corresponding DMRS port are not scheduled for another UE. That is, the UE may assume that only the corresponding DMRS port is scheduled across all UEs in the CDM group including the corresponding DMRS port and other DMRS ports orthogonal to the corresponding DMRS port is not used. Therefore, when receiving the corresponding DMRS port, the UE may use each RE for channel estimation without applying an orthogonal cover code with respect to multiple REs. Accordingly, the UE may expect improved channel estimation performance using each DMRS RE without separating different DMRS ports spatially multiplexed using a plurality of REs.

[Method 2-2]

In case that the UE receives a configuration of higher layer signaling from the base station and is scheduled for rank 1 PDSCH by using a DMRS port within a specific CDM group for the UE from base station, an orthogonal cover code used when receiving the PDSCH may be deactivated. In case that the UE receives a configuration of higher layer signaling from the base station and is scheduled for a PDSCH through DCI format 1_1 or 1_2, in case that the number of DMRS ports of an antenna port field indicated through the corresponding DCI format is 1, that is, a PDSCH including a single layer is scheduled, and in case that the corresponding DMRS port is included in a specific CDM group, the UE may assume that other DMRS ports orthogonal to the corresponding DMRS port within the CDM group including the corresponding DMRS port are not scheduled for other UEs.

The base station may use one or more predetermined CDM groups among CDM groups available for the UE for the purpose of channel estimation and may use remaining one or more CDM groups for spatial multiplexing with another UE. In this case, the base station may notify the one or more predetermined CDM group to the UE by using a configuration method through higher layer signaling, using an indication method based on L1 signaling, using a combination method of higher layer and L1 signaling, or using a method fixedly specified in the standard.

By way of example, if the base station uses a configuration method through higher layer signaling, in case that the base station configures, for example, CDM group #0 for the UE and if the UE is indicated to use DMRS ports within the corresponding CDM group, the base station may notify to deactivate an orthogonal cover code to be applied to the corresponding DMRS port. That is, the UE may assume that other DMRS ports orthogonal to the corresponding DMRS port within the CDM group including the corresponding DMRS port are not scheduled for other UEs. By way of example, in case that the base station uses an indication method based on L1 signaling, the base station may indicate to the UE to deactivation of an orthogonal cover code with respect to a predetermined CDM group through an antenna port field in DCI format 1_1 or 1_2 or dynamically indicate to the UE through a field newly defined for a corresponding function.

By way of example, a case in which the base station uses a combination method of higher layer signaling and L1 signaling will be described. The base station may notify the UE of configuration information indicating turning on or turning off an orthogonal cover code deactivation function through higher layer signaling, and in case that the UE receives a configuration of turning on corresponding higher layer signaling and an indication of deactivation of an orthogonal cover code with respect to a predetermined CDM group through an antenna port field in DCI format 1_1 or 1_2 or a new field, the UE may assume that an orthogonal cover code with respect to a DMRS port within the corresponding CDM group is deactivated.

By way of example, a case in which the base station uses another combination method of higher layer signaling and L1 signaling will be described. The base station may notify the UE of configuration information indicating which CDM groups are used for orthogonal cover code deactivation through higher layer signaling, and in case that the corresponding higher layer signaling is configured as CDM group #0 and a DMRS port within the CDM group #0 is indicated through an antenna port field in DCI format 1_1 or 1_2, the UE may assume that an orthogonal cover code is deactivated when receiving the DMRS port within the corresponding CDM group. That is, the UE may assume that only the corresponding DMRS port is scheduled across all UEs in the CDM group including the corresponding DMRS port and other DMRS ports orthogonal to the corresponding DMRS port is not used. Therefore, when receiving the corresponding DMRS port, the UE may use each RE for channel estimation without applying an orthogonal cover code with respect to multiple REs. Accordingly, the UE may expect improved channel estimation performance using each DMRS RE without separating different DMRS ports spatially multiplexed using a plurality of REs.

[Method 2-3]

In case that the UE receives a configuration of higher layer signaling from the base station and is scheduled for rank 1 PDSCH by using one among one or more predetermined DMRS ports, an orthogonal cover code used when receiving the PDSCH may be deactivated. In case that the UE receives a configuration of higher layer signaling from the base station and is scheduled for a PDSCH through DCI format 1_1 or 1_2, in case that the number of DMRS ports of an antenna port field indicated through the corresponding DCI format is 1, that is, a PDSCH including a single layer is scheduled, and in case that one among one or more predetermined DMRS ports is indicated, the UE may assume that other DMRS ports orthogonal to the corresponding DMRS port within the CDM group including the corresponding DMRS port are not scheduled for other UEs.

The base station may use one or more predetermined DMRS ports among multiple DMRS ports available for the UE for the purpose of channel estimation and may use remaining one or more DMRS ports for spatial multiplexing with another UE. In this case, the base station may notify information on the one or more predetermined DMRS ports to be used for the purpose of channel estimation performance improvement to the UE by using a configuration method through higher layer signaling, using an indication method based on L1 signaling, using a combination method of higher layer and L1 signaling, or using a method fixedly specified in the standard.

By way of example, if the base station uses a configuration method through higher layer signaling, in case that the base station configures, for example, DMRS ports #0 and #2 for the UE and if the UE is indicated to use one of the corresponding DMRS ports, the base station may notify the UE to deactivate an orthogonal cover code to be applied to the corresponding DMRS port. That is, the UE may assume that other DMRS ports orthogonal to the corresponding DMRS port within the CDM group including the corresponding DMRS port are not scheduled for other UEs. By way of example, a case in which the base station uses an indication method based on L1 signaling will be described.

The base station may indicate to the UE to deactivation of an orthogonal cover code with respect to a predetermined DMRS port through an antenna port field in DCI format 1_1 or 1_2 or dynamically indicate to the UE through a field newly defined for a corresponding function.

By way of example, a case in which the base station uses a combination method of higher layer signaling and L1 signaling will be described. The base station may notify the UE of configuration information indicating turning on or turning off an orthogonal cover code deactivation function through higher layer signaling, and in case that the UE receives a configuration of turning on corresponding higher layer signaling and an indication of deactivation of an orthogonal cover code with respect to one of one or more predetermined DMRS ports through an antenna port field in DCI format 1_1 or 1_2 or a new field, the UE may assume that an orthogonal cover code with respect to the indicated DMRS port within the corresponding CDM group is deactivated.

By way of example, a case in which the base station uses another combination method of higher layer signaling and L1 signaling will be described. The base station may notify the UE of configuration information indicating which DMRS ports are used for orthogonal cover code deactivation through higher layer signaling, and in case that the corresponding higher layer signaling is configured as DMRS port 0 or 2 and one of DMRS port 0 or 2 is indicated through an antenna port field in DCI format 1_1 or 1_2, the UE may assume that an orthogonal cover code is deactivated when receiving the DMRS port. That is, the UE may assume that only the corresponding DMRS port is scheduled in all UEs within the CDM group including the corresponding DMRS port and other DMRS ports orthogonal to the corresponding DMRS port are not used, and thus the UE may use each RE for channel estimation without applying an orthogonal cover code with respect to multiple REs when receiving the corresponding DMRS port. Accordingly, the UE may expect improved channel estimation performance using each DMRS RE without separating different DMRS ports spatially multiplexed using a plurality of REs.

The UE may report functions corresponding to [Method 2-1] to [Method 2-3] described above as a UE capability to the base station. Here, the functions which may be included in the UE capability may include at least one combination of the followings.

In addition, the corresponding UE capability report may be valid for FR1 or valid for both FR1 and FR2. The corresponding UE capability may be reported with different values for each band, band combination, feature set, feature set per CC, and per UE. Different values may be reported depending on a band combination. After receiving the UE capability, the base station may configure higher layer signaling corresponding thereto and the higher layer signaling may correspond to one of the methods described above or independent higher layer signaling.

Figure 18:
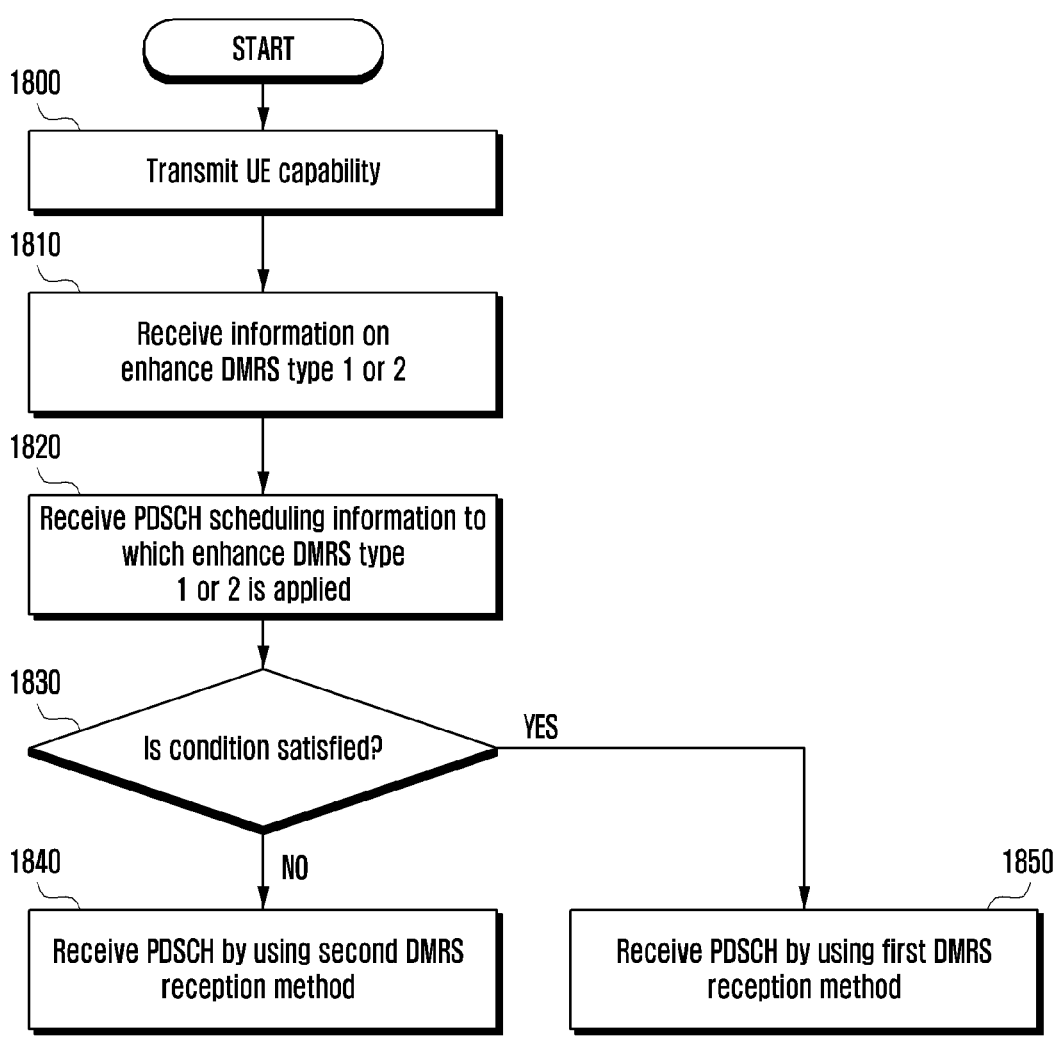
FIG. 18 illustrates an operation of a UE for activating DMRS orthogonal cover code according to an embodiment of the disclosure.

FIG. 18 illustrates an example of an operation of a UE for activating DMRS orthogonal cover code according to an embodiment of the disclosure.

A UE may transmit the UE capability described above to a base station (1800). Here, the UE capability reportable may correspond to a UE capability for supporting enhanced DMRS types 1 and 2 as described above, a UE capability for supporting or not the method mentioned in the above-described embodiments, an individual UE capacity for the PDSCH and PUSCH, or an integrated UE capability. Thereafter, the UE may receive information on enhance DMRS type 1 or 2 from the base station (1810). In this case, the information on enhanced DMRS type 1 or 2 may include a notification (which may be based on independent higher layer signaling, based on higher layer signaling for the above-described enhanced DMRS types 1 and 2, activated or deactivated based on a MAC-CE, or dynamically indicted through PDCCH) of the methods mentioned in the above-described embodiments for the UE from the base station.

Thereafter, the UE may receive PDSCH scheduling information to which enhance DMRS type 1 or 2 is applied from the base station (1820). Here, the corresponding scheduling information may be indicated through DCI format 1_1 or 1_2 in case of the PDSCH and may be indicated by using an antenna field and/or a new field related to orthogonal cover code deactivation depending on which of the methods mentioned in the above embodiments is based. In this case, if a condition required for [Method 2-1] to [Method 2-3] is satisfied (1830), the UE may receive the PDSCH by using a first DMRS reception method (1840). Satisfying the above-described required condition may correspond to a case in which, according to [method 2-3] for example, the UE receives a configuration of information about deactivating an orthogonal cover code when using DMRS port 0 through higher layer signaling from the base station and receives an indication of DMRS port 0 through an antenna port field included in DCI format 1_1 or 1_2, otherwise the above-described required condition is not satisfied, and the UE may receive the PDSCH by using a second DMRS reception method (1850).

As the first DMRS reception method, the UE may deactivate the orthogonal cover code with respect to the indicated DMRS port and receive the PDSCH by using each of multiple DMRS REs without application of the orthogonal cover code to be used for channel estimation not by using multiple DMRS REs and applying the orthogonal cover code for channel estimation (1850). That is, the UE may assume that other DMRS ports orthogonal to the corresponding DMRS port within the CDM group including the corresponding DMRS port are not scheduled for other UEs. As the second DMRS reception method, the UE may activate the orthogonal cover code with respect to the indicated DMRS port and receive the PDSCH by using multiple DMRS REs and applying the orthogonal cover code for channel estimation (1840).

The operations described above are merely an example, not all operations are essential, and one of the operations may not be performed, the order may be changed, omitted, or other operations may be added.

Figure 19:
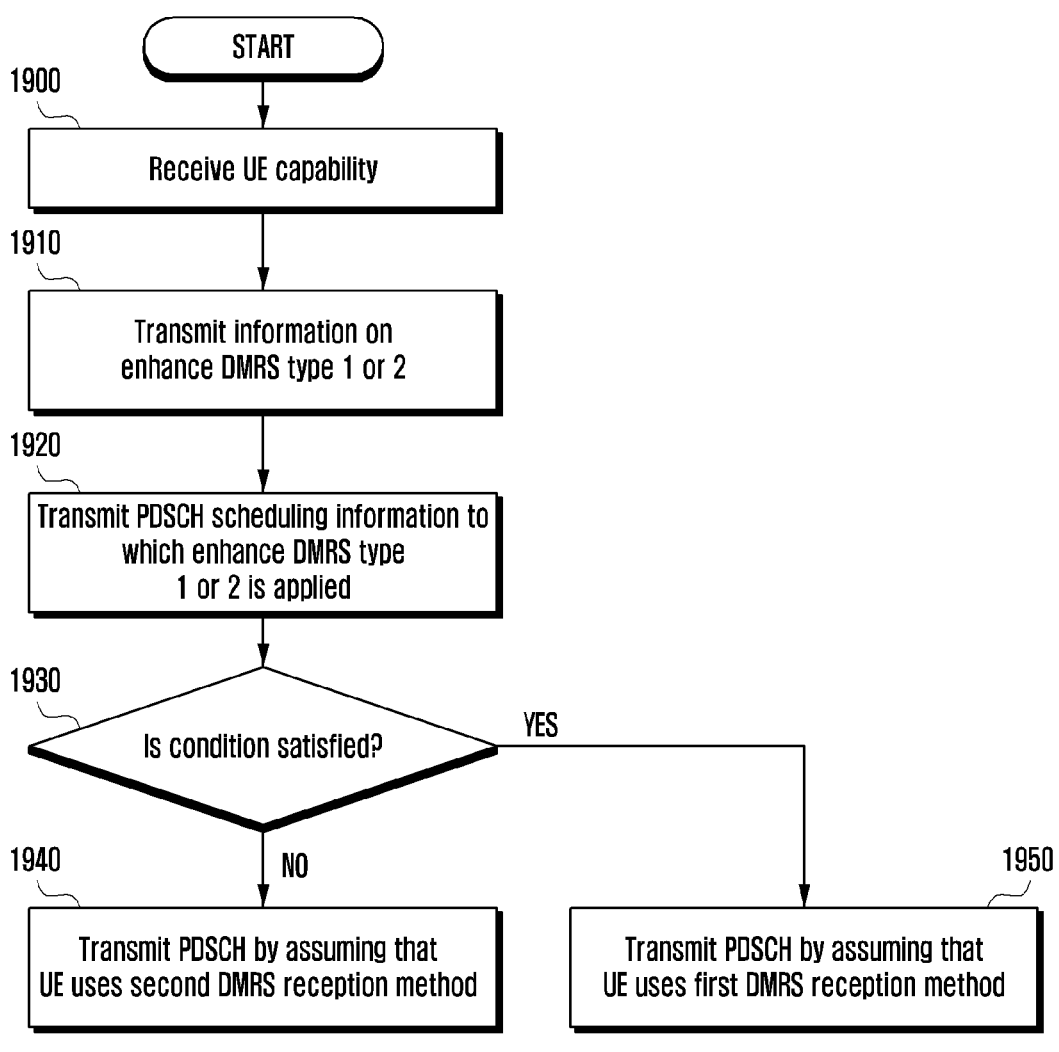
FIG. 19 illustrates an operation of a base station for deactivating DMRS orthogonal cover code according to an embodiment of the disclosure.

FIG. 19 illustrates an example of an operation of a base station for deactivating DMRS orthogonal cover code according to an embodiment of the disclosure.

Abase station may receive the UE capability described above from a UE (1900). Here, the UE capability reportable may correspond to a UE capability for supporting enhanced DMRS types 1 and 2 as described above, a UE capability for supporting or not the method mentioned in the above-described embodiments, an individual UE capacity for the PDSCH and PUSCH, or an integrated UE capability. Thereafter, the base station may transmit information on enhance DMRS type 1 or 2 to the UE (1910). In this case, the information on enhanced DMRS type 1 or 2 may include a notification (which may be based on independent higher layer signaling, based on higher layer signaling for the above-described enhanced DMRS types 1 and 2, activated or deactivated based on a MAC-CE, or dynamically indicted through PDCCH) of the methods mentioned in the above-described embodiments for the UE from the base station.

Thereafter, the base station may transmit PDSCH scheduling information to which enhance DMRS type 1 or 2 is applied to the UE (1920). Here, the corresponding scheduling information may be indicated through DCI format 1_1 or 1_2 in case of the PDSCH and may be indicated by using an antenna field and/or a new field related to orthogonal cover code deactivation depending on which of the methods mentioned in the above embodiments is based. In this case, if a condition required for [Method 2-1] to [Method 2-3] is satisfied (1930), the base station may transmit the PDSCH assuming that the PDSCH is received by using a first DMRS reception method (1940). Satisfying the above-described required condition may correspond to a case in which, according to [method 2-3], for example, the base station configures information about deactivating an orthogonal cover code when using DMRS port 0 through higher layer signaling to the UE and indicates DMRS port 0 through an antenna port field included in DCI format 1_1 or 1_2. Otherwise, it may mean that the above-described required condition is not satisfied, and the base station may transmit the PDSCH assuming that the PDSCH is received by using a second DMRS reception method (1950).

When the first DMRS reception method is applied, the base station may not schedule, to other UEs, other DMRS ports orthogonal to the corresponding DMRS port within the CDM group including the DMRS port indicated to the UE together. As the first DMRS reception method, the UE may deactivate the orthogonal cover code with respect to the indicated DMRS port and receive the PDSCH by using each of multiple DMRS REs without application of the orthogonal cover code to be used for channel estimation not by using multiple DMRS REs and applying the orthogonal cover code for channel estimation. That is, the UE may assume that other DMRS ports orthogonal to the corresponding DMRS port within the CDM group including the corresponding DMRS port are not scheduled for other UEs. As the second DMRS reception method, the UE may activate the orthogonal cover code with respect to the indicated DMRS port and receive the PDSCH by using multiple DMRS REs and applying the orthogonal cover code for channel estimation. When the second DMRS reception method is applied, the base station may schedule, to other UEs, other DMRS ports orthogonal to the corresponding DMRS port within the CDM group including the DMRS port indicated to the UE together.

The operations described above are merely an example, not all operations are essential, and one of the operations may not be performed, the order may be changed, omitted, or other operations may be added.

Embodiment 3: Orthogonal Cover Code Determination Method when Supporting Enhanced DMRS Types 1 and 2

As an embodiment of the disclosure, an orthogonal cover code determination method of a UE and a base station when supporting enhanced DMRS types 1 and 2 will be described. When supporting enhanced DMRS types 1 and 2 based on the various methods described in the above-described embodiments, in case that the base station schedules PDSCH reception or PUSCH transmission based on enhanced DMRS types 1 and 2 through various method to be described below, the UE may determine a sign of an orthogonal cover code to be applied to a DMRS RE. Furthermore, when the base station notifies the UE of a combination of higher layer signaling or/and L1 signaling for determining the sign of an orthogonal cover code to be applied to the DMRS RE through various methods to be described below, the base station may determine the sign of the orthogonal cover code in the DMRS RE and transmit the PDSCH DMRS to the UE so that the UE may receive the PDSCH by determining the sign of the orthogonal cover code according to an indication of the base station, or the base station may receive the PUSCH DMRS based on code information of the orthogonal cover code indicated to the UE to receive the PUSCH when the UE determines the sign of the orthogonal cover code according to an indication of the base station and transmits the PUSCH.

This is because when in a multi-user MIMO situation in which multiple UEs are scheduled for the same time and frequency resources, some UEs operate in the enhanced DMRS type and some other UEs use the conventional DMRS type, a UE operating in the enhanced DMRS type or the conventional DMRS type may not be able to distinguish a DMRS allocated to the UE. A detailed example may refer to FIG. 20, and the disclosure is not limited by the example of FIG. 20.

[Method 3-1]

When higher layer signaling for determining the sign of an orthogonal cover code is configured from the base station, the UE may determine a sign of an orthogonal cover code to be applied to a DMRS RE according to the corresponding high layer signaling. For example, if the UE receives a configuration of higher layer signaling as "enable" for reversing the sign of an orthogonal cover code from the base station, the UE may reverse the sign of the predefined orthogonal cover code for each DMRS RE according to each DMRS port indication.

For example, in the case of Enhanced DMRS type 1 support method 1, when supporting DMRS port 0 corresponding to CDM group #0, for DMRS REs, a first RE, a fifth RE, a ninth RE of a first RB, and a first RE, a fifth RE, and a ninth RE of a second RB may all be multiplied by +1. That is, the orthogonal cover code applied to DMRS port 0 may be [+1, +1, +1, +1, +1, +1]. Furthermore, when DMRS port 0 corresponding to CDM group #0 is supported, for DMRS REs, a first RE, a fifth RE, a ninth RE of a first RB, and a first RE, a fifth RE, and a ninth RE of a second RB may be multiplied by +1, −1, +1, −1, +1, and −1, respectively. That is, the orthogonal cover code applied to DMRS port 1 may be [+1, −1, +1, −1, +1, −1]. In this case, if the UE receives a configuration of higher layer signaling as "enable" for reversing the sign of an orthogonal cover code, orthogonal cover codes for DMRS ports 0 and 1 allocated to the corresponding UE may be [−1, −1, −1, −1, −1, −1] and [−1, +1, −1, +1, −1, +1], respectively.

In addition to the higher layer signaling described above, the UE may reconstruct orthogonal cover code values in each table so that a constant such as $\exp(j*\pi p)$ is multiplied for each orthogonal cover code in the table in which the orthogonal cover code is defined in a standard. For the higher layer signaling, the value of p described above may be used as 0 or 1. If the UE receives a configuration of the value of p as 0 for higher layer signaling, the UE uses the orthogonal cover code defined in the standard as it is, and if the UE a configuration of the value of p as 1, the UE may use an orthogonal cover code having an reversed code compared to the orthogonal cover code defined in the standard. The reconstruction may be applied to other methods.

[Method 3-2]

The UE receives L1 signaling for determining the sign of an orthogonal cover code from the base station and determine a sign of an orthogonal cover code to be applied to a DMRS RE. The L1 signaling may be performed based on a new field in DCI format 1_1 or 1_2 transmitted from the base station to the UE, performed based on a specific entry of a table referred to by an antenna port field in DCI format 1_1 or 1_2, or performed based on an additional 1 bit in an antenna port in DCI format 1_1 or 1_2. When receiving such an L1 signaling, the UE may reverse the sign of the predefined orthogonal cover code for each DMRS RE according to each DMRS port indication.

For example, in the case of Enhanced DMRS type 1 support method 1, when supporting DMRS port 0 corresponding to CDM group #0, for DMRS REs, a first RE, a fifth RE, a ninth RE of a first RB, and a first RE, a fifth RE, and a ninth RE of a second RB may all be multiplied by +1. That is, the orthogonal cover code applied to DMRS port 0 may be [+1, +1, +1, +1, +1, +1]. Furthermore, when DMRS port 0 corresponding to CDM group #0 is supported, for DMRS REs, a first RE, a fifth RE, a ninth RE of a first RB, and a first RE, a fifth RE, and a ninth RE of a second RB may be multiplied by +1, −1, +1, −1, +1, and −1, respectively. That is, the orthogonal cover code applied to DMRS port 1 may be [+1, −1, +1, −1, +1, −1]. In this case, if the UE receives a configuration of signaling for reversing the sign of an orthogonal cover code, orthogonal cover codes for DMRS ports 0 and 1 may be [−1, −1, −1, −1, −1, −1] and [−1, +1, −1, +1, −1, +1], respectively.

[Method 3-3]

The UE may be notified of information for determining a sign of an orthogonal cover code based on a combination of higher layer signaling configuration and L1 signaling indication from the base station, and may determine a sign of an orthogonal cover code to be applied to a DMRS RE based thereon. The corresponding higher layer signaling and L1 signaling may use a combination of at least one of the methods described in methods 3-1 and 3-2. For example, if the UE receives a configuration of higher layer signaling as "enable" for reversing the sign of an orthogonal cover code from the base station, the UE may expect that a table referred to by an antenna port field in DCI format 1_1 or 1_2 includes an entry for reversing the sign of an orthogonal cover code, and if higher layer signaling is configured to be "disable," the UE may expect that the table referred to by the antenna port field in DCI format 1_1 or 1_2 uses a conventional table that does not include an entry for reversing the sign of an orthogonal cover code.

For example, in the case of Enhanced DMRS type 1 support method 1, when supporting DMRS port 0 corresponding to CDM group #0, for DMRS REs, a first RE, a fifth RE, a ninth RE of a first RB, and a first RE, a fifth RE, and a ninth RE of a second RB may all be multiplied by +1. That is, the orthogonal cover code applied to DMRS port 0 may be [+1, +1, +1, +1, +1, +1]. Furthermore, when DMRS port 0 corresponding to CDM group #0 is supported, for DMRS REs, a first RE, a fifth RE, a ninth RE of a first RB, and a first RE, a fifth RE, and a ninth RE of a second RB may be multiplied by +1, −1, +1, −1, +1, and −1, respectively. That is, the orthogonal cover code applied to DMRS port 1 may be [+1, −1, +1, −1, +1, −1]. In this case, if the UE receives a configuration of signaling for reversing the sign of an orthogonal cover code, orthogonal cover codes for DMRS ports 0 and 1 may be [−1, −1, −1, −1, −1, −1] and [−1, +1, −1, +1, −1, +1], respectively.

[Method 3-4]

The UE may receive MAC-CE signaling from the base station to be notified of activation of information for determining the sign of an orthogonal cover code, and may determine a sign of an orthogonal cover code to be applied to a DMRS RE based thereon. The corresponding MAC-CE may be used to change the above-described higher layer signaling value of the base station.

For example, if the UE receives a MAC-CE and the MAC-CE includes information to change a higher layer signaling value for reversing the sign of an orthogonal cover code from "enable" to "disable," the UE may restore the sign of the orthogonal cover code applied to the DMRS port indicated together when scheduling the PDSCH received from the base station after slot 3 for transmitting the HARQ-ACK for the corresponding MAC-CE from an reversed state to the original and apply the sign to the DMRS RE. On the contrary, if the UE receives a MAC-CE and the MAC-CE includes information to change a higher layer signaling value for reversing the sign of an orthogonal cover code from "disable" to "enable," the UE may reverse the sign of the orthogonal cover code applied to the DMRS port indicated together when scheduling the PDSCH received from the base station after slot 3 for transmitting the HARQ-ACK for the corresponding MAC-CE to be applied to the DMRS RE.

For another example, in case that the base station transmit, to the UE, a MAC-CE for changing a value of higher layer signaling P in exp(j*np), which is a constant to multiply by the orthogonal cover code, from 0 to 1, the UE may reverse the sign of the orthogonal cover code applied to the DMRS port indicated together when scheduling the PDSCH received from the base station after slot 3 for transmitting the HARQ-ACK for the corresponding MAC-CE and apply the sign to the DMRS RE. Furthermore, in case that the UE may receive an MAC-CE for activating an orthogonal cover code of an reversed sign to be applied to predetermined entries of a table referred to by an antenna port field in DCI format 1_1 or 1_2 indicated by the base station, and an entry to which an orthogonal cover code of an reversed sign is applied is indicated through an antenna port field in DCI formats 1_1 and 1_2 when scheduling a PDSCH received from a base station after slot 3 for transmitting HARQ-ACK for the corresponding MAC-CE, the UE may reverse the sign of the orthogonal cover code applied to the DMRS port to be applied to the DMRS RE.

For example, in the case of Enhanced DMRS type 1 support method 1, when supporting DMRS port 0 corresponding to CDM group #0, for DMRS REs, a first RE, a fifth RE, a ninth RE of a first RB, and a first RE, a fifth RE, and a ninth RE of a second RB may all be multiplied by +1. That is, the orthogonal cover code applied to DMRS port 0 may be [+1, +1, +1, +1, +1, +1]. Furthermore, when DMRS port 0 corresponding to CDM group #0 is supported, for DMRS REs, a first RE, a fifth RE, a ninth RE of a first RB, and a first RE, a fifth RE, and a ninth RE of a second RB may be multiplied by +1, −1, +1, −1, +1, and −1, respectively. That is, the orthogonal cover code applied to DMRS port 1 may be [+1, −1, +1, −1, +1, −1]. In this case, if the UE receives a configuration of signaling for reversing the sign of an orthogonal cover code, orthogonal cover codes produced by the UE for DMRS ports 0 and 1 may be [−1, −1, −1, −1, −1, −1] and [−1, +1, −1, +1, −1, +1], respectively.

Figure 20:
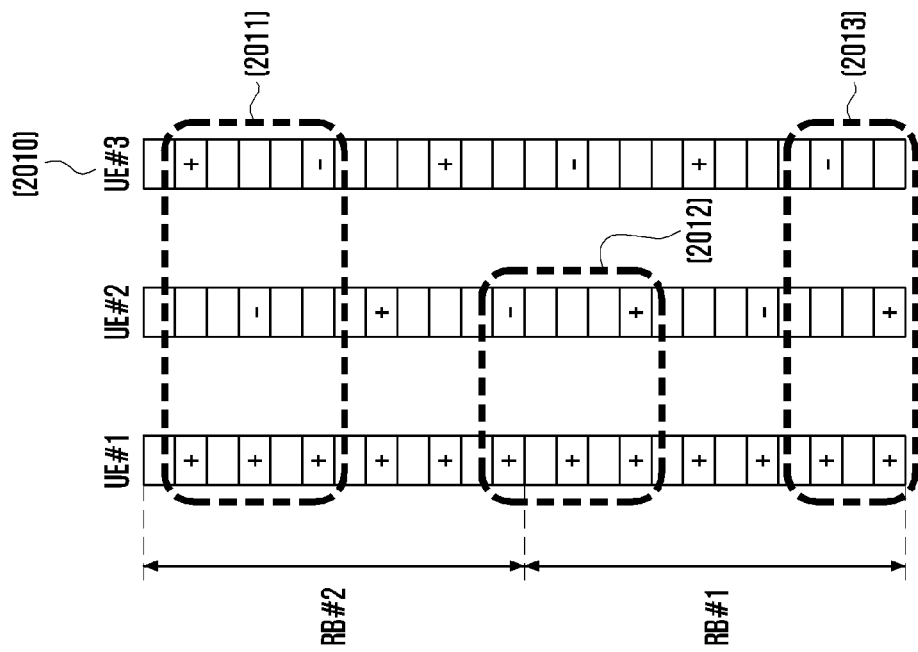
FIG. 20 illustrates an example of space multiplexing between an existing DMRS type and an enhanced DMRS type according to an embodiment of the disclosure.
Figure 20:
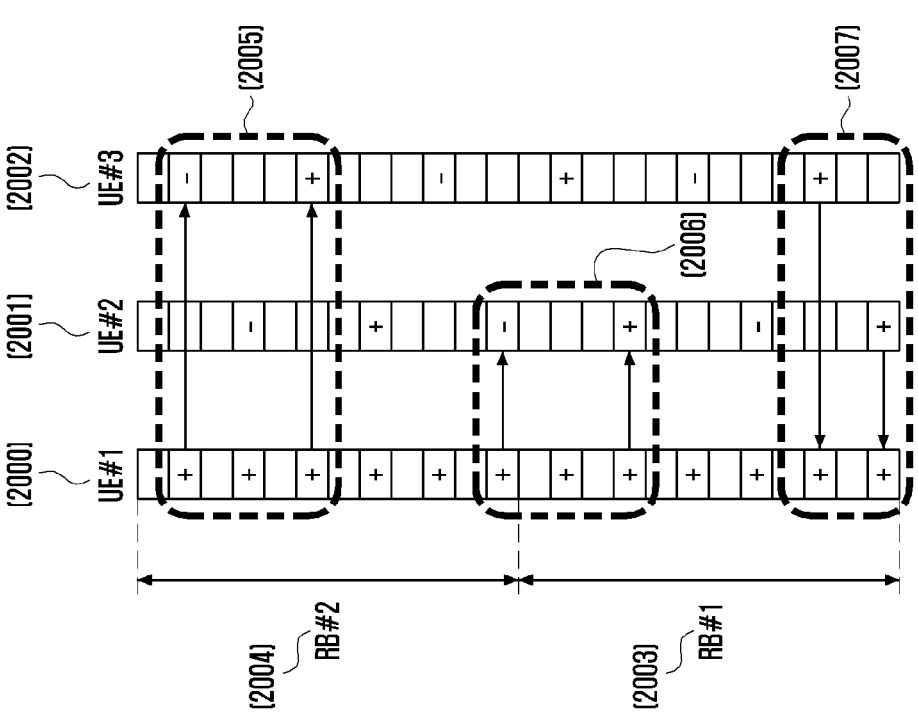

FIG. 20 illustrates space multiplexing between an existing DMRS type and an enhanced DMRS type according to an embodiment of the disclosure.

The base station may schedule three UEs, UE #1 2000, UE #2 2001, and UE #3 2002, in a spatial multiplexing manner and may use one DMRS port for each UE and two RBs 2003 and 2004. DMRS port 0 is scheduled for UE #1 based on DMRS type 1 and thus an orthogonal cover code+1 may be used for every DMRS RE existing every two REs from a first RE in two RBs. DMRS port 1 in CDM group 0 and DMRS port 5 in CDM group 2 based on enhanced DMRS type 1 according to [Enhanced DMRS type support method 1] described above may be scheduled for UE #2 and UE #3, respectively. Accordingly, UE #2 may consider, as orthogonal cover code of a DMRS RE, multiplying a first RE, a fifth RE, and a ninth RE of a first RB, and a first RE, a fifth RE, and a ninth RE of a second RB by +1, −1, +1, −1, +1, −1, respectively, and UE #3 may consider multiplying a third RE, a seventh RE, and an eleventh RE of the first RB, and a third RE, a seventh RE, and an eleventh RE of the second RB by +1, −1, +1, −1, +1, and −1, respectively.

Here, the DMRS REs for the three UEs overlap and thus each UE is required be able to distinguish interference from other UEs through an orthogonal cover code when receiving a PDSCH from the base station. From the reception point of UE #3, since two DMRS REs of UE #3 and two DMRS REs of UE #1 overlap and an orthogonal cover code having a length of 2 that is orthogonal to each other is used, the DMRS of UE #3 may be distinguished from the interference caused by the DMRS of UE #1 (2005). From the reception point of UE #2, since two DMRS REs of UE #2 and two DMRS REs of UE #1 overlap and an orthogonal cover code having a length of 2 that is orthogonal to each other is used, the DMRS of UE #2 may be distinguished from the inter-ference caused by the DMRS of UE #1 (2006).

However, from the reception point of UE #1, since one of two DMRS REs of UE #1 to which an orthogonal cover code having a length of 2 is applied overlaps one DMRS RE of UE #2, the other of two DMRS REs of UE #1 to which an orthogonal cover code having a length of 2 is applied overlaps one DMRS RE of UE #3, and orthogonal cover codes having a length of 2 that are not orthogonal to each other are used, the DMRS of UE #1 may not be distin-guished from the DMRSs of UE #2 and UE #3 (2007).

As such, the interference from DMRS REs of other UEs may not be distinguished through orthogonal cover codes, and thus the base station may notify UE #3 of information for reversing the sign of an orthogonal cover code to UE #3 through a combination of at least one of the above-described [Method 3-1] to [Method 3-4], and the base station may transmit a DMRS in which the sign of the orthogonal cover code is reversed to UE #3 (2010). UE #3 may consider multiplying a third RE, a seventh RE, and an eleventh RE of the first RB, and a third RE, a seventh RE, and an eleventh RE of the second RB by −1, +1, −1, +1, −1, and +1, respectively. In this case, from the reception point of UE #3, since two DMRS REs of UE #3 and two DMRS REs of UE #1 overlap and an orthogonal cover code having a length of 2 that is orthogonal to each other is used, the DMRS of UE #3 may be distinguished from the interference caused by the DMRS of UE #1 (2011).

From the reception point of UE #2, since two DMRS REs of UE #2 and two DMRS REs of UE #1 overlap and an orthogonal cover code having a length of 2 that is orthogonal to each other is used, the DMRS of UE #2 may be distin-guished from the interference caused by the DMRS of UE #1 (2012). Furthermore, from the reception point of UE #1, since one of two DMRS REs of UE #1 to which an orthogonal cover code having a length of 2 is applied overlaps one DMRS RE of UE #2, the other of two DMRS REs of UE #1 to which an orthogonal cover code having a length of 2 is applied overlaps one DMRS RE of UE #3, and orthogonal cover codes having a length of 2 that are orthogo-nal to each other are used through sign inversion of the orthogonal cover code of UE #3, the DMRS of UE #1 may be distinguished from the DMRSs of UE #2 and UE #3 (2013).

The above-described contents in the embodiment are not applied only between conventional DMRS type 1 and enhanced DMRS type 1 based on [Enhanced DMRS type 1 support method 1], but may be similarly applied between conventional DMRS types 1 and 2 and enhanced DMRS types 1 and 2 based on the methods for supporting enhanced DMRS types 1 and 2 mentioned in the above-described embodiments.

The UE may report functions described above as a UE capability to the base station. Here, the functions which may be included in the UE capability may include at least one combination of the followings.

In addition, the corresponding UE capability report may be valid for FR1 or valid for both FR1 and FR2. The corresponding UE capability may be reported with different values for each band, band combination, feature set, feature set per CC, and per UE. Different values may be reported depending on a band combination. After receiving the UE capability, the base station may configure higher layer signaling corresponding thereto and the higher layer signal-ing may correspond to one of the methods described above or independent higher layer signaling.

Embodiment 4: Demodulation Reference Signal Power Control Method when Supporting Enhanced DMRS Types 1 and 4

As an embodiment of the disclosure, demodulation ref-erence signal power control method of a base station and a UE when supporting enhanced DMRS types 1 and 2 of will be described. As described above, since enhanced DMRS types 1 and 2 may use a method of increasing the number of orthogonal DMRS ports by using fewer REs than conven-tional DMRS types 1 and 2, a portion of DMRS REs used in conventional DMRS type 1 by a UE may be interfered by a predetermined UE using enhanced DMRS type 1 and/or 2 and a remaining portion of DMRS REs used in conventional DMRS type 1 may be interfered by another UE using enhanced DMRS type 1 and/or 2. That is, the UE may receive interference signals from different UEs in different DMRS REs, and in this case, orthogonal cover codes are required be applied to the corresponding different DMRS REs, and when power of interference signals from different UEs received in different DMRS REs is different, a problem may occur in channel estimation to which the orthogonal cover code of the UE is applied. The case in which power of interference signals from different UEs is different may include, for example, a case in which different power ratios between PDSCH and DMRS are applied to DMRSs of different UEs that cause interference.

Accordingly, in case that a UE configured with conven-tional DMRS type 1 or 2 receives interference from different UEs configured with enhanced DMRS type 1 or 2 at different DMRS RE locations, it may be assumed that the interference power of DMRS REs of different UEs is the same. Furthermore, in case that a UE configured with conventional DMRS type 1 or 2 receives interference from different UEs configured with enhanced DMRS type 1 or 2 at different DMRS RE locations, interference power of DMRS REs of different UEs may not be expected to be different. For example, a UE may perform channel estima-tion under the assumption that the same power increase is applied to DMRSs of other UEs causing interference.

Figure 21:
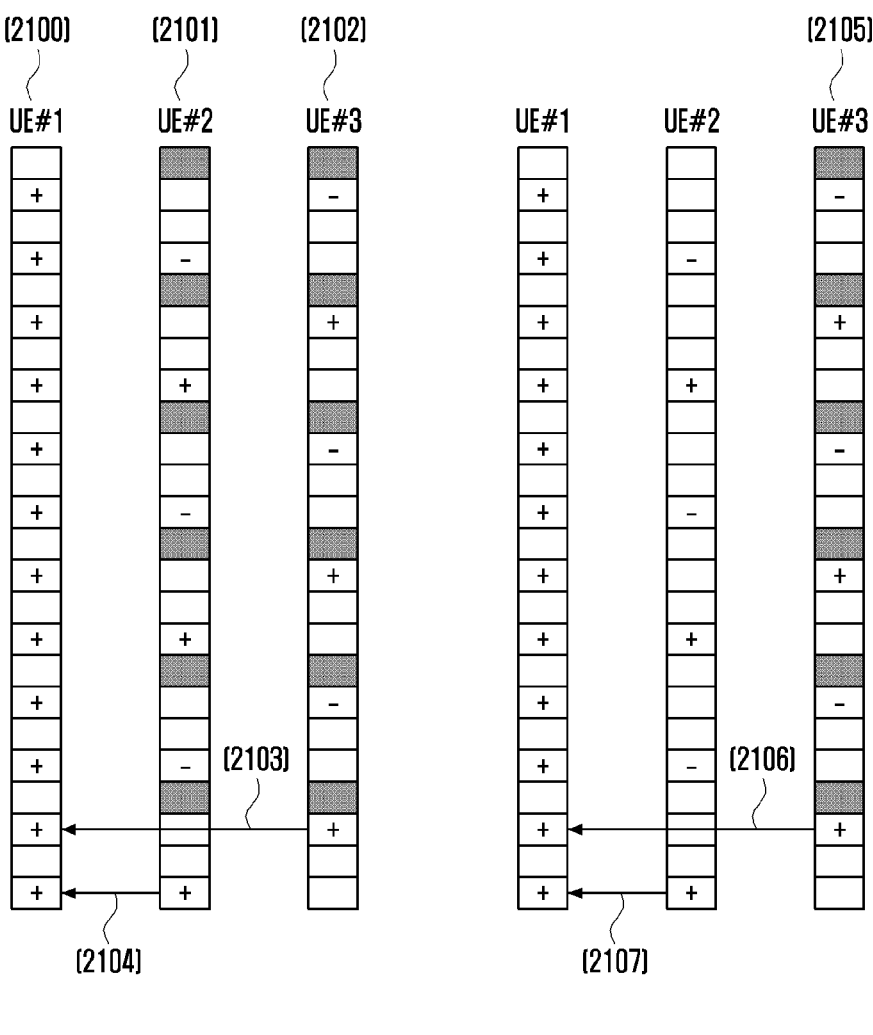
FIG. 21 illustrates a method for controlling DMRS power when supporting an enhanced DMRS according to an embodiment of the disclosure.

FIG. 21 illustrates a method for controlling DMRS power when supporting an enhanced DMRS according to an embodiment of the disclosure.

The base station may schedule, for example, three UEs, UE #1 2100, UE #2 2101, and UE #3 2102, in a spatial multiplexing manner and may use one DMRS port for each UE and two RBs. In this case, both UE #2 2101 and UE #3 2102 may correspond to a case in which "number of DMRS CDM group(s) without data," which is information in a DMRS table entry indicated through an antenna port field included in DCI format 1_1 or 1_2, is all indicated as 3. In Enhanced DMRS type 1 support method 1, since the total number of CDM groups is 4 and the indicated "number of DMRS CDM group(s) without data" is 3, the indicated DMRS may be transmitted or the RE may be emptied at RE locations where up to 3 DMRS CDM groups may exist from a low CDM group index (2111). PDSCH may be transmitted at A RE location where a fourth DMRS CDM group may exists (2110). Accordingly, considering the above-described power ratios between PDSCH and DMRS, A power increase of as much as 4.77 dB may occur in both UE #2 and UE #3. Even in this case, UE #1 may expect the same power of two different interference signals with respect to two different REs that are interfered with by the DMRS REs of UE #2 and UE #3. The base station may perform scheduling so that the same power ratio between PDSCH and DMRS is applied to DMRSs allocated to concurrently scheduled UEs which may cause interference to a predetermined UE. By way of example, by the scheduling method, the base station may allocate DMRSs to UEs scheduled together so that the value of number of DMRS CDM group(s) without data is the same.

In contrast, in case that "number of DMRS CDM group(s) without data," which is information in a DMRS table entry indicated through an antenna port field included in DCI format 1_1 or 1_2, is indicated to UE #2 as 3, but is indicated to UE #3 as 4, a power increase of 4.77 and 6 dB may occur in both UE #2 and UE #3 when the above-described power ratio between PDSCH and DMRS is considered. Accordingly, UE #1 may expect different power of two different interference signals with respect to two different REs that are interfered with by the DMRS REs of UE #2 and UE #3. However, the UE may not expect such scheduling, and may expect interference power from different UEs received in different REs to be similar or equal to each other. The base station may not perform PDSCH and PDSCH DMRS, and PUSCH and PUSCH DMRS scheduling so that DMRS REs of multiple different UEs have different interference power to a DMRS RE of one UE.

Embodiment 5: Multi-User MIMO Support Method Using Enhanced DMRS Type

As an embodiment of the disclosure, a multi-user MIMO support method using enhanced DMRS type will be described. This embodiment may operate together with a combination of at least one of Embodiment 1 to Embodiment 4.

It is assumed that the UE is configured for enhanced DMRS type 1 through higher layer signaling from the base station, and the UE receives scheduling information for PDSCH reception from the base station, that is, the corresponding UE receives a DMRS transmitted from a base station defined based on enhanced DMRS type 1 when receiving the PDSCH. In this case, the UE may assume a combination of at least one of the following items regarding the existence of other UEs scheduled by the base station in a multi-user MIMO (MU-MIMO) scheme in the CDM group in which the allocated DMRS port exists. The multi-user MIMO scheme may refer to a case in which DMRS ports allocated to multiple users are orthogonal to each other. Here, the case in which a DMRS port defined based on DMRS type 1 and a DMRS port defined based on enhanced DMRS type 1 exist in the same CDM group may be assumed based on the case in which the DMRS port is defined based on [Enhanced DMRS type 1 support method 6] among the various methods for supporting enhanced DMRS type 1. In this case, since DMRS type 1 and enhanced DMRS type 1 have the same DMRS RE mapping location and the same defined CDM group, the same CDM group may be used for two DMRS types. In this case, even if the DMRS port is within the same CDM group, a DMRS port defined based on DMRS type 1 and a DMRS port defined based on enhanced DMRS type 1 may be different.

When receiving a PDSCH DMRS from the base station, the UE may assume that there is no restriction on whether a DMRS port for another UE scheduled by the base station in a multi-user MIMO scheme exists in a CDM group including the corresponding DMRS port. In other words, the UE may assume that there is no restriction on the base station scheduling other UEs in the multi-user MIMO scheme using one or more other DMRS ports in the corresponding CDM group. The corresponding UE may receive configuration information on DMRS type 1 or enhanced DMRS type 1 from the base station through higher signaling and may receive a DMRS port in the corresponding CDM group defined based thereon. Here, the meaning of no restriction may be understood as that DMRS ports allocated to different UEs do not necessarily may be orthogonal to each other.

The disclosure contemplates a case in which a UE is scheduled with one or more of DMRS ports 1000 to 1007 based on enhanced DMRS type 1 for PDSCH reception from a base station, and the base station schedules one or more other UEs in a multi-user MIMO scheme using one or more other DMRS ports in the same CDM group as the DMRS port to which the corresponding UE is scheduled. In this case, the corresponding UE may expect that one or more other UEs scheduled in the multi-user MIMO scheme receive DMRS type 1 configuration from the base station and perform operations accordingly. The one or more other UEs scheduled in the multi-user MIMO scheme may be UEs of an earlier version than the corresponding UE, or may be UEs of a version capable of receiving enhanced DMRS type 1 configuration like the corresponding UE. The UE of an earlier version may be referred to as a UE incapable of supporting enhanced DMRS type 1. Furthermore, the UE may expect that a DMRS port allocated to the corresponding UE and a DMRS port allocated to the one or more other UEs scheduled by the base station in the multi-user MIMO scheme are orthogonal.

The disclosure contemplates a case in which the corresponding UE is scheduled with one or more of DMRS ports 1008 to 1015 based on enhanced DMRS type 1 for PDSCH reception from a base station, and the corresponding UE and one or more other UEs are configured with DMRS type 1 through higher layer signaling from the base station. Here, the corresponding UE may not expect that the corresponding UE and the one or more other UEs are scheduled in the multi-user MIMO scheme in the same CDM group by the base station. That is, it may not be expected that the DMRS port scheduled for one or more other UEs different from the corresponding UE is included in the same CDM group as the DMRS port scheduled for the corresponding UE. The one or more UEs may correspond to UEs of an earlier version. The UE of an earlier version may be referred to as a UE incapable of supporting enhanced DMRS type 1.

The disclosure contemplates a case in which a UE is scheduled with one or more of DMRS ports 1008 to 1015 based on enhanced DMRS type 1 for PDSCH reception from a base station, and the corresponding UE and one or more other UEs are configured with DMRS type 1 through higher layer signaling from the base station. Here, the corresponding UE may not expect that the corresponding UE and the one or more other UEs are scheduled in the multi-user MIMO scheme in the same CDM group by the base station. That is, it may not be expected that the DMRS port scheduled for one or more other UEs different from the corresponding UE is included in the same CDM group as the DMRS port scheduled for the corresponding UE. In this case, the one or more other UEs may be UEs of the same version as the corresponding UE, and the UEs of the same version may be UEs capable of supporting enhanced DMRS type 1.

The disclosure contemplates a case in which a UE is scheduled with a DMRS port based on DMRS type 1 for PDSCH reception from a base station, and the corresponding UE and one or more other UEs receive enhanced DMRS type 1 configuration through higher layer signaling and receive scheduling of one or more of DMRS ports 1008 to 1015 based on enhanced DMRS type 1. Here, the corresponding UE may expect that the corresponding UE and the one or more other UEs are scheduled in the multi-user MIMO scheme in the same CDM group by the base station. In other words, it may be expected that the DMRS port on which the corresponding UE is scheduled and the DMRS port on which the corresponding UE and one or more other UEs are scheduled belong to the same CDM group. Furthermore, it may be expected that the DMRS port on which the corresponding UE is scheduled and the DMRS port on which the corresponding UE and one or more other UEs are scheduled are orthogonal to each other by using an OCC.

Here, the corresponding UE may receive a notification from the base station that the one or more of other UEs (scheduled in the multi-user MIMO scheme in the same CDM group) are scheduled with one or more of DMRS ports 1008 to 1015 based on enhanced DMRS type 1, and the corresponding notification may be semi-statically configured through higher layer signaling, activated through MAC-CE, dynamically indicated through L1 signaling, or notified through a combination of higher layer signaling and L1 signaling. More specifically, in case that the UE receives configuration information indicating that multi-user MIMO scheduling is possible from the base station through higher layer signaling, the UE may receive higher layer signaling configuration indicating that the UE may apply an FD-OCC having a length of 4 to a DMRS port defined based on DMRS type 1 and receive same. The higher layer signaling may be included in DMRS type 1 configuration information. By way of example, the UE having received the higher layer signaling may apply an FD-OCC of [+1 +1 +1 +1] having a length of 4 in addition to applying an FD-OCC of [+1 +1] having a length of 2 to DMRS port 1000 defined based on DMRS type 1, and apply an FD-OCC of [+1 −1 +1 −1] having a length of 4 in addition to applying an FD-OCC of [+1−1] having a length of 2 to DMRS port 1001 so as to perform channel estimation.

Here, the corresponding UE may be a UE of a version capable of receiving enhanced DMRS type 1 like the one or more other UEs, and may be a UE having reported a UE capability that enhanced DMRS type 1 is supportable to the base station. Alternatively/in addition, the corresponding UE may be a UE having reported, to the base station, a UE capability indicating that at least one FD-OCC may be dynamically and freely applied without restriction during channel estimation, among FD-OCCs having a length of 2 that may be used when configuration for DMRS type 1 is received from the base station through higher layer signaling and FD-OCCs having a length of 4 that may be used when configuration for enhanced DMRS type 1 is received. Alternatively, in addition, the corresponding UE may additionally report a UE capability indicating that the UE may receive notification from the base station and understand that the base station is capable of multi-user MIMO scheduling, and this may mean that an FD-OCC having a length of 4, which may be used when the UE receives a DMRS port defined based on the enhanced DMRS type 1 according to the UE capability despite being configured with DMRS type 1, may be applied. In this case, the corresponding UE may expect that the DMRS port of the corresponding UE scheduled in the multi-user MIMO scheme in the corresponding CDM group and the DMRS ports allocated to other UEs are orthogonal when an FD-OCC having a length of 4 is applied.

The disclosure contemplates a case in which a UE is scheduled with a DMRS port based on DMRS type 1 for PDSCH reception from a base station, and the corresponding UE and one or more other UEs receive enhanced DMRS type 1 configuration through higher layer signaling and receive scheduling of one or more of DMRS ports 1008 to 1015 based on enhanced DMRS type 1. Here, the corresponding UE may expect that the corresponding UE and the one or more other UEs are scheduled in the multi-user MIMO scheme in the same CDM group by the base station. In other words, it may be expected that the DMRS port on which the corresponding UE is scheduled and the DMRS port on which the corresponding UE and one or more other UEs are scheduled belong to the same CDM group. Furthermore, it may be expected that the DMRS port on which the corresponding UE is scheduled and the DMRS port on which the corresponding UE and one or more other UEs are scheduled are orthogonal to each other by using an OCC.

Here, the corresponding UE may receive a notification from the base station that the one or more of other UEs (scheduled in the multi-user MIMO scheme) in the same CDM group are scheduled with one or more of DMRS ports 1008 to 1015 based on enhanced DMRS type 1, and the corresponding notification may be semi-statically configured through higher layer signaling, activated through MAC-CE, dynamically indicated through L1 signaling, or notified through a combination of higher layer signaling and L1 signaling. More specifically, in case that the UE receives configuration information indicating that multi-user MIMO scheduling is possible from the base station through higher layer signaling, the UE may receive higher layer signaling configuration, which may be included in DMRS type 1 configuration information, indicating that the UE may apply an FD-OCC having a length of 4 to a DMRS port defined based on DMRS type 1 and receive same. By way of example, the UE having received the higher layer signaling may apply an FD-OCC of [+1 +1 +1 +1] having a length of 4 in addition to applying an FD-OCC of [+1 +1] having a length of 2 to DMRS port 1000 defined based on DMRS type 1, and apply an FD-OCC of [+1 −1 +1 −1] having a length of 4 in addition to applying an FD-OCC of [+1 −1] having a length of 2 to DMRS port 1001 so as to perform channel estimation.

Here, the corresponding UE may be a UE of a version capable of receiving enhanced DMRS type 1 like the one or more other UEs, and may be a UE having reported a UE capability that enhanced DMRS type 1 is supportable to the base station. Alternatively/in addition, the corresponding UE may be a UE having reported, to the base station, a UE capability indicating that at least one FD-OCC may be dynamically and freely applied without restriction during channel estimation, among FD-OCCs having a length of 2 that may be used when configuration for DMRS type 1 is received from the base station through higher layer signaling and FD-OCCs having a length of 4 that may be used when configuration for enhanced DMRS type 1 is received. Alternatively, in addition, the corresponding UE may additionally report a UE capability indicating that the UE may receive notification from the base station and understand that the base station is capable of multi-user MIMO scheduling, and this may mean that an FD-OCC having a length of 4, which may be used when the UE receives a DMRS port defined based on the enhanced DMRS type 1 according to the UE capability despite being configured with DMRS type 1, may be applied. In this case, the corresponding UE may expect that the DMRS port of the corresponding UE scheduled in the multi-user MIMO scheme in the corresponding CDM group and the DMRS ports allocated to other UEs are orthogonal when an FD-OCC having a length of 4 is applied.

The disclosure contemplates a case in which a UE is scheduled with a DMRS port based on DMRS type 1 for PDSCH reception from a base station, and the corresponding UE and one or more other UEs receive enhanced DMRS type 1 configuration through higher layer signaling and receive scheduling of one or more of DMRS ports 1008 to 1015 based on enhanced DMRS type 1. Here, the corresponding UE may expect that there is no restriction on that the corresponding UE and the one or more other UEs are scheduled in the multi-user MIMO scheme in the same CDM group by the base station.

In this case, the UE may be a UE having reported to the base station the UE capability indicating that the UE may perform effective channel estimation even when one or more DMRS ports among enhanced DMRS type 1 based DMRS ports 1008 to 1015 allocated to one or more other UEs scheduled in the multi-user MIMO scheme in the same CDM group as the DMRS port to which the UE is allocated are allocated. For example, since the UE may distinguish only orthogonal DMRS ports when an FD-OCC is applied, a method of estimating a channel without applying an FD-OCC having a length of 2 or 4 may be used. For another example, even in case that FD-OCCs are not orthogonal, the UE may perform non-orthogonal channel estimation at the same time and frequency resources by receiving a DMRS sequence index configuration differently for each UE from the base station.

With respect to the above, the embodiment has been described based on enhanced DMRS type 1, but the UE and the base station may perform similar operations based on enhanced DMRS type 2. In other words, the above-described embodiments may be applied based on DMRS type 2 and enhanced DMRS type 2. Furthermore, in case that the UE operates based on enhanced DMRS type 2, it may be assumed that the UE defines the DMRS port based on [Enhanced DMRS type 2 support method 3] among the various methods for supporting enhanced DMRS type 2. For example, the UE may receive higher layer signaling configuration with respect to enhanced DMRS type 2 from the base station, and when receiving a PDSCH DMRS from the base station, the UE may assume that there is no restriction on whether a DMRS port for another UE scheduled by the base station in a multi-user MIMO scheme exists in a CDM group including the corresponding DMRS port. Here, another UE scheduled in the multi-user MIMO scheme may be configured with DMRS type 2 or enhanced DMRS type 2 through higher layer signaling from the base station.

Furthermore, with respect to the above, the embodiment has been described for the PDSCH reception of the UE, but a similar operation may be performed when the UE transmits the PUSCH, and the base station receives the PUSCH. In other words, the above-described embodiments may be applied based on DMRS type 1, enhanced DMRS type 1, DMRS type 2, and enhanced DMRS type 2 for the PUSCH. For example, the UE may assume that there is no restriction on whether there is a DMRS port for another UE scheduled in a multi-user MIMO scheme from the base station in the CDM group including the DMRS port instructed to transmit the PUSCH to the base station. That is, within the corresponding CDM group, the UE may assume that there is no restriction on scheduling other UEs by the base station, and the base station may receive a DMRS port defined and transmitted by a corresponding other UE in the same CDM group based on DMRS type 1 or enhanced DMRS type 1.

Figure 22:
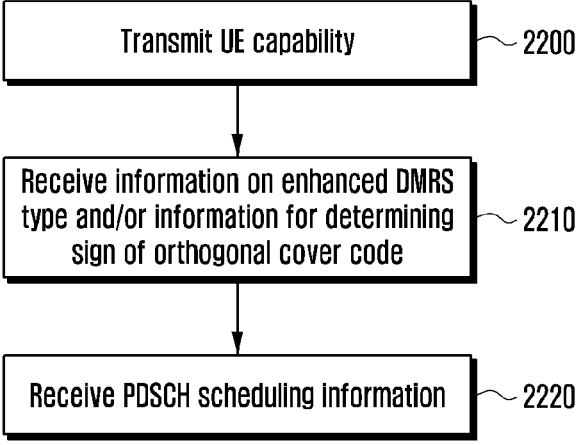
FIG. 22 illustrates an example of an operation of a UE for performing DMRS reception according to an embodiment of the disclosure.

FIG. 22 illustrates an example of an operation of a UE for performing DMRS reception according to an embodiment of the disclosure.

A UE may transmit the UE capability described above to a base station (2200). In this case, the UE capability that may be reported may include information on whether the UE supports sign determination (or/and sign inversion) of an orthogonal cover code applied to the DMRS as described above. Thereafter, the UE receives information for enhanced DMRS type 1 or/and 2 or/and information for determining a sign of an orthogonal cover code from the base station (2210). The information for enhanced DMRS type 1 or/and 2 from the base station may be as described above and the information for determining a sign of an orthogonal cover code may be as described above. For example, the information for determining a sign of an orthogonal cover code may include a combination of at least one of higher layer signaling or L1 signaling.

The UE may receive PDSCH scheduling information (2220). Here, the scheduling information may be notified through DCI format 1_1 or 1_2 in the case of the PDSCH and according to an embodiment of the disclosure, may include the information for determining a sign of an orthogonal cover code as well. The UE may determine an orthogonal cover code to be applied to a DMRS according to a combination of at least one of Methods 3-1 to 3-4 described above. By way of example, the UE as described above may estimate a channel by using a reversed orthogonal cover code when indicated of reversing of the orthogonal cover code.

The operations described above are merely an example, not all operations are essential, and one of the operations may not be performed, the order may be changed, omitted, or other operations may be added.

Figure 23:
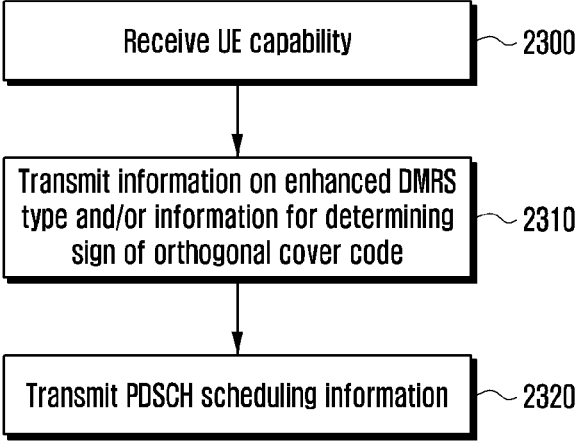
FIG. 23 illustrates an example of an operation of a base station for performing DMRS transmission according to an embodiment of the disclosure.

FIG. 23 illustrates an example of an operation of a base station for performing DMRS transmission according to an embodiment of the disclosure.

Abase station may receive the UE capability described above from a UE (2300). In this case, the UE capability that may be reported may include information on whether the UE supports sign determination (or/and sign inversion) of an orthogonal cover code applied to the DMRS as described above. Thereafter, the base station transmits information for enhanced DMRS type 1 or/and 2 or/and information for determining a sign of an orthogonal cover code to the UE (2310). The information for enhanced DMRS type 1 or/and 2 from the base station may be as described above and the information for determining a sign of an orthogonal cover code may be as described above. For example, the information for determining a sign of an orthogonal cover code may include a combination of at least one of higher layer signaling or L1 signaling.

The base station may transmit PDSCH scheduling information to the UE (2320). Here, the scheduling information may be notified through DCI format 1_1 or 1_2 in the case of the PDSCH and according to an embodiment of the disclosure, may include the information for determining a sign of an orthogonal cover code as well. The base station determines an orthogonal cover code to be applied to a DMRS, transmit the information for determining a sign of an orthogonal cover code to the UE according to a combination of at least one of Methods 3-1 to 3-4 described above, generate a DMRS by using the determined orthogonal cover code, and transmit the DMRS to the UE.

The operations described above are merely an example, not all operations are essential, and one of the operations may not be performed, the order may be changed, omitted, or other operations may be added.

The above-described contents in the embodiment are not applied only between conventional DMRS type 1 and enhanced DMRS type 1 based on [Enhanced DMRS type 1 support method 1], but may be similarly applied between conventional DMRS types 1 and 2 and enhanced DMRS types 1 and 2 based on the methods for supporting enhanced DMRS types 1 and 2 mentioned in the above-described embodiments.

The UE may report functions described above as a UE capability to the base station. Here, the functions which may be included in the UE capability may include at least one combination of the followings.

In addition, the corresponding UE capability report may be valid for FR1 or valid for both FR1 and FR2. The corresponding UE capability may be reported with different values for each band, band combination, feature set, feature set per CC, and per UE. Different values may be reported depending on a band combination. After receiving the UE capability, the base station may configure higher layer signaling corresponding thereto and the higher layer signaling may correspond to one of the methods described above or independent higher layer signaling.

One or more combination of Embodiment 1 to Embodiment 4 described above may be used. For example, the UE may be indicated of an enhanced DMRS type according to Embodiment 1, a CDM group or a RE of a DMRS may follow Embodiment 2, an orthogonal cover code is changed according to Embodiment 3 when necessary, or power of a DMRS RE of another UE causing interference may be identified according to Embodiment 4. This combination is merely an example, and the combination of the embodiments of the disclosure is not limited to this example.

Although the above description is mainly for the PDSCH DMRS, the content of the disclosure may be applied to a PUSCH DMRS based on the clear understanding of those skilled in the art. In this case, the base station transmits PUSCH scheduling information through DCI format 0_0 or 0_1 and the PUSCH scheduling information may include DMRS configuration information such as antenna ports. The UE may generate a PUSCH DMRS according to at least one of Embodiment 1 to Embodiment 4 and transmit the PUSCH DMRS together with uplink data.

Figure 24:
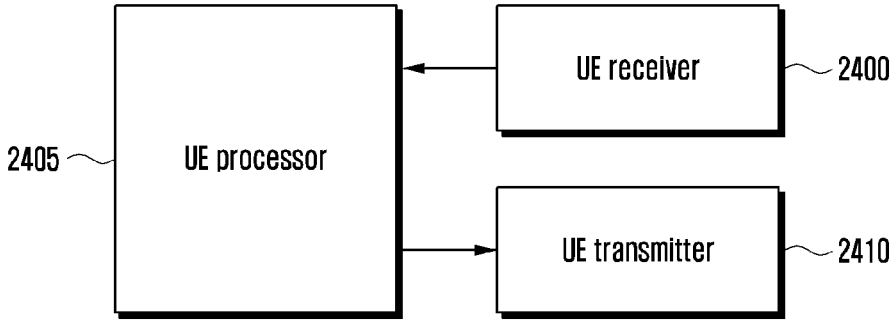
FIG. 24 illustrates a structure of a UE in a wireless communication system according to an embodiment of the disclosure.

FIG. 24 illustrates a structure of a UE in a wireless communication system according to an embodiment of the disclosure.

Referring to FIG. 24, the UE may include a transceiver indicating a UE receiver 2400 and a UE transmitter 2410, a memory (not shown), and a UE processor 2405 (or a UE controller or processor). The transceiver 2400 and 2410, the memory, and the UE processor 2405 of the UE may operate according to the above-described UE communication method. However, the components of the UE are not limited to the examples described above. For example, the UE may include more or fewer components than the above-described components. In addition, the transceiver, the memory, and the processor may be implemented in the form of a single chip.

The transceiver may transmit or receive a signal to or from a base station. Here, the signal may include control information and data. To this end, the transceiver may include an RF transmitter configured to up-convert and amplify the frequency of the transmitted signal, an RF receiver configured to amplify the received signal with low noise and down-convert the frequency, and the like. However, this is only an embodiment of the transceiver, and the components of the transceiver are not limited to the RF transmitter and the RF receiver.

In addition, the transceiver may receive a signal through a wireless channel, output the signal to the processor, and transmit a signal output from the processor through the wireless channel.

The memory may store programs and data necessary for the operation of the UE. In addition, the memory may store control information or data included in signals transmitted and received by the UE. The memory may include a storage medium such as a ROM, a RAM, a hard disk, a CD-ROM, and a DVD, or a combination of storage media. In addition, there may be multiple memories.

In addition, the processor may control a series of processes so that the UE operates according to the embodiments described above. For example, the processor may control a component of the UE to simultaneously receive multiple PDSCHs by receiving DCI including two layers. There may be multiple processors, and the processor may perform an operation of controlling components of the UE by executing a program stored in the memory.

Figure 25:
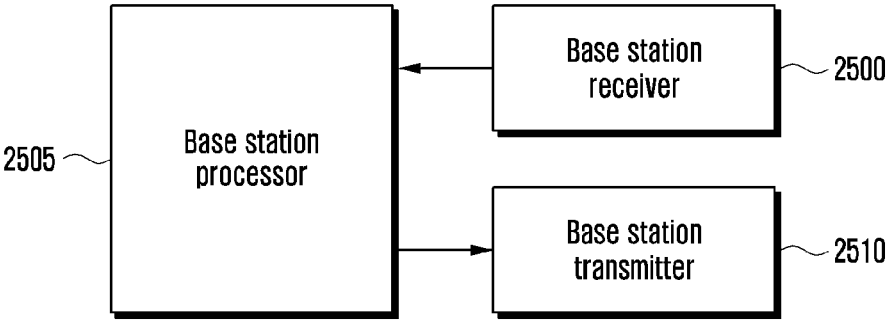
FIG. 25 illustrates a structure of a base station in a wireless communication system according to an embodiment of the disclosure.

FIG. 25 illustrates a structure of a base station in a wireless communication system according to an embodiment of the disclosure.

Referring to FIG. 25, the base station may include a transceiver indicating a base station receiver 2500 and a base station transmitter 2510, a memory (not shown), and a base station processor 2505 (or a base station controller or processor). The transceiver 2500 and 2510, the memory, and the base station processor 2505 of the base station may operate according to the above-described base station communication method. However, the components of the base station are not limited to the examples described above. For example, the base station may include more or fewer components than the above-described components. In addition, the transceiver, the memory, and the processor may be implemented in the form of a single chip.

The transceiver may transmit or receive a signal to or from a UE. Here, the signal may include control information and data. To this end, the transceiver may include an RF transmitter configured to up-convert and amplify the frequency of the transmitted signal, an RF receiver configured to amplify the received signal with low noise and down-convert the frequency, and the like. However, this is only an embodiment of the transceiver, and the components of the transceiver are not limited to the RF transmitter and the RF receiver.

In addition, the transceiver may receive a signal through a wireless channel, output the signal to the processor, and transmit a signal output from the processor through the wireless channel.

The memory may store programs and data necessary for the operation of the base station. In addition, the memory may store control information or data included in signals transmitted and received by the base station. The memory may include a storage medium such as a ROM, a RAM, a hard disk, a CD-ROM, and a DVD, or a combination of storage media. In addition, there may be multiple memories.

The processor may control a series of processes so that the base station operates according to an embodiment of the disclosure. For example, the processor may control a component of the base station to configure DCI of two layers including allocation information of multiple PDSCHs and control each component of the base station in order to transmit the same. There may be multiple processors, and the processor may perform an operation of controlling components of the base station by executing a program stored in the memory.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Furthermore, the above respective embodiments may be employed in combination, as necessary. For example, a part of one embodiment of the disclosure may be combined with a part of another embodiment to operate a base station and a terminal. As an example, a part of embodiment 1 of the disclosure may be combined with a part of embodiment 2 to operate a base station and a terminal. Moreover, although the above embodiments have been described based on the FDD LTE system, other variants based on the technical idea of the embodiments may also be implemented in other systems such as TDD LTE, 5G, and NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Furthermore, in methods of the disclosure, some or all of the contents of each embodiment may be implemented in combination without departing from the essential spirit and scope of the disclosure.

Various embodiments of the disclosure have been described above. The above description of the disclosure is merely for the purpose of illustration, and embodiments of the disclosure are not limited to the embodiments set forth herein. Those skilled in the art will appreciate that other particular modifications and changes may be easily made without departing from the technical idea or the essential features of the disclosure. The scope of the disclosure should be determined not by the above description but by the appended claims, and all modifications or changes derived from the meaning and scope of the claims and equivalent concepts thereof shall be construed as falling within the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:

receiving, from a base station, configuration information on an enhanced demodulation reference signal (DMRS) for a physical downlink shared channel (PDSCH);

receiving, from the base station, downlink control information (DCI) scheduling the PDSCH, the DCI including antenna port information associated with the enhanced DMRS; and receiving, from the base station, downlink data and the enhanced DMRS on the PDSCH based on the DCI, wherein, in case that the enhanced DMRS corresponds to an enhanced DMRS type 1, the enhanced DMRS is capable of supporting up to 16 antenna ports based on a frequency domain orthogonal cover code (FD-OCC) of length 4, and wherein, in case that the enhanced DMRS corresponds to an enhanced DMRS type 2, the enhanced DMRS is capable of supporting up to 24 antenna ports based on the FD-OCC of length 4, and the FD-OCC of length 4 is applied to 4 resource elements (REs) which consist of 2 sets with a difference of 6 subcarrier indices between each set including 2 adjacent REs in a symbol within a resource block (RB).

2. The method of claim 1, wherein, in case that the enhanced DMRS corresponds to the enhanced DMRS type 1, the FD-OCC of length 4 is applied to 4 consecutive REs with a difference of 2 between subcarrier indices of REs in a symbol within an RB or across RBs.

3. The method of claim 1, wherein, in case that the enhanced DMRS corresponds to the enhanced DMRS type 1 and one or more allocated antenna ports are included in antenna ports of 1000 to 1007, antenna ports of DMRS type 1, which corresponds to a code division multiplexing (CDM) group of one or more allocated antenna ports of the terminal, are not restricted to be allocated to another co-scheduled terminal.

4. The method of claim 1, wherein, in case that the enhanced DMRS corresponds to the enhanced DMRS type 1 and one or more allocated antenna ports are included in antenna ports of 1008 to 1015, antenna ports of DMRS type 1, which corresponds to a code division multiplexing (CDM) group of the one or more allocated antenna ports to the terminal, are not allocated to another terminal.

5. The method of claim 1, further comprising:

transmitting, to the base station, capability information associated with the enhanced DMRS.

6. A method performed by a base station in a wireless communication system, the method comprising:

transmitting, to a terminal, configuration information on an enhanced demodulation reference signal (DMRS) for a physical downlink shared channel (PDSCH);

transmitting, to the terminal, downlink control information (DCI) scheduling the PDSCH, the DCI including antenna port information associated with the enhanced DMRS; and transmitting, to the terminal, downlink data and the enhanced DMRS on the PDSCH, wherein, in case that the enhanced DMRS corresponds to an enhanced DMRS type 1, the enhanced DMRS is capable of supporting up to 16 antenna ports based on a frequency domain orthogonal cover code (FD-OCC) of length 4, and wherein, in case that the enhanced DMRS corresponds to an enhanced DMRS type 2, the enhanced DMRS is capable of supporting up to 24 antenna ports based on the FD-OCC of length 4, and the FD-OCC of length 4 is applied to 4 resource elements (REs) which consist of 2 sets with a difference of 6 subcarrier indices between each set including 2 adjacent REs in a symbol within a resource block (RB).

7. The method of claim 6, wherein, in case that the enhanced DMRS corresponds to the enhanced DMRS type 1, the FD-OCC of length 4 is applied to 4 consecutive REs with a difference of 2 between subcarrier indices of REs in a symbol within an RB or across RBs.

8. The method of claim 6, wherein, in case that the enhanced DMRS corresponds to the enhanced DMRS type 1 and one or more allocated antenna ports are included in antenna ports of 1000 to 1007, antenna ports of DMRS type 1, which corresponds to a code division multiplexing (CDM) group of one or more allocated antenna ports of the terminal, are not restricted to be allocated to another co-scheduled terminal.

9. The method of claim 6, wherein, in case that the enhanced DMRS corresponds to the enhanced DMRS type 1 and one or more allocated antenna ports are included in antenna ports of 1008 to 1015, antenna ports of DMRS type 1, which corresponds to a code division multiplexing (CDM) group of the one or more allocated antenna ports to the terminal, are not allocated to another terminal by the base station.

10. The method of claim 6, further comprising:

receiving, from the terminal, capability information associated with the enhanced DMRS.

11. A terminal in a wireless communication system, the terminal comprising:

a transceiver; and a controller coupled with the transceiver and configured to:

receive, from a base station, configuration information on an enhanced demodulation reference signal (DMRS) for a physical downlink shared channel (PDSCH), receive, from the base station, downlink control information (DCI) scheduling the PDSCH, the DCI including antenna port information associated with the enhanced DMRS, and receive, from the base station, downlink data and the enhanced DMRS on the PDSCH based on the DCI, wherein, in case that the enhanced DMRS corresponds to an enhanced DMRS type 1, the enhanced DMRS is capable of supporting up to 16 antenna ports based on a frequency domain orthogonal cover code (FD-OCC) of length 4, and wherein, in case that the enhanced DMRS corresponds to an enhanced DMRS type 2, the enhanced DMRS is capable of supporting up to 24 antenna ports based on the FD-OCC of length 4, and the FD-OCC of length 4 is applied to 4 resource elements (REs) which consist of 2 sets with a difference of 6 subcarrier indices between each set including 2 adjacent REs in a symbol within a resource block (RB).

12. The terminal of claim 11, wherein, in case that the enhanced DMRS corresponds to the enhanced DMRS type 1, the FD-OCC of length 4 is applied to 4 consecutive REs with a difference of 2 between subcarrier indices of REs in a symbol within an RB or across RBs.

13. The terminal of claim 11, wherein, in case that the enhanced DMRS corresponds to the enhanced DMRS type 1 and one or more allocated antenna ports are included in antenna ports of 1000 to 1007, antenna ports of DMRS type 1, which corresponds to a code division multiplexing (CDM) group of one or more allocated antenna ports of the terminal, are not restricted to be allocated to another co-scheduled terminal.

14. The terminal of claim 11, wherein, in case that the enhanced DMRS corresponds to the enhanced DMRS type 1 and one or more allocated antenna ports are included in antenna ports of 1008 to 1015, antenna ports of DMRS type 1, which corresponds to a code division multiplexing (CDM) group of the one or more allocated antenna ports to the terminal, are not allocated to another terminal.

15. The terminal of claim 11, wherein the controller is further configured to:

transmitting, to the base station, capability information associated with the enhanced DMRS.

16. A base station in a communication system, the base station comprising:

a transceiver; and a controller coupled with the transceiver and configured to:

transmit, to a terminal, configuration information on an enhanced demodulation reference signal (DMRS) for a physical downlink shared channel (PDSCH), transmit, to the terminal, downlink control information (DCI) scheduling the PDSCH, the DCI including antenna port information associated with the enhanced DMRS, and transmit, to the terminal, downlink data and the enhanced DMRS on the PDSCH, wherein, in case that the enhanced DMRS corresponds to an enhanced DMRS type 1, the enhanced DMRS is capable of supporting up to 16 antenna ports based on a frequency domain orthogonal cover code (FD-OCC) of length 4, and wherein, in case that the enhanced DMRS corresponds to an enhanced DMRS type 2, the enhanced DMRS is capable of supporting up to 24 antenna ports based on the FD-OCC of length 4, and the FD-OCC of length 4 is applied to 4 resource elements (REs) which consist of 2 sets with a difference of 6 subcarrier indices between each set including 2 adjacent REs in a symbol within a resource block (RB).

17. The base station of claim 16, wherein, in case that the enhanced DMRS corresponds to the enhanced DMRS type 1, the FD-OCC of length 4 is applied to 4 consecutive REs with a difference of 2 between subcarrier indices of REs in a symbol within an RB or across RBs.

18. The base station of claim 16, wherein, in case that the enhanced DMRS corresponds to the enhanced DMRS type 1 and one or more allocated antenna ports are included in antenna ports of 1000 to 1007, antenna ports of DMRS type 1, which corresponds to a code division multiplexing (CDM) group of one or more allocated antenna ports of the terminal, are not restricted to be allocated to another co-scheduled terminal.

19. The base station of claim 16, wherein, in case that the enhanced DMRS corresponds to the enhanced DMRS type 1 and one or more allocated antenna ports are included in antenna ports of 1008 to 1015, antenna ports of DMRS type 1, which corresponds to a code division multiplexing (CDM) group of the one or more allocated antenna ports to the terminal, are not allocated to another terminal by the base station.

20. The base station of claim 16, wherein the controller is further configured to:

receive, from the terminal, capability information associated with the enhanced DMRS.

* * * * *